United States Patent [19]
Hasegawa

[11] Patent Number: 5,900,927
[45] Date of Patent: May 4, 1999

[54] VARIABLE TARGET AUTOFOCUSING AND RANGE FINDER FOR MEASURING DISTANCE TO A SUBJECT

[75] Inventor: Jun Hasegawa, Miyagi, Japan

[73] Assignee: Fuji Photo Film Co., Ltd., Kanagawa, Japan

[21] Appl. No.: 08/974,711

[22] Filed: Nov. 19, 1997

Related U.S. Application Data

[63] Continuation of application No. 08/322,149, Oct. 13, 1994, abandoned.

[30] Foreign Application Priority Data

| Oct. 13, 1993 | [JP] | Japan | 5-255847 |
| Oct. 13, 1993 | [JP] | Japan | 5-255848 |
| Oct. 13, 1993 | [JP] | Japan | 5-255849 |
| Oct. 13, 1993 | [JP] | Japan | 5-255850 |
| Oct. 13, 1993 | [JP] | Japan | 5-255851 |
| Oct. 13, 1993 | [JP] | Japan | 5-255852 |
| Oct. 13, 1993 | [JP] | Japan | 5-255853 |

[51] Int. Cl.$^6$ .................................................. G03B 13/36
[52] U.S. Cl. .................. 356/3.13; 356/4.03; 356/4.04; 348/353; 396/123; 250/201.7
[58] Field of Search ...................... 356/4.03, 4.04, 356/3.13, 3.14; 396/123; 348/353; 250/201.7

[56] References Cited

U.S. PATENT DOCUMENTS

| 4,341,447 | 7/1982 | Biber | 354/408 |
| 4,614,418 | 9/1986 | Ishizaki et al. | 354/407 |
| 4,668,084 | 5/1987 | Suzuki et al. | 356/3.14 |
| 4,851,657 | 7/1989 | Taniguchi et al. | 250/201 |
| 5,068,682 | 11/1991 | Utagawa | 354/354 |
| 5,150,217 | 9/1992 | Senuma et al. | 348/353 |
| 5,218,395 | 6/1993 | Taniguchi et al. | 354/407 |
| 5,303,019 | 4/1994 | Irie | 356/3.14 |
| 5,304,980 | 4/1994 | Maekawa | 340/435 |
| 5,353,089 | 10/1994 | Yaji | 354/402 |
| 5,469,240 | 11/1995 | Uchiyama et al. | 396/96 |
| 5,552,853 | 9/1996 | Muramatsu et al. | 396/121 |

*Primary Examiner*—Gail O. Hayes
*Assistant Examiner*—Pinchus M Laufer
*Attorney, Agent, or Firm*—Sughrue, Mion, Zinn Macpeak & Seas, PLLC

[57] ABSTRACT

An image pickup frame is divided into a plurality of areas. A contrast at each area is measured. An area where a main subject is located is detected by comparing contrasts at areas. A distance to a subject in the area where the main subject is located is measured. With this range finding technique, even if a main subject is not located at the central area of an image pickup frame, an area where the main subject is located can be identified and range finding can be performed only for that area.

8 Claims, 34 Drawing Sheets

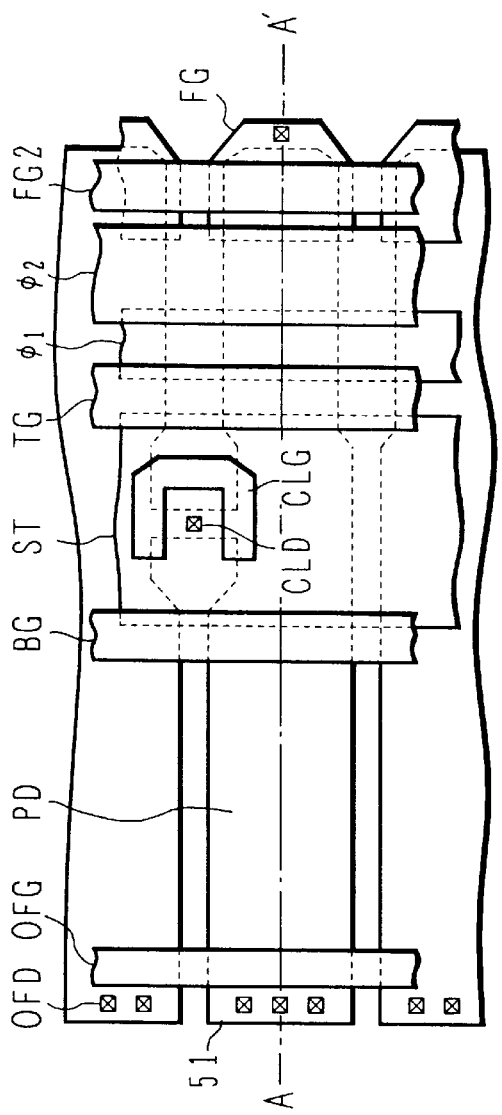
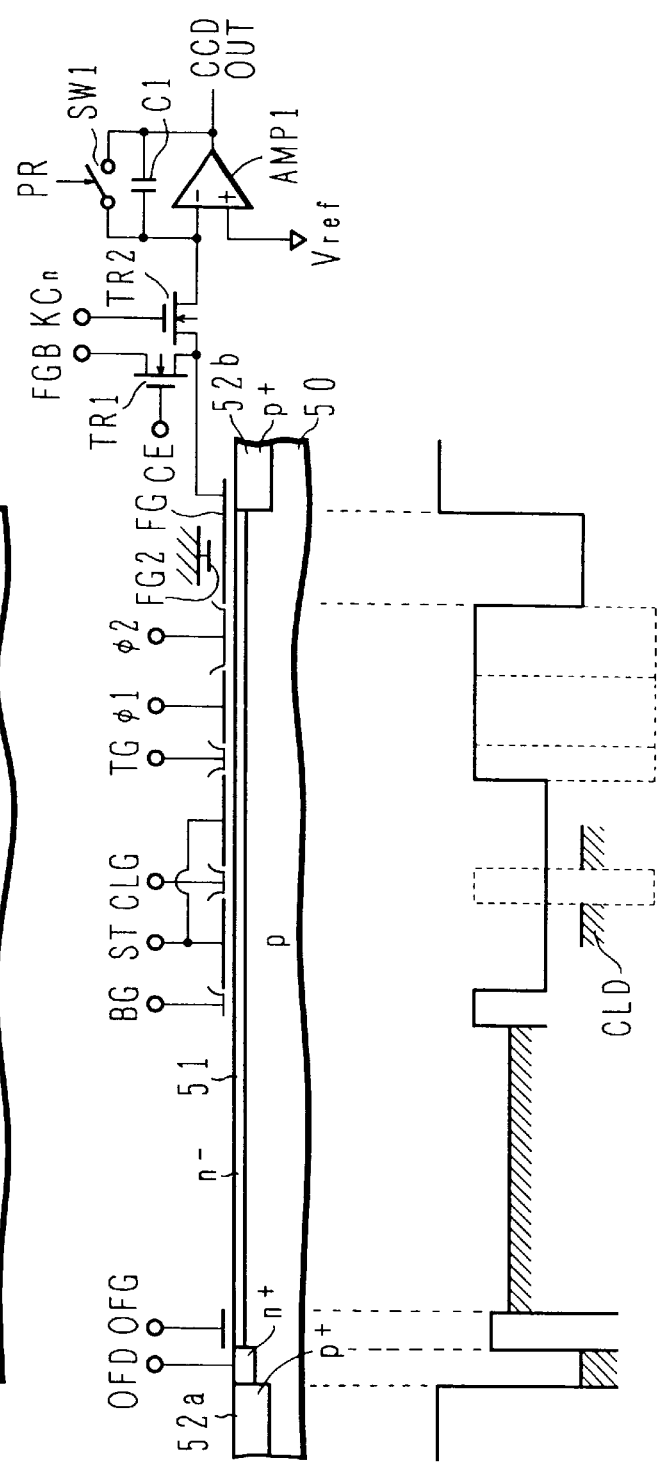
FIG.9A
FIG.9B

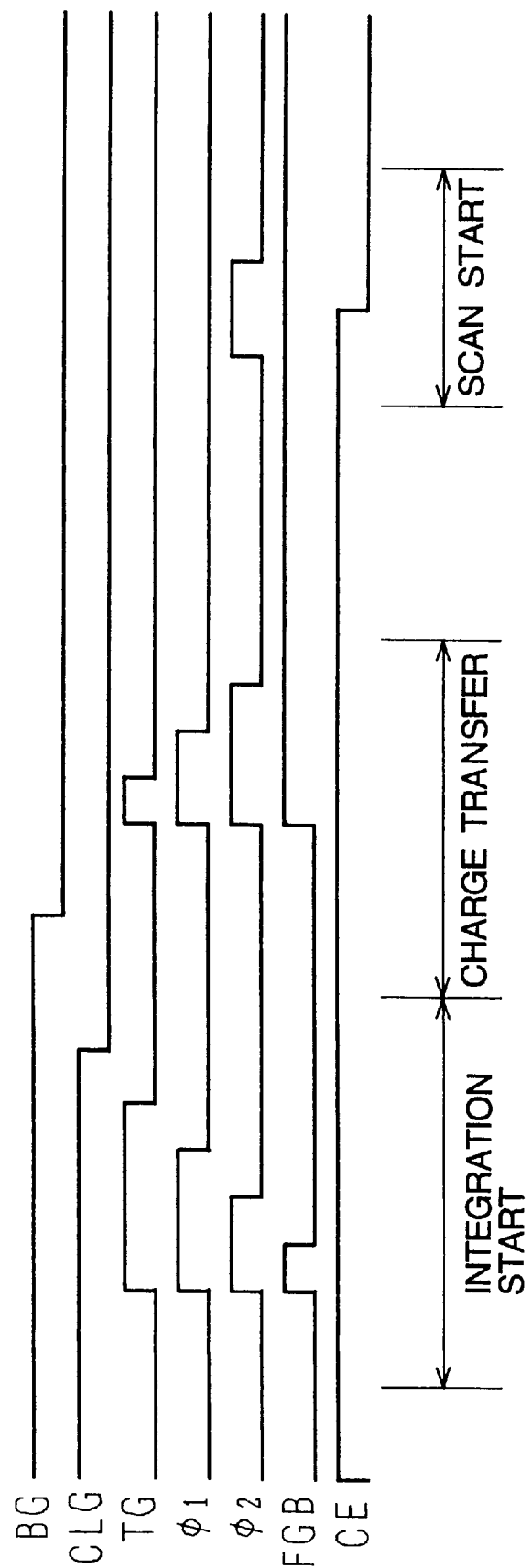

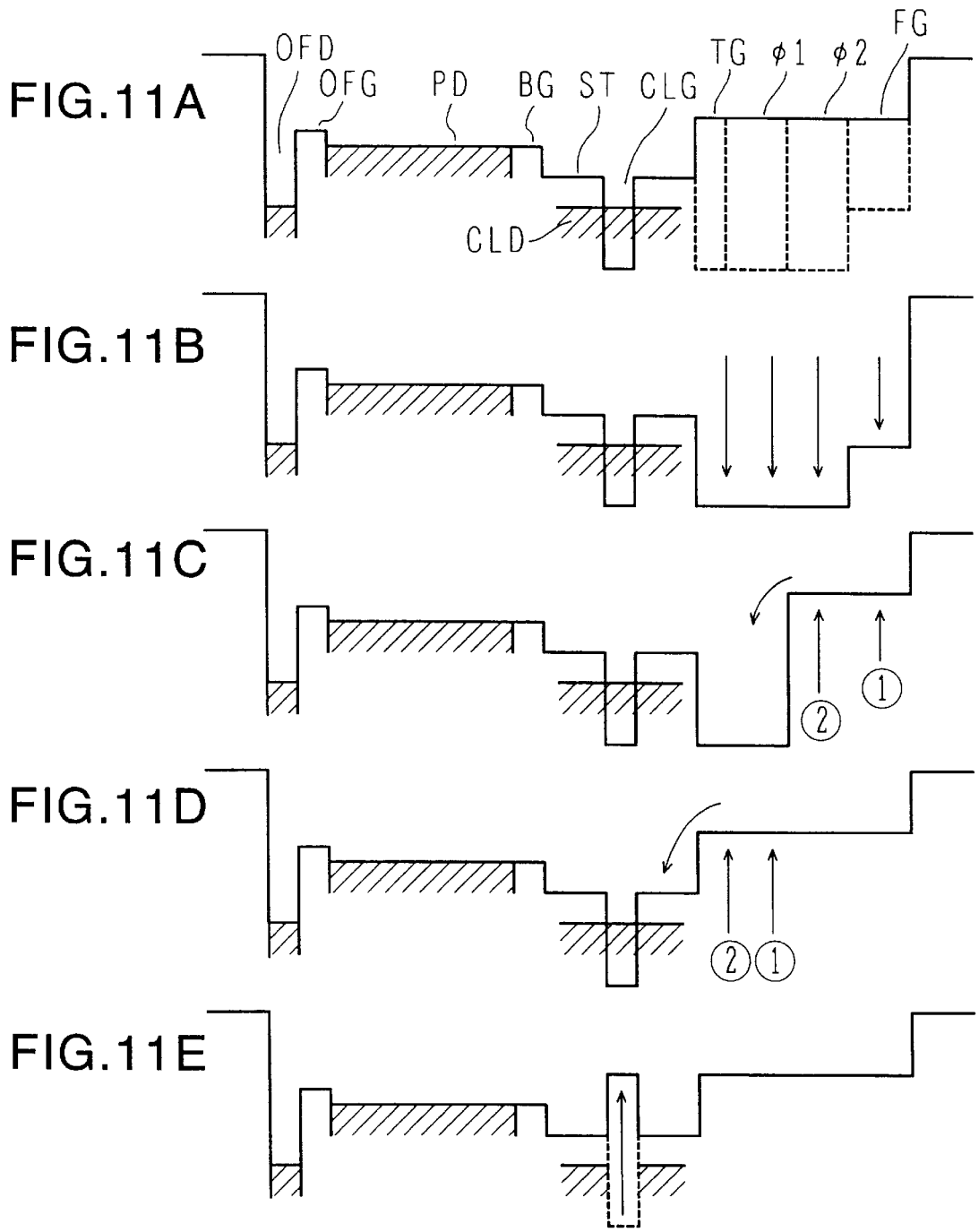

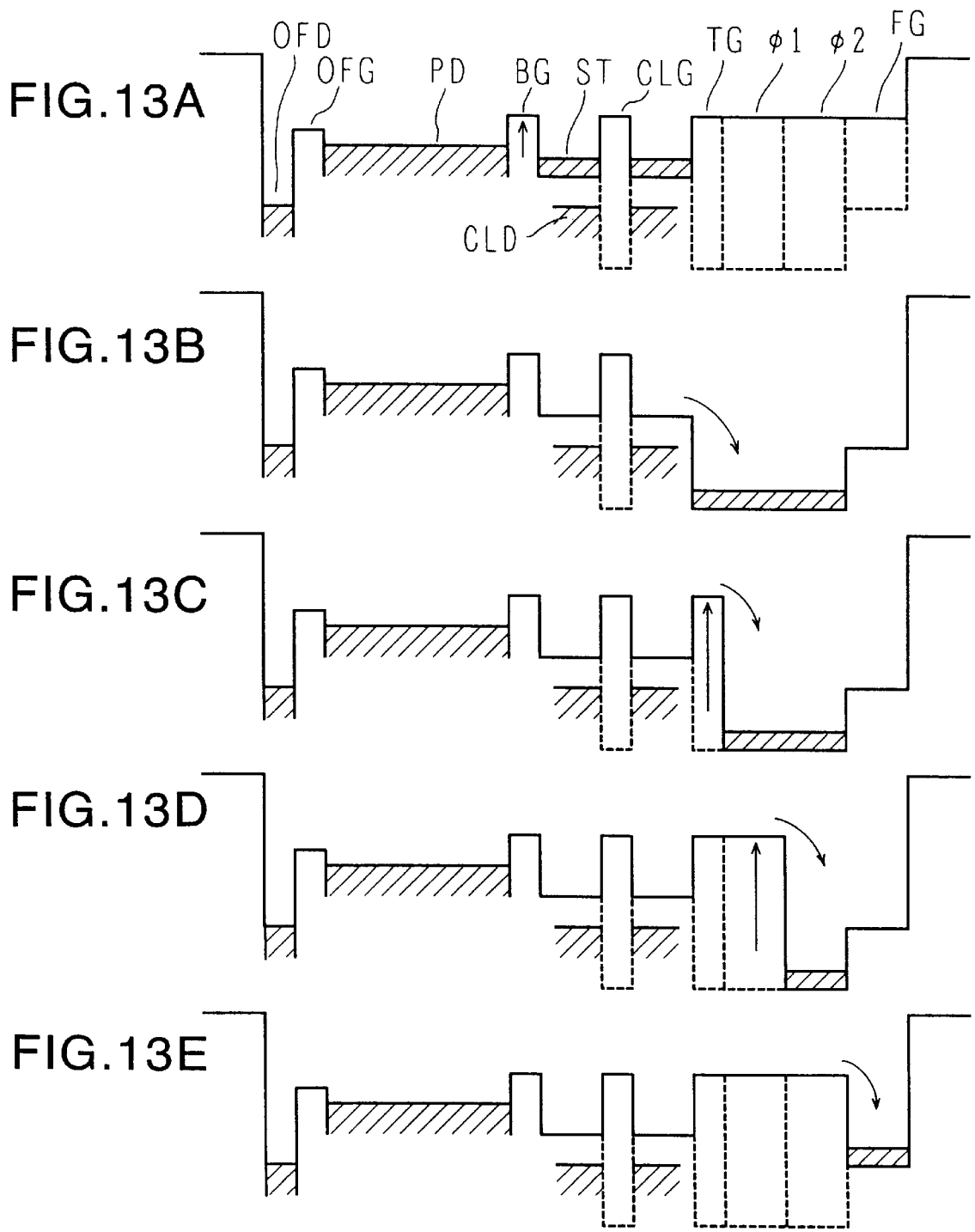

FIG.27

| MAXIMUM OUTPUT PIXEL LEVEL | A/D DATA ||||||||  FLAG DATA ||||||||
|---|---|---|---|---|---|---|---|---|---|---|---|---|---|---|---|---|
| | b7 | b6 | b5 | b4 | b3 | b2 | b1 | b0 | F7 | F6 | F5 | F4 | F3 | F2 | F1 | F0 |
| $8/8 \leq V$ | 1 | 1 | 1 | 1 | 1 | 1 | 1 | 1 | 1 | 1 | 1 | 1 | 1 | 1 | 1 | 1 |
| $7/8 \leq V < 8/8$ | 1 | 1 | 1 | × | × | × | × | × | 0 | 1 | 1 | 1 | 1 | 1 | 1 | 1 |
| $6/8 \leq V < 7/8$ | 1 | 1 | 0 | × | × | × | × | × | 0 | 0 | 1 | 1 | 1 | 1 | 1 | 1 |
| $5/8 \leq V < 6/8$ | 1 | 0 | 1 | × | × | × | × | × | 0 | 0 | 0 | 1 | 1 | 1 | 1 | 1 |
| $4/8 \leq V < 5/8$ | 1 | 0 | 0 | × | × | × | × | × | 0 | 0 | 0 | 0 | 1 | 1 | 1 | 1 |
| $3/8 \leq V < 4/8$ | 0 | 1 | 1 | × | × | × | × | × | 0 | 0 | 0 | 0 | 0 | 1 | 1 | 1 |
| $2/8 \leq V < 3/8$ | 0 | 1 | 0 | × | × | × | × | × | 0 | 0 | 0 | 0 | 0 | 0 | 1 | 1 |
| $1/8 \leq V < 2/8$ | 0 | 0 | 1 | × | × | × | × | × | 0 | 0 | 0 | 0 | 0 | 0 | 0 | 1 |
| $V < 1/8$ | 0 | 0 | 0 | × | × | × | × | × | 0 | 0 | 0 | 0 | 0 | 0 | 0 | 0 |

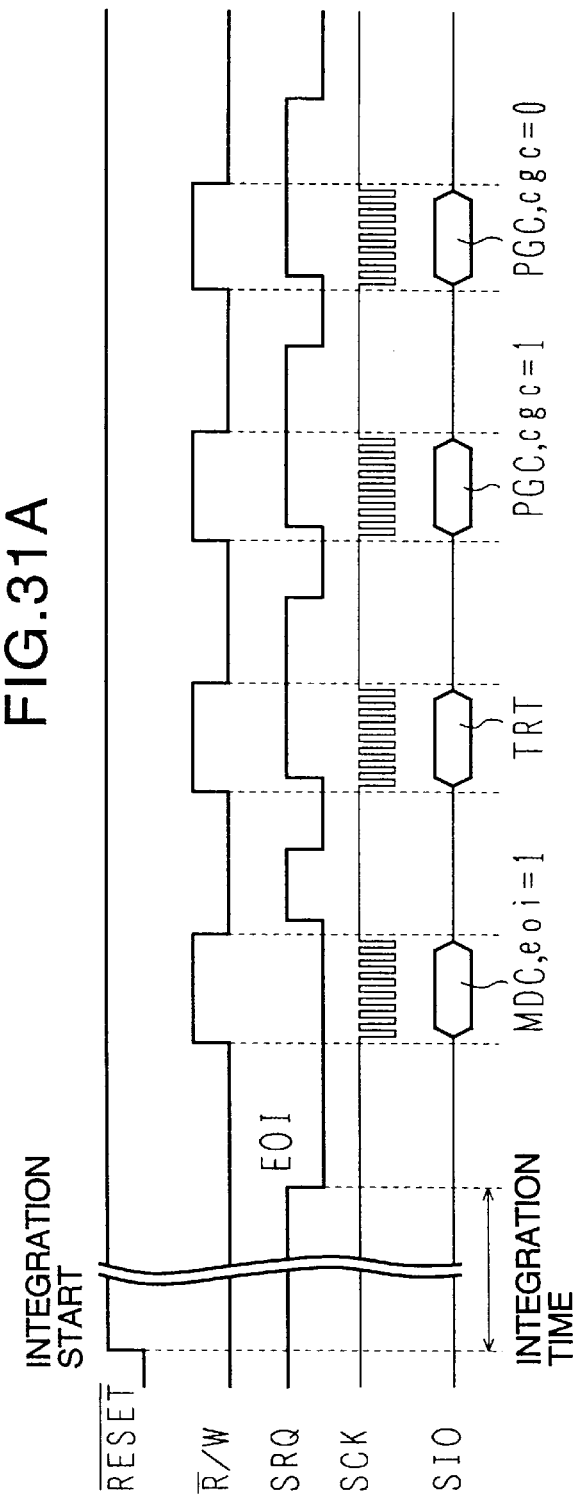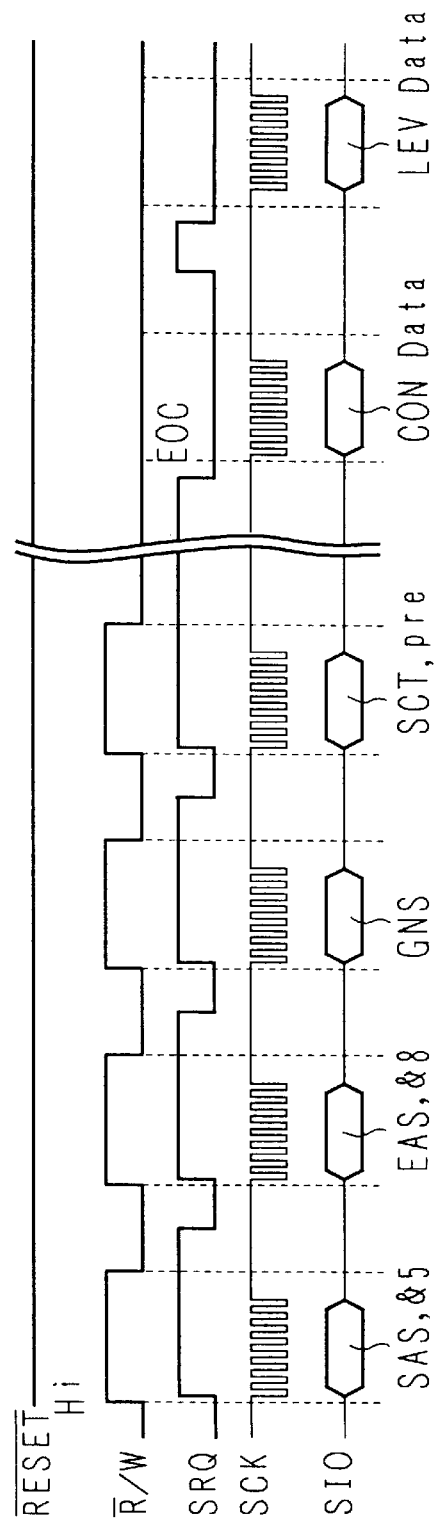

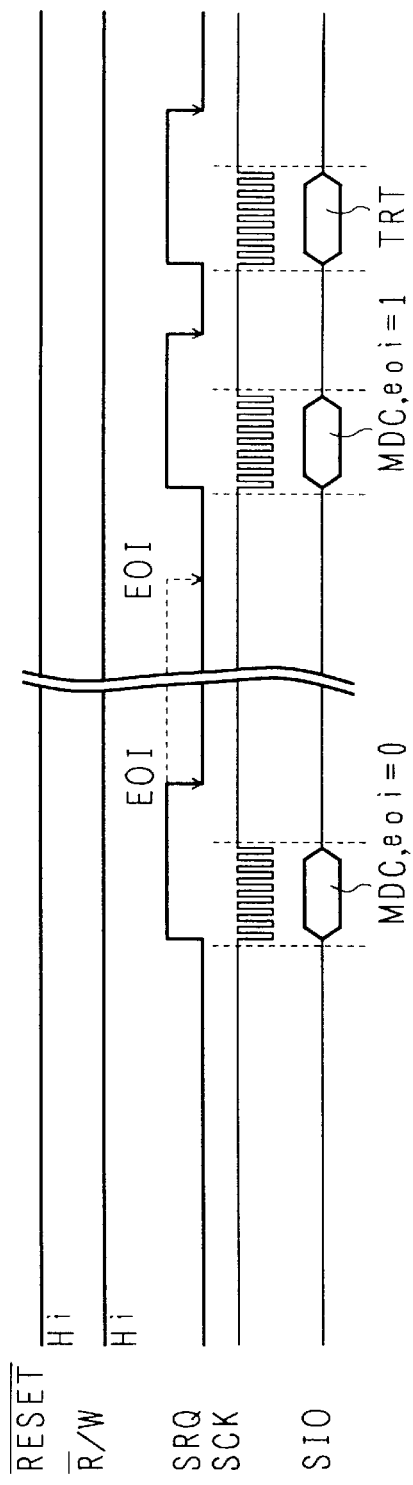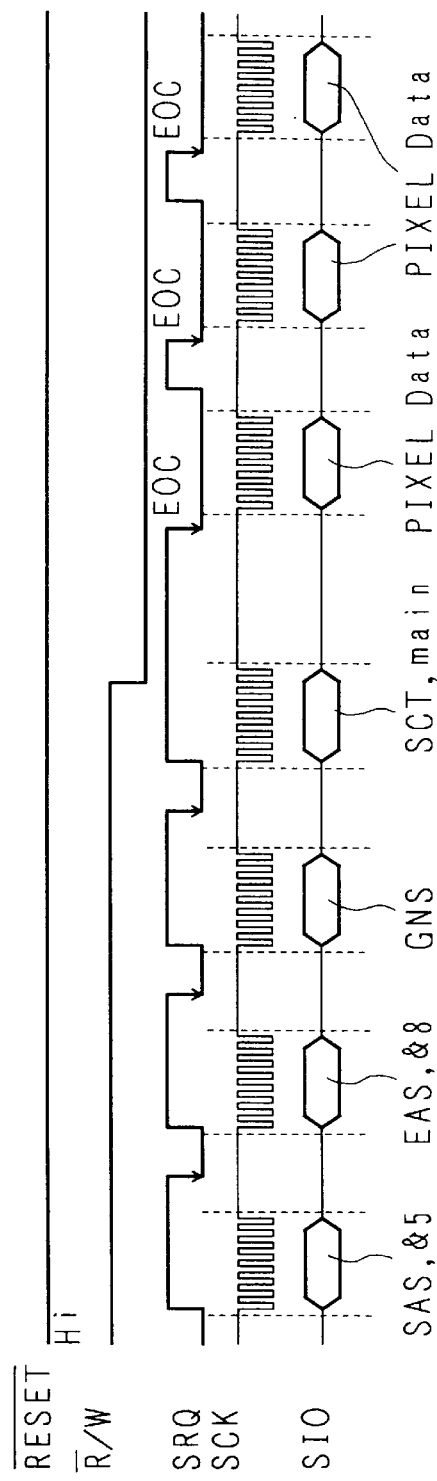

VARIABLE TARGET AUTOFOCUSING AND RANGE FINDER FOR MEASURING DISTANCE TO A SUBJECT

This is a Continuation of application Ser. No. 08/322,149 filed Oct. 13, 1994, now abandoned.

BACKGROUND OF THE INVENTION a) Field of the Invention

The present invention relates to a range finder for measuring a distance to a subject by focusing light beams propagated via different optical paths from the subject on a pair of photosensor arrays, calculating a correlation factor between an image on one photosensor array and another image on the other photosensor array by shifting the images relative to each other, and using a shift amount providing the highest correlation factor for determining the distance.

b) Description of the Related Art

Referring to FIGS. 34A and 34B, an example of a TTL (through the lens) range finder of a phase difference detection type according to a conventional technique will be described. FIG. 34A shows the structure of the range finder, and FIG. 34B shows an example of a processor circuit. A focus point detector for use with cameras will be described by way of example.

Light beams from a subject to be taken are converged by a taking lens 201, and via a film equivalent plane 202, reach a condenser lens 203 and a separator lens 204. The separator lens 204 divides the incident light beams into two light beam groups which are focused on a standard line sensor 205 and a reference line sensor 206. An image of a subject along an optical axis 208 of the taking lens 201 is separated into two images by the separator lens 204 and focused on the line sensors 205 and 206.

The line sensor 205 has p light receiving elements, and is used as a standard so that it is called a standard line sensor. The other line sensor 206 has q light receiving elements larger than p, and is called a reference line sensor. Signals are read from p light receiving elements of the line sensor 206 while changing the signal read phase, and compared to signals read from the standard line sensor 205 to detect a phase difference.

Signals detected from the standard and reference line sensors 205 and 206 are supplied to a processor circuit 207. The processor circuit 207 calculates a correlation factor to be described later while changing the read phase of a signal to be detected from the reference line sensor 206, and detects an extreme value of correlation factors to detect an in-focus position.

Another method of measuring a distance to a subject has been proposed in which light beams from a subject are not received by a taking lens 201 but directly received by a pair of lenses having the same characteristics placed in front of a reference line sensor and a standard line sensor.

FIG. 34B shows an example of the structure of the processor circuit 207. Analog signals from the standard and reference line sensors 205 and 206 are supplied to an A/D converter 209 to convert the analog signals into digital signals. The digital signals are temporarily stored into a RAM 211 under the control of a CPU 210. The digital signals in RAM 211 are thereafter read, and CPU 210 performs a correlation factor calculation to detect an extreme value of correlation factors, and generates an output signal representing a distance to a subject.

In the focus point detector shown in FIGS. 34A and 34B, electric charges accumulated in the photosensor are directly converted into a voltage which forms an analog detection signal. This analog signal is converted into a digital signal and temporarily stored in RAM 211. Thereafter, it is read for the calculation of a correlation factor.

The above-described range finder measures a distance to a subject only for an image focused on the standard line sensor 205. Generally, only a central image in a frame is formed on the standard line sensor to measure a distance. Therefore, if a main subject is at a position shifted from the frame center, the main subject becomes out of focus.

As a method of eliminating this disadvantage, a range finder has been proposed as disclosed in, for example, Japanese Patent Publication 3-67203, which can measure a distance to a subject not only at a frame central area but also at a frame peripheral area. This range finder has a standard line sensor longer than a conventional one to form a plurality of standard positions on the standard line sensor, to allow simultaneous measurements of a plurality of frame areas.

A conventional phase difference detection type range finder can measure a distance to a subject whose image is focused on the standard line sensor. Generally, the standard line sensor is designed so as to focus the image of a subject in the direction perpendicular to the line sensor surface. Therefore, this range finder mounted on a camera can measure the distance to a subject only at the frame central area.

If a main subject is at the position shifted from the frame central area, the distance to the main subject is measured by directing the camera toward the main subject, and thereafter the camera is directed to the original direction to depress the shutter.

The range finder disclosed in Japanese Patent Publication 3-67203 can measure the distance to a subject at the position shifted from the frame central area. However, this range finder cannot determine which area among a plurality of areas contains a main subject. As a result, the distance to the main subject cannot be calculated from information regarding a plurality of distances. In addition, since the areas capable of measuring distances are fixed, if a main subject is not in these fixed areas, the subject distance cannot be measured.

It is also necessary to provide correlation factor calculating circuits as many as the number of distance measuring areas. If a number of distance measuring areas are used, the circuits become complicated.

After electric charges accumulated in a photosensor are read and converted into a digital signal, there is no charge left in the photosensor. If a light amount is insufficient, it is necessary to apply light again to the photosensor to accumulate electric charges. In this case, a range finding time becomes long.

SUMMARY OF THE INVENTION

It is an object of the present invention to provide a range finding technology capable of identifying an area of a main subject and measuring the subject distance even if the subject is not at the frame central area, and capable of minimizing the range finding time even if the amount of light is insufficient.

According to one aspect of the present invention, there is provided a range finder including: a pair of pixel arrays having a number of pixels disposed in line, a subject being focused on the pixel arrays via spatially different optical paths, each pixel having a photosensor for generating an image signal corresponding to a received light amount and image signal storing means for storing the image signal generated by the photosensor; image signal reading means for sequentially and non-destructively reading the image signal at each pixel from the image signal storage means of the pixel arrays; and contrast calculating means for sequentially receiving the image signal read by the image signal reading means and obtaining a sum of absolute values of differences of image signals at adjacent pixels.

The range finder may include: A/D converting means for sequentially receiving the image signal read by the image signal reading means and converting the image signal into digital image data; and signal level judging means for sequentially receiving the digital image data and detecting and storing a maximum value of the received digital image data.

According to another aspect of the present invention, there is provided a range finding method including the steps of: focusing a subject on a photosensor array having a number of photosensors disposed in line and photoelectrically converting a subject image into an image signal corresponding to a received light amount; transferring and storing the image signal in image signal storing means provided for each photosensor; sequentially and non-destructively reading the image signal stored in the image signal storing means; and calculating a contrast from a sum of absolute values of differences of image signals at adjacent photosensors.

The range finding method may include: sequentially A/D converting the image signals read at the image signal reading step into digital image data; and detecting a maximum value of the digital image data.

According to another aspect of the present invention, there is provided a range finding method including the steps of: dividing an image pickup area into a plurality of zones and measuring a contrast of each zone; detecting a zone where a main subject is located by comparing the contrast of each zone; and measuring a distance to a subject in the zone where the main subject is located.

If a plurality of zones are detected where main subjects are located at the step of detecting a zone where a main subject is located, the distance measuring step may measure the distances to subjects in a plurality of zones where the main subjects are located. In this case, an average of the measured distances to the subjects in the plurality of zones may be used as a distance to the plurality of main subjects, or the shortest distance to a subject among the measured distances to the subjects in the plurality of zones may be used as a distance to the plurality of main subjects.

After the step of detecting a zone where a main subject is located, the size of the zone is changed and the contrast measuring step and the step of detecting a zone where a main subject is located may be executed.

According to another aspect of the present invention, there is provided a range finder including: a pair of photosensor arrays having a number of photosensors disposed in line for generating an image signal corresponding to a received light amount, a subject being focused on the pair of photosensor arrays via spatially different optical paths; driving means for driving the photosensor arrays; signal processing means for generating a digital signal in accordance with the image signal generated by the photosensor; input/output means for transmitting an output signal from the signal processing means to an external device and receiving a command from the external device; command decoding means for analyzing the command inputted from the input/output means; and means for controlling the driving means in accordance with the command analyzed by the command decoding means.

The signal processing means may generate a contrast signal representing a contrast of a subject image by using the image signal.

The input/output means may include a shift register for receiving and sending input/output data one bit after another synchronously with a clock, and a counter for generating a carry-out signal by detecting that all bits of the input/output data have been received and sent.

The signal processing means may include means for sequentially and non-destructively reading the image signal at a plurality of consecutive pixels designated by the command.

According to another aspect of the present invention, there is provided a range finding method including the steps of: focusing a subject image on a pair of pixel arrays via spatially different optical paths and photoelectrically generating an image signal corresponding to a received light amount at each pixel; designating the range of pixels from which the image signal is read; measuring a contrast at the designated range; sequentially reading the image signal at each pixel in the designated range; and analyzing an externally supplied command to determine which step among the photoelectric conversion step, the image signal read range designating step, the contrast measuring step, and the image signal reading step.

According to another aspect of the present invention, there is provided a range finder including: a pair of pixel arrays having a number of pixels disposed in line, each pixel having a photosensor for generating an image signal corresponding to a received light amount, and a subject image being focused via spatially different optical paths on the pair of pixel arrays; image signal storing means provided for each pixel for storing the image signal generated by the photosensor; image signal reading means for non-destructively reading the image signal from the image signal storing means; a pair of received light amount detecting means for measuring the amounts of light applied to the pair of pixel arrays and detecting that the light amount reaches a predetermined value to stop an image signal generating operation of the photosensor; contrast calculating means for obtaining a contrast signal from the image signal read by the image signal reading means; signal level judging means for detecting and storing a maximum value of said image signals; and image signal transferring means for adding the image signal newly generated by the photosensor to the image signal stored in the image signal storing means without draining the latter image signal, if the contrast calculated by the contrast calculating means is lower than a contrast reference value and if the maximum value of the image signal detected by the signal level judging means is lower than a reference signal level.

According to another aspect of the present invention, there is provided a range finding method including the steps of: storing electric charges generated at each photosensor of a pair of photosensor arrays on which a subject is focused via spatially different optical paths; transferring and storing the electric charges in image signal storing means provided for each photosensor; storing electric charges newly generated by each photosensor; detecting a contrast and a maximum received light amount in accordance with the electric charges stored in the image signal storing means; and if the contrast and the maximum received light amount are equal to or smaller than reference values, cumulatively adding the newly generated electric charges to the electric charges stored in the image signal storing means.

According to another aspect of the present invention, there is provided a difference signal generator including: an operational amplifier having a first input terminal and a second input terminal, an analog reference voltage being applied to the second input terminal; a capacitor connected to the first input terminal of the operational amplifier at one electrode of the capacitor, an image signal at each pixel of a pixel array on which a subject image is focused being supplied sequentially to the other electrode of the capacitor, the image signal corresponding to a received light amount at each pixel, the capacitor storing electric charges corresponding to a voltage of the image signal; another capacitor for feeding back an output at an output terminal of the operational amplifier to the first input terminal; and a switch connected in parallel to the other capacitor for discharging the other capacitor.

According to another aspect of the present invention, there is provided a contrast calculation circuit including: a first input gate having an insulating gate structure formed on a semiconductor substrate, an analog reference voltage being applied to the first input gate; a second input gate formed adjacent to one end of the first input gate and having an insulating gate structure, the second input gate being sequentially inputted with a difference voltages between image signal voltages corresponding to received light amounts and generated at adjacent pixels among pixels of a pixel array, the second input gate measuring electric charges corresponding to the difference voltage and stored in a channel region under the second input gate when the difference voltage is higher than the analog reference voltage; a first input diode formed adjacent to the other end of the first input gate for injecting electrons in the channel region under the second input gate; charge/voltage converting means for sequentially storing the electric charges measured by the second input gate and generating a voltage corresponding to the amount of the electric charges; and first charge transfer means for transferring the electric charges measured by the second input gate to the charge/voltage converting means.

According to another aspect of the present invention, there is provided a range finder for sequentially reading an image signal corresponding to a received light amount at each pixel of a pair of pixel arrays on which a subject image is focused via spatially different optical paths, synchronously with an internal clock, converting the image signal into digital image data, setting the digital image data to a data output port, and transmitting the image data set to the data output port synchronously with an externally supplied data read clock signal, the range finder including a wait terminal for receiving a wait signal for stopping an operation of the image signal reading means sequentially reading the image signal, and internal clock signal stopping means for stopping the internal clock signal while the wait signal is applied to the wait terminal.

According to another aspect of the present invention, there is provided a range finder for converting an image signal corresponding to a received light amount at each pixel of a pair of pixel arrays on which a subject image is focused via spatially different optical paths, into digital image data and outputting the digital image data, the range finder having at least one MOS transistor for supplying a constant current, the range finder including a bias circuit having an input terminal for receiving a sleep signal for entering a low current consumption mode, the bias circuit responsive to the sleep signal supplying a gate voltage to the gate electrode of the MOS transistor for cutting off the constant current.

According to another aspect of the present invention, there is provided a temperature detection circuit including: a serial circuit of a plurality of polycrystalline silicon resistors, the serial circuit being supplied with a ground potential at one end thereof and a reference voltage at the other end thereof; a temperature detecting serial circuit of at least one or more polycrystalline silicon resistors and at least one or more impurity doped single crystal semiconductor resistors, the temperature detecting serial circuit being supplied with the ground potential at one end thereof and a current source at the other end thereof, the current source supplying the same quantity of current as flowing through the serial circuit; and relative potential detecting means for detecting a value of the potential at one connection point between resistors of the serial circuit relative to the potential at one connection point between resistors of the temperature detecting serial circuit.

A frame is divided into a plurality of zones and a contrast at each zone is measured to estimate the zone where a main subject is located. A distance to the main subject in the zone is measured to focus the subject. In this manner, even if a main subject is not at the central area of the frame, the main subject can be focused without directing the front of the camera correctly toward the main subject.

Even if there are a plurality of main subjects, it is possible to focus a subject at the nearest position or focus a subject in accordance with an average value of distances to the plurality of main subjects. In this manner, a subject can be focused flexibly with the subject conditions.

By changing the size of each divided zone of a frame, a subject can be focused flexibly with the subject conditions.

By storing an image signal at each photosensor and reading it non-destructively, it becomes possible to read the image signal a plurality of times if a photoelectric conversion operation is performed once. With a single photoelectric conversion operation, the image signal can be read a plurality of times, such as reading the image signal for a subject contrast, for range finding, and for other purposes.

As pixel data is read, a maximum value of signal levels of the read image signals can be detected. It is therefore possible to judge whether a photoelectric conversion operation is required to be performed again.

The range finder performs various operations in accordance with a command inputted from the camera body. For example, it is possible to measure a distance to a main subject by measuring contrasts of a plurality of frame zones and by designating the zone where the main subject is located. By changing programs of the microcomputer in the camera body, it becomes possible to detect the zone for which range finding is performed, to change the size of the zone for which range finding is performed, and to perform other operations.

By changing programs of the microcomputer in the camera body, it becomes possible to select a range finding method satisfying the user's requirements. It is therefore possible to mount the range finder on cameras of various types including high grade camera and general cameras.

Data is transferred to and from a camera body by serial communications, reducing the number of connection terminals.

If a single integration operation for storing an image signal corresponding to a received light amount cannot supply sufficient electric charges, newly generated electric charges can be added cumulatively to the previously stored electric charges without draining the latter charges, because an electrical signal corresponding to the stored electric charges can be obtained without draining the electric charges.

In the cumulative integration operation, it is possible to adjust the cumulative integration time in accordance with the electric charges stored by the first integration operation. It is therefore possible to minimize the number of integration operations and cumulative integration operations, shortening the range finding time.

The difference signal generator can generate a difference signal corresponding to a difference between image signals at adjacent pixels, by using sequentially inputted pixel image signals. By sequentially inputting the difference signal to the contrast calculation circuit, it becomes possible to obtain a signal corresponding to a sum of absolute values of difference signals.

This signal is proportional to a contrast. In this manner, a contrast of a subject zone can be measured. A zone of a main subject can be identified by dividing a frame into a plurality of zones and measuring a contrast of each zone. Even if a main subject is not located at the central area of a frame, a distance to the main subject can be measured and the subject can be focused.

If the external device cannot receive data for some reason, the sequential read operation of the image signal is temporarily terminated by supplying the wait signal to prevent data from being lost when not being read. If the period of the external device receiving data is shorter than the period of sequentially reading image data, the wait signal is supplied to prevent data from being lost when not being read.

By turning off MOS transistors which supply constant current to the range finder, consumption current during a standby period of the range finding process is reduced. If the range finder is driven by a battery, the lifetime of the battery can be prolonged.

A temperature can be detected, reliably irrespective of a change in the analog reference voltage, by allowing the same quantity of current to flow through the resistor serial circuit for generating a reference voltage as in the serial circuit of resistors having a temperature dependency. By using the temperature detector with a phase difference detection type range finder with sensor arrays formed on a semiconductor substrate, it becomes possible to compensate for a change in the triangulation base length with temperature. It is therefore possible to perform range finding under environments with a wide temperature range.

BRIEF DESCRIPTION OF THE DRAWINGS

FIG. 9A is a plan view of one pixel of a CCD of the embodiment range finder, and FIG. 9B is a cross sectional view of the pixel with its potential energy distribution, taken along one-dot chain line A–A'.

FIG. 10 is a timing chart explaining the CCD drive timings.

FIGS. 11A to 11E illustrate the potential energy distribution explaining a CCD integration start operation.

FIGS. 13A to 13E illustrate the potential energy distribution explaining a CCD charge transfer operation.

FIG. 27 is a table showing a relationship between a digital pixel data level and a flag data bit.

FIG. 31A is a timing chart explaining an integration operation, and FIG. 31B is a timing chart explaining a prescan operation.

FIG. 32A is a timing chart explaining a cumulative integration operation, and FIG. 32B is a timing chart explaining a main scan operation.

DETAILED DESCRIPTION OF THE PREFERRED EMBODIMENTS

The principle of a method of measuring a subject distance according to an embodiment of the invention will be described with reference to FIGS. 2A to 2D.

Figures 2A, 2C:
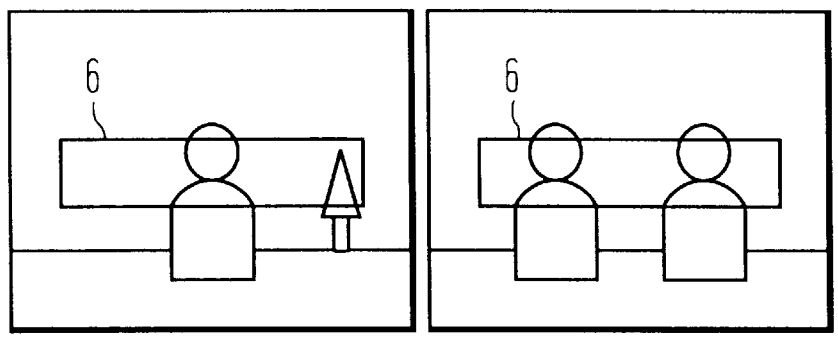
FIGS. 2A and 2C are front views of frames explaining a range finding method according to an embodiment of the invention.

FIG. 2A shows a frame with a main subject generally at the central area, and FIG. 2C shows a frame with two main subjects at the right and left areas and without any main subject at the central area. A laterally elongated rectangle 6 at the middle of the frame indicates a contrast measurement area.

A contrast at the contrast measurement area 6 is first measured prior to range finding. Examples of measured contrast values in the area 6 are shown by curves in FIGS. 2B and 2D. The curve in FIG. 2B indicates that a central area at the main subject has a high contrast and an area at the right in the far field has a low contrast. The curve in FIG. 2D indicates that the right and left areas at the main subjects have high contrasts and the frame central area has a low contrast.

Figures 2B, 2D:
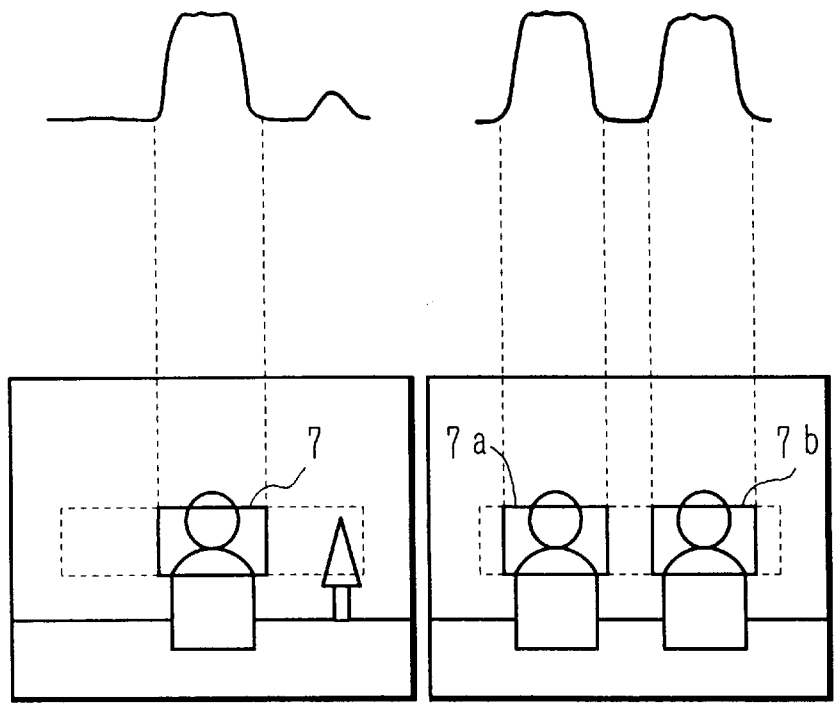
FIGS. 2B and 2D are front views and contrast curves of the frames.

In the case of FIG. 2B, range finding is performed for the high contrast area 7 at the frame central area. In the case of FIG. 2D, range finding is performed for one of two high contrast areas 7a and 7b at the right and left, or may be performed for both the areas to use an average value thereof.

Since a contrast is measured for a relatively broad area of a frame and a distance is measured only for a selected area having a high contrast, it is possible to focus a main subject with a high probability. This method is particularly effective for the case such as shown in FIG. 2C in which a main subject is not positioned at the frame central area.

Figure 1A:
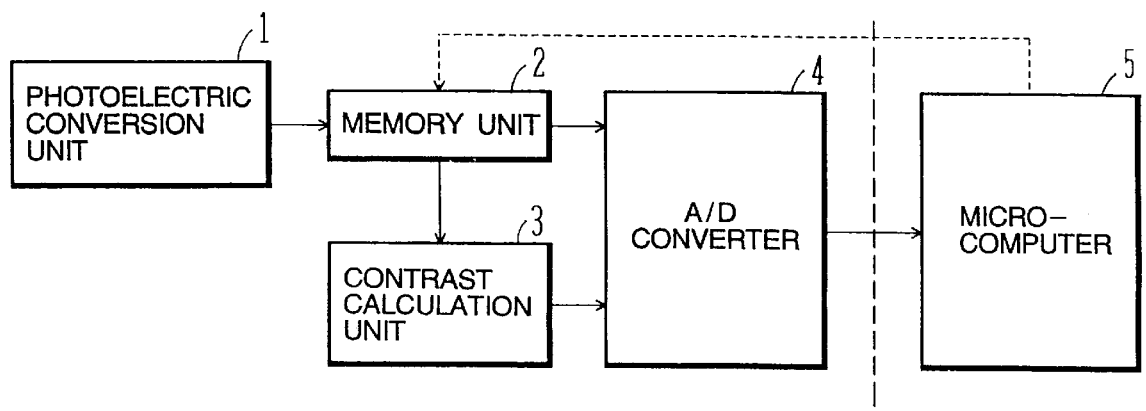
FIG. 1A is a schematic block diagram showing a range finder according to an embodiment of the invention.
Figure 1B:
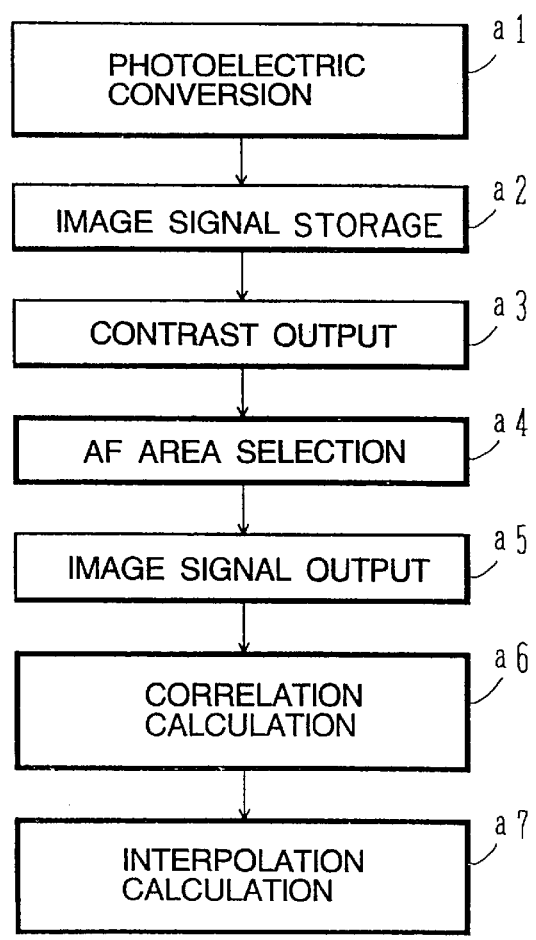
FIG. 1B is a flow chart briefly explaining the operation of the range finder of the embodiment.

Next, a range finder according to an embodiment of the invention and its operation will be briefly described. FIG. 1A is a block diagram of a circuit arrangement of a range finder mounted on a camera, and FIG. 1B is a flow chart explaining the outline of the operation of the range finder.

The range finder is constituted by a photoelectric conversion unit 1, a memory unit 2, a contrast calculation unit 3, and an A/D converter 4 which is connected via an interface port (not shown) to a microcomputer 5 housed in the camera body.

The operation of the range finder will be described with reference to FIG. 1B. The photoelectric conversion unit 1 has a plurality of pixels disposed in line and generates an electric signal (image signal) corresponding to a received light; amount (Step a1). The generated image signal is stored in the memory unit 2 in the form of analog signal (Step a2). Specifically, electric charges generated at the photoelectric conversion unit 1 are transferred by a CCD and accumulated in MOS capacitors. Pixels, CCDs, and MOS capacitors are coupled by gate circuits and formed near each other on a single semiconductor substrate.

The contrast calculation circuit 3 receives image signals of adjacent pixels stored in the memory unit 2, and outputs an electric signal (contrast information) (Step a3). The contrast information is supplied to the A/D converter 4 and converted into a digital signal which is supplied to the microcomputer 5 housed in the camera body.

The microcomputer 5 selects an area containing a main subject by referring to the supplied contrast information (Step a4). Generally, a main subject is supposed to be present at a highest contrast area. The microcomputer 5 requests the memory unit 2 to transfer image signals at the selected area.

The image signals in the memory unit 2 requested by the microcomputer 5 are transferred via the A/D converter 5 to the microcomputer 5 (Step a5).

The microcomputer 5 calculates correlation factors, using the supplied image signals (Step a6). In accordance with the calculated correlation factors, an interpolation calculation is performed to calculate a distance to the subject (Step a7).

Figure 3:
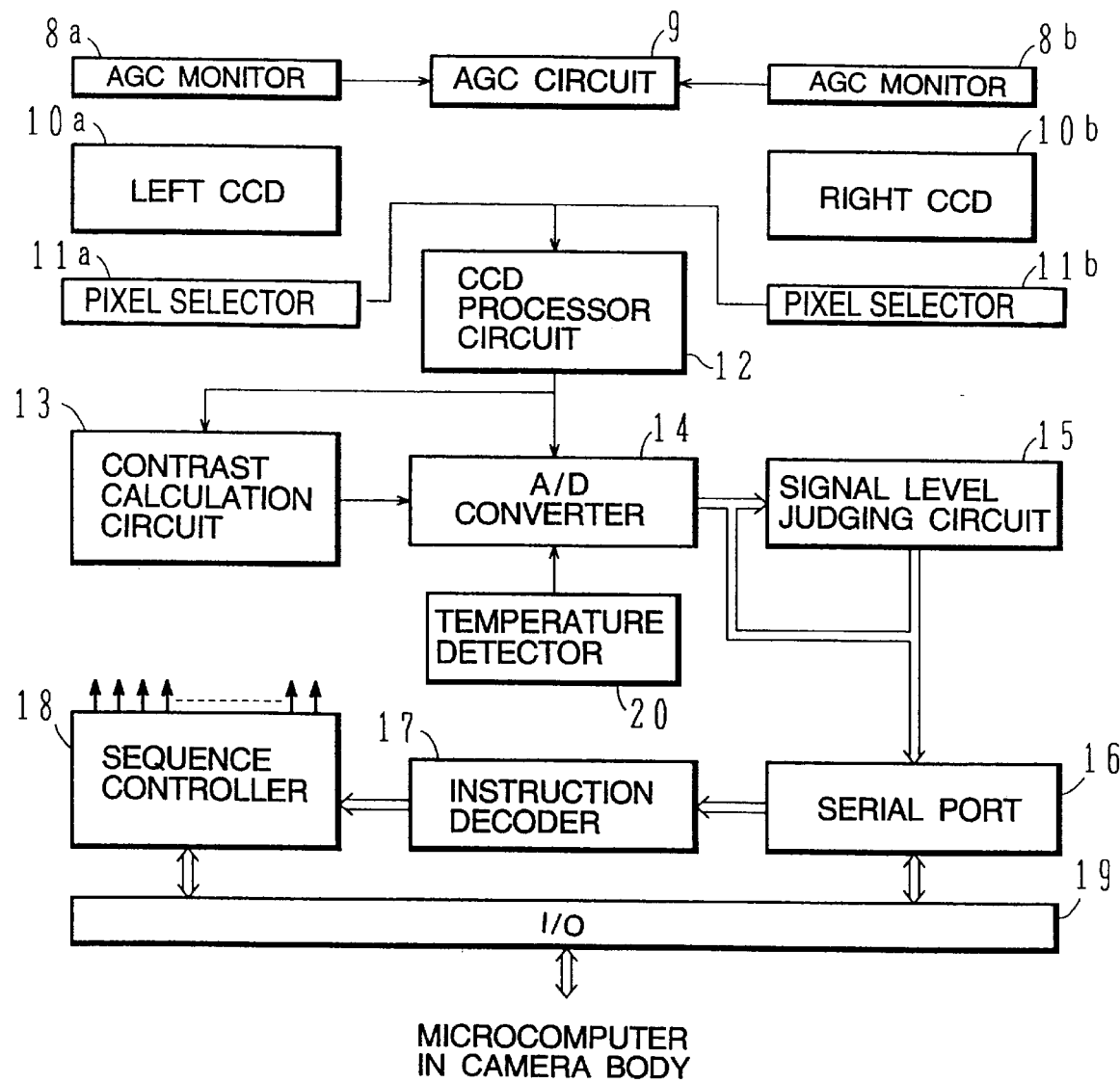
FIG. 3 is a block diagram showing the structure of a range finder according to an embodiment of the invention.

FIG. 3 is a detailed block diagram of the range finder shown in FIG. 1A.

CCDs 10a and 10b are each constituted by a plurality of pixels disposed in line. Each pixel has a light receiving element for receiving light and generating electric charges corresponding to a received light intensity, and a memory for storing an image signal obtained by integrating generated electric charges for a predetermined time. Image signals stored in memories form an image signal train corresponding to a light intensity distribution. CCDs 10a and 10b are left and right CCDs for defining a triangulation base line with the vertex at the subject position.

AGC (automatic gain control) monitors 8a and 8b are disposed near CCDs 10a and 10b and each being constituted by a single light receiving element having a length generally equal to the length of CCD. The AGC monitors 8a and 8b are used for controlling the time of integrating electric charges generated by the left and right CCDs 10a and 10b. Light corresponding in amount to the light applied to all the pixels of CCDs 10a and 10b is being applied to the AGC monitors 8a and 8b which output corresponding electric signals. By dividing this electric signal by the number of pixels of the corresponding CCD, an average value of light amounts at each pixel can be obtained.

An AGC circuit receives the electric signals corresponding to received light amounts from the AGC monitors 8a and 8b, and compares them with a predetermined reference value to judge an end of charge integration by CCDs 10a and 10b. That; is to say, the integration operation is stopped when the average value of light amounts at pixels of each of CCDs 10a and 10b becomes the predetermined reference value.

Pixel selectors 11a and 11b select pixels of CCDs 10a and 10b from which a signal is read. Specifically, each pixel selector is formed by a shift register which sequentially scans and designates pixels disposed in line. A number of consecutive pixels are divided into a plurality of pixel groups. Scan start and end positions can be identified by designating each pixel group.

Image signals stored in the memories of the anapixels selected by the pixel selectors 11a and 11b are read and sent to a CCD signal processor circuit 12. Image signals stored in pixel memories are read non-destructively without erasing them. Accordingly, a single photoelectric conversion process (integration process) allows to read image signals a plurality of times.

By repeating the integration operation by CCDs 10a and 10b, the image signal stored at the previous integration operation may be maintained stored without initializing them (hereinafter referred to as cumulative storage).

The CCD signal processor circuit 12 processes the image signal read via the pixel selectors 11a and 11b, to perform such as wave-shaping and amplifying. The wave-shaped and amplified image signal is inputted to a contrast calculation circuit 13 and an A/D converter 14.

The contrast calculation circuit 13 is sequentially supplied with image signals from the CCD signal processor circuit 12, the image signals being for the pixels among those of the CCDs 10a and 10b within the scan area designated by the pixel selectors 11a and 11b. contrast calculation circuit 13 calculates an absolute value of a difference between the image signals of adjacent pixels, and sequentially adds absolute values. This addition signal corresponds to a contrast at the scanned area. The contrast signal is sent to the A/D converter 14 each time a selected pixel group is scanned. In this manner, the contrast signal for each pixel group is obtained. By performing a plurality of scan operations, contrasts at a plurality of frame areas can be obtained.

The contrast signal is converted into a digital signal by the A/D converter 14 and supplied via a serial port 16 and an input/output circuit 19 to the microcomputer housed in the camera body.

The image signal of each pixel is also inputted directly to the A/D converter 14 and converted into a digital signal. The digital image signal is then supplied to the microcomputer in the camera body via the serial port 16 and the input/output circuit 19. The digital image signal is also supplied to a signal level judging circuit 15.

The signal level judging circuit 15 detects a maximum output level of the image signal at a pixel to which a maximum light amount is being applied, among image signals at pixels within the scan area, and stores it. This maximum output level is supplied as flag data to the microcomputer in the camera body via the serial port 16 and the input/output circuit 19.

This flag data is used for judging whether cumulative integration is performed or not. Specifically, while all pixels of CCDs 10a and 10b are scanned to select a maximum contrast area, an integration operation is stopped when an average of output values of image signals of all pixels becomes the predetermined reference value. Therefore, if a light amount at the area where a subject is not present is large, for example, in the case of rear light, a relative light amount at the area where the subject is present becomes small, being unable to provide a sufficient dynamic range for range finding. In order to prevent this, the flag data is used for determining whether cumulative integration is performed.

The serial port 16 converts a parallel contrast signal, a parallel image signal, and other parallel signals into a serial signal which is supplied via the input/output circuit to the microcomputer in the camera body.

All operations of the range finder described above, such as designating an operation mode, a scan start position, a scan end position, a scan start are conducted by a command input of the microcomputer in the camera body. The command is supplied via the input/output circuit 19 to the serial port 16.

An instruction decode circuit 17 decodes a command inputted from the microcomputer. In accordance with a decoded command, a sequence controller 18 generates various timing signals to be used at each circuit block of the range finder.

A temperature detector 20 detects a temperature of the substrate on which CCDs 10a and 10b are formed, and converts it into an electrical signal which is supplied to the A/D converter 14. The temperature signal is then converted into a digital signal and transferred via the serial port 16 and the input/output circuit 19 to the microcomputer in the camera body.

The housing of the range finder is made of plastics. As the plastics are expanded by heat, the space between the left and right CCDs 10a and 10b changes and the triangulation base line length changes. Therefore, in order to calculate a correct distance, it is necessary to compensate for a change in the base line by using the temperature detected by the temperature detector 20 at the time of range finding.

Figure 8:
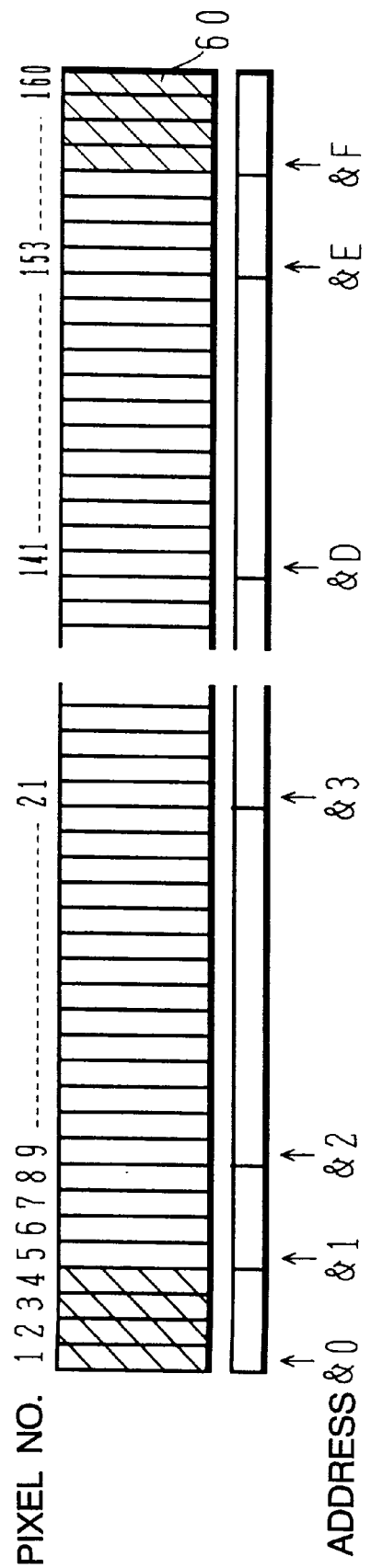
FIG. 8 is a schematic front view of a CCD of the embodiment range finder explaining the layout of CCD pixels and the allocation of addresses.

FIG. 8 shows the structure of CCDs 10a and 10b and the relationship between pixels and scan addresses. CCDs 10a and 10b are each constituted by 160 pixels disposed in line. Eight pixels at opposite ends among 160 pixels are dummy pixels which are not used for range finding. One hundred and forty four pixels excepting sixteen pixels at opposite ends are used for range finding. The 144 pixels are divided into 12 pixel groups each having consecutive 12 pixels. The 12 pixel groups are assigned addresses from &2 to &D (hexadecimal).

Four pixels (black dummy pixels) at opposite ends are shielded by a metal film or the like at their light receiving areas. These black dummy pixel groups are assigned address of &0 and &F. The pixel groups of four pixels (white dummy pixels) at the inner sides of the black dummy pixels are assigned addresses of &1 and &E.

By using 16 addresses from &0 to &F, a desired pixel group can be designated. The eight pixels at opposite ends are not used for range finding because the characteristics such as sensitivity may differ between pixels at inner areas and at opposite end areas.

FIGS. 9A and 9B are enlarged views for explaining one pixel. FIG. 9A is a plan view of one pixel, other pixels being disposed under and above the one pixel as viewed on the drawing sheet. FIG. 9B shows a cross sectional view taken along line A–A' of FIG. 9A, and shows a potential energy distribution in the substrate surface shown in the cross sectional view. A clear gate CLG and a clear drain CLD are formed at the area displaced from the one-dot chain line A–A' in the plane view. However, they are also shown in the cross sectional view for the convenience of explanation. In this context, although a storage gate ST is shown separated in the cross sectional view, this gate ST is a single entity.

On the surface of a p-type substrate 50, an $n^-$-type buried channel 51 is formed which is surrounded by $p^+$-type regions 52a and 52b. At one end of the buried channel 51 on the $p^+$-type regions 52a side, an $n^+$-type overflow drain OFD is formed. Since the $p^+$-type regions 52a and 52b form potential barriers for electrons, electrons accumulated near in the substrate surface are transferred in the direction of the one-dot chain line A–A' only within the $n^-$-type region 51.

An overflow gate OFG having an insulating gate structure is formed between a light receiving or photodetector region PD and the overflow drain OFD. The overflow gate OFG is supplied with a predetermined voltage in order to form a potential barrier for electrons generated in the light receiving region PD. The overflow drain OFD is always applied with a power source voltage to flow electrons passing over the potential barrier formed in the channel region under the overflow gate OFG, into the overflow drain OFD.

Between the light receiving region PD and the p$^+$-type region 52b, a barrier gate BG, a storage gate ST, a transfer gate TG, a first CCD gate $\phi_1$, a second CCD gate $\phi_2$, and a floating gate FG, respectively of an insulating gate structure are formed in this order from the light receiving region PD side, slightly overlapping each other while ensuring insulation.

The clear gate CLG and the clear drain CLD of the insulating structure are formed at the area where the storage gate ST is formed, being displaced from the one-dot chain line A–A'. The clear drain CLD is always applied with the power source voltage so that the potential energy for electrons (hereinafter simply represented by potential energy) of the clear drain CLD becomes lower (high electric potential) than that of the channel region (storage region) under the storage gate ST.

Therefore, all electrons accumulated in the storage region can be drained in the clear drain CLD by applying a positive voltage to the clear gate CLG and lowering the potential energy of the channel region under the clear gate CLG than that of the storage region.

Over the floating gate Fg, a gate FG2 connected to a ground potential is formed with an interlayer insulating film interposed therebetween. The floating gate FG and the gate FG2 form a capacitor. It is therefore possible to prevent a large change in the potential of the floating gate FG on the interlayer insulating film when a signal charge is injected.

The floating gate FG is connected via a MOS transistor TR1 to a floating gate bias voltage FGB, and via a MOS transistor TR2 to an inverting input terminal of an operational amplifier AMP1. The gate electrode of the MOS transistor TR1 is connected to a gate voltage CE. The gate electrode of the MOS transistor TR2 is connected to a selection terminal KCn of each pixel selector 11a, 11b as will be later described with FIG. 15.

The non-inverting input terminal of the operational amplifier AMP1 is connected to an analog reference voltage Vref. An output of the operational amplifier AMP1 is fed back to the inverting input terminal via a parallel circuit of a capacitor C1 and a switch SW1 which is controlled by a preset signal PR. The operational amplifier AMP1 outputs a signal CCDOUT. Therefore, a switched capacitor circuit using the operational amplifier outputs a signal corresponding to a change in the potential of the floating gate FG.

Next, commands to be inputted from the microcomputer in the camera body will be described. Each command is formed by 8 bits including an operation code of 4 bits and an operand of 4 bits.

The function of each command will be detailed below.

A PGC command is a command for controlling each gate of CCDs 10a and 10b, and is used when the range finder itself is tested or a cumulative integration is performed. The operation code is "0001" and the operand designates a desired combination of three types of bgc, cgc, and tgc. When bgc is designated, the barrier gate BG of the charge transfer region of each CCD 10a, 10b is turned on. Similarly, when cgc or tgc, is designated, the clear gate CLG or the transfer gate TG is turned on.

An RGC command is also a command for controlling each gate of CCDs 10a and 10b, and is used when the range finder itself is tested. The operation code is "0010" and the operand designates a desired combination of four types of p1c, p2c, fgc, and cec. When p1c is designated, the $\phi_1$ gate of the read region of each CCD 10a, 10b is turned on. Similarly, when p2c, fgc, or cec is designated, the $\phi_2$ gate, floating bias gate FGB, or gate bias CE is turned on.

An MDC command is a command for controlling each operation mode of the range finder. The operation code is "0011" and the operand designates a desired combination of three types of slp, eoi, and agc.

When slp is designated, the range finder enters a sleep mode during which a consumption current of the range finder is reduced as much as possible. The range finder is constructed of analog elements such as operational amplifiers, digital elements such as logical circuits, and CCDs. Of these elements, logical circuits are made of CMOSs so that current consumption rarely occurs when a clock supply is stopped. CCDs flow no current when the gates are turned off. Therefore, in order to reduce consumption current, it is sufficient if current flowing through a constant current source for analog elements is stopped. During the sleep mode, current flowing through the constant current source is stopped to reduce the consumption current of the range finder as much as possible.

When sip=0 is designated, the range finder enters a normal mode which allows an ordinary contrast calculation, range finding, and other operations.

When eoi=0 is designated, the range finder enters an EOI (end of integration) mode during which an EOI signal is allowed to be outputted from a service request terminal SRQ connected to the microcomputer in the camera body. After the initial setting of the range finder, this mode automatically starts. Upon detection of the EOI signal from the service request terminal SRQ, the microcomputer in the camera body can advance the control to the next process.

When eoi=1 is designated, the range finder enters an EOC (end of conversion) mode which outputs an EOC signal indicating either a command execution completion or an A/D conversion end, from the service request terminal SRQ. When this mode is entered, the microcomputer in the camera body can detect a completion of the command execution and transmits the next command. Alternatively, after a scan operation, an end of A/D conversion can be detected to allow scanned data to be received from the serial port 16.

Whether the EOC signal indicates a command execution completion or an end of A/D conversion can be discriminated from the command last executed. However, there is no means for discriminating between the EOI signal and the EOC signal outputted from the service request terminal SRQ, it is necessary for the MDC command to preliminary set the EOI mode or the EOC mode.

When agc=0 is designated, the range finder enters a normal mode which automatically terminates the integration operation. During this mode, the AGC circuit 9 operates and the integration operation is automatically stopped when a predetermined amount of received light is detected.

When agc=1 is designated, the operation enters a test mode which does not automatically terminate the integration operation. During this mode, the AGC circuit 9 stops its operation, and the integration operation can be stopped externally. This mode is used when light receiving elements of CCDs 10a and 10b are tested or for other purposes.

A TRT command is a command for transferring electric charges accumulated in light receiving elements of pixels of CCDs 10a and 10b. The operation code is "0100" and the operand has no parameter.

An SCT command is a command for instructing to start scanning. The operation code is "0101" and the operand designates parameters of m/p, l, and r.

m/p=0 means an execution of a prescan at which the calculation results of contrasts of each pixel group of CCD 10a, 10b are read.

m/p=1 means an execution of a main scan at which the image signal of each pixel of CCD 10a, 10b is read.

At l=1 and r=0 the left CCD 10a is scanned, and at l=0 and r=1 the right CCD 10b is scanned.

At l=0 and r=0, a dummy scan is executed which is performed by applying a predetermined voltage to the contrast calculation circuit 13 and is used for the following purpose.

The contrast calculation circuit 13 is made of analog amplifiers whose outputs have offsets. In calculating a contrast in each scan area, such an offset is cumulatively added during the number of integration operations. The dummy scan is performed to eliminate the influence of offsets. The dummy scan provides an integration of cumulatively added offsets. By subtracting the integration of offsets from the integration results of contrasts by the normal scan, it is possible to obtain the integration result regarding only contrast.

At l=1 and r=1, temperature information is read which is used, as described previously, to compensate for a change in the triangulation base line length.

An SAS command is a command for setting a scan start address. The operation code is "1000" and the operand of 4 bits designates one of 16 addresses.

An EAS command is a command for setting a scan end address. The operation code is "1001" and the operand of 4 bits designates one of 16 addresses similar to the SAS command.

A GNS command is a command for setting gains of the CCD signal processor circuit 12 and the contrast calculation circuit 13. The operation code is "1010" and the operand designates a desired combination of two types of cds and con by using two bits, and four gain levels by the remaining two bits. At cds=1 the gain of the CCD signal processor circuit 12 is set, and at con=1 the gain of the contrast calculation circuit 13 is set.

An ALS command is a command for setting the level of the AGC circuit 9. The operation code is "1011" and the operand designates 1/r by one bit, and four levels by the remaining three bits. At 1/r=1 the level for the left AGC monitor 8a is set, and at 1/r=0 the level for the right AGC monitor 8b is set.

This command is used, for example, when a subject person on a stage illuminated with spot light is photographed. Since the main subject person is brighter than the background, if the integration operation continues until the average of light amounts at pixels reaches the predetermined reference value, the image signal of pixels at the main subject area overflows. In such a case, the integration operation is required to be performed again at a lower reference value.

Conversely, in the case of a subject in rear light having a bright background, if the integration operation is terminated when the average of light amounts at pixels reaches the predetermined reference value, the image signal at the main subject area is too weak. If the cumulative integration is repeated, although image signals are superposed and a sufficiently strong image signal can be obtained, the number of cumulative integrations increases. In such a case, the cumulative integration is performed by raising a reference value so that an image signal sufficiently strong for range finding can be obtained by at least two cumulative integrations.

An HLT command is a command for forcibly terminating the scan operation. The operation code is "1110" and the operand has no parameter. This command is used when the microcomputer in the camera body accepts an interruption before it receives a response after the scan operation.

An SWR command is a command for an execution of a software reset. The operation code is "1111" and the operand has no parameter. Upon a software reset, the image signal stored in CCDs 10a and 10b are initialized and the integration operation starts. The reference value of the AGC circuit 9, the gain of the CCD signal processor circuit 12, and other set values are not initialized.

When a reset signal is received from a reset terminal connected to the microcomputer in the camera body, the integration operation starts also. However, in the case of this reset signal, the reference value of the AGC circuit 9, the gain of the CCD signal processor circuit 12, and other set values are all initialized. Therefore, if an integration operation is resumed by changing the reference value of the AGC circuit 9, the software reset is used.

Next, the details of the structure and function of each circuit block of the range finder will be given below.

Figure 4:
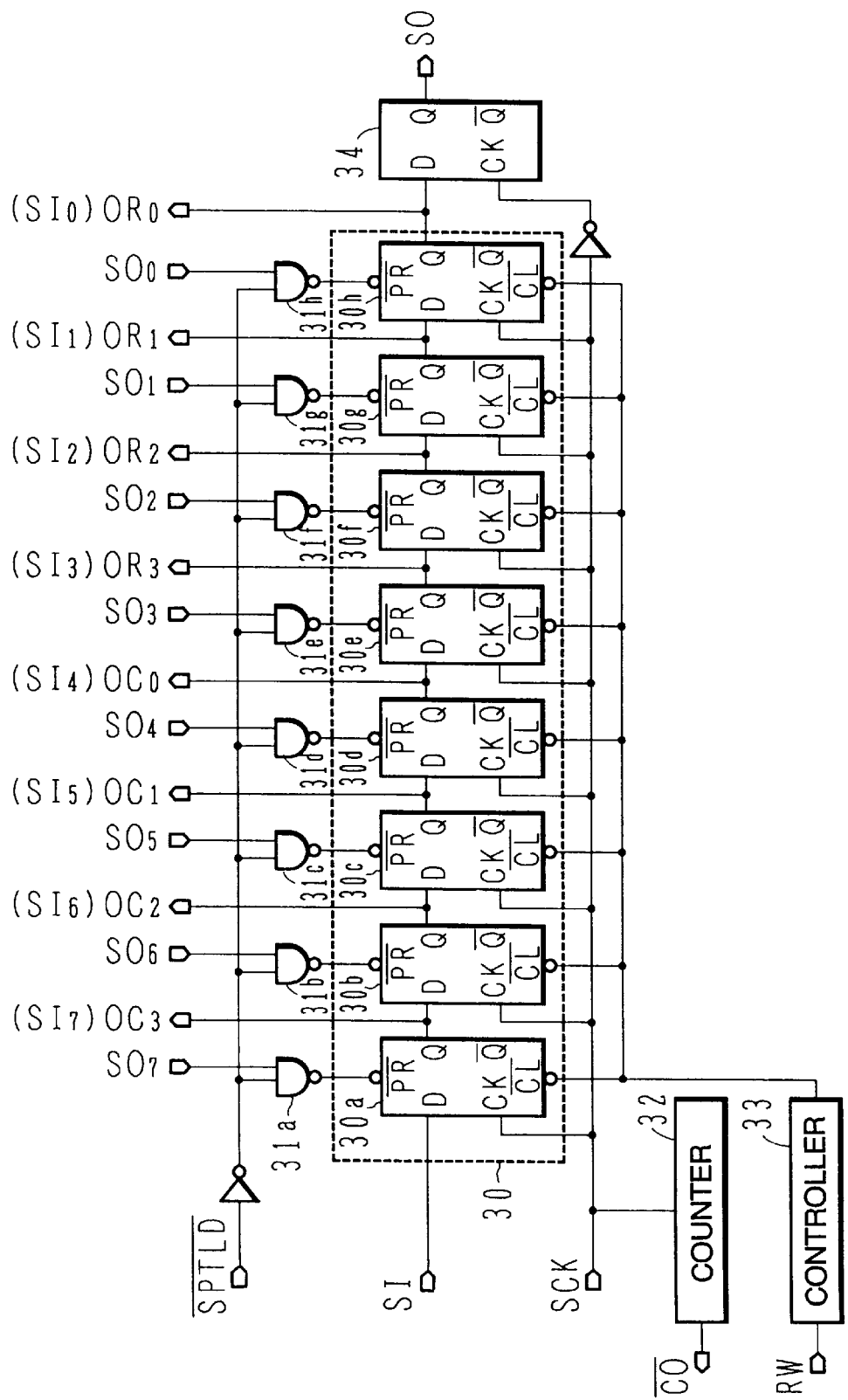
FIG. 4 is a circuit diagram of a serial port of the range finder of the embodiment.

FIG. 4 is a circuit diagram of a serial port 16. Eight flip-flops 30a to 30h are serially connected to form an 8-bit shift register 30. A serial input signal SI is supplied from the microcomputer in the camera body to a D terminal of the first stage flip-flop 30a.

A serial clock is supplied from the microcomputer in the camera body to each a CK terminal of the flip-flops 30a to 30h. Input data $SI_7$ to $SI_0$ are outputted from Q terminals of the flip-flops 30a to 30h supplied to the other blocks in range finder.

Parallel data $SO_7$ to $SO_0$ from the range finder are supplied to one input terminals of NAND gates 31a to 31h, and a serial port load signal SPTLD is supplied to the other input terminals of the NAND gates 31a to 31h. Outputs of the NAND gates 31a to 31h are supplied to (–PR) terminals of the flip-flops 30a to 30h. The (–) sign indicates a negative logic.

A controller 33 is supplied with a read/write discrimination signal RW from the microcomputer in the camera body. In response to the read/write discrimination signal RW, the controller 33 outputs a clear signal to (–CL) terminals of the flip-flops 30a to 30h.

A counter 32 is supplied with a serial clock SCK, counts the clock pulses, and outputs a carry-out signal (–CO) when eight pulses are counted.

The Q terminal of the flip-flop 30h is connected to the D terminal of a flip-flop 34. The CK terminal of the flip-flop 34 is supplied with an inverted signal of the serial clock SCK. From the Q terminal of the flip-flop 34, a serial output signal SO is sequentially outputted synchronously with the serial clock SCK.

Figure 5:
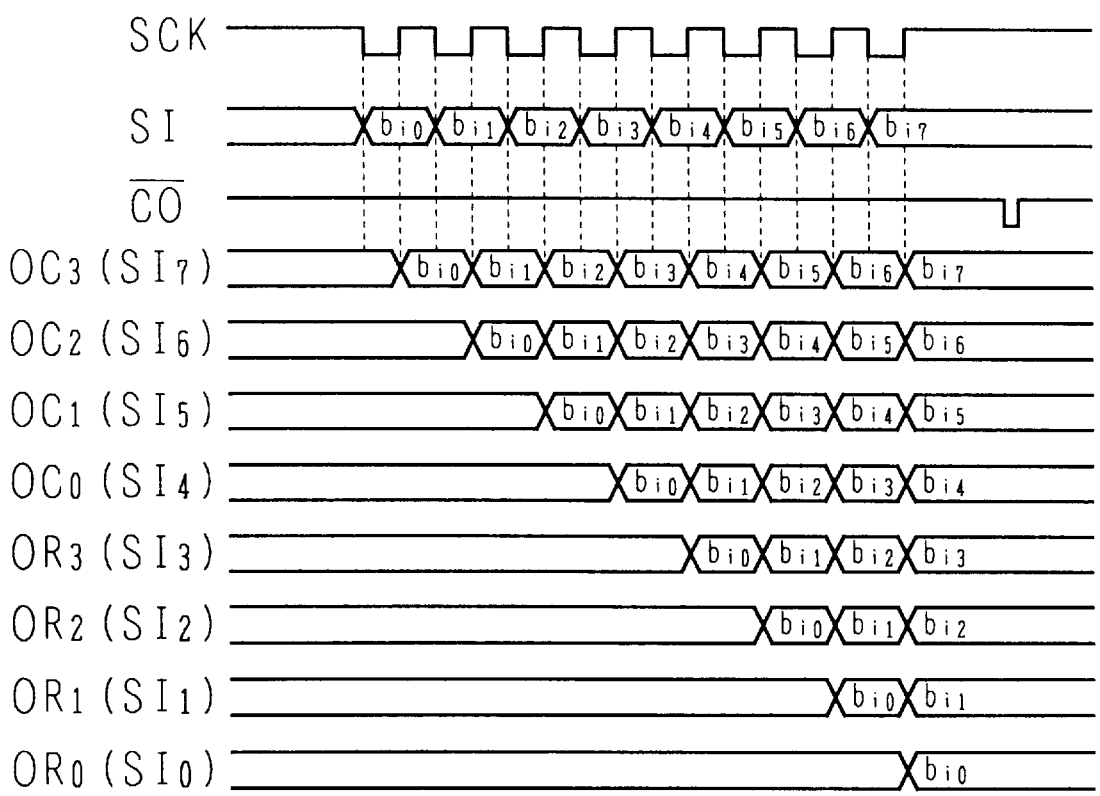
FIG. 5 is a timing chart when data is inputted from the serial port.

FIG. 5 is a timing chart explaining the operation of the serial port 16 when a serial input signal SI is supplied from the microcomputer in the camera body. The microcomputer supplies the serial clock SCK and inputs the serial input signal SI synchronously with the serial clock SCK. Input data $bi_0$ to $bi_7$ are therefore sequentially supplied.

The 0-th bit data $bi_0$ of the input data is latched by the flip-flop 30a synchronously with the serial clock. The first and following bits are sequentially latched synchronously with the serial clock, and at the same time each latched bit is sequentially shifted in the shift register 30.

When eight pulses of the serial clock are counted, the counter 32 outputs the carry-out signal (–CO). At this time, the flip-flops 30a to 30h have latched the input data bits $bi_7$ to $bi_0$. That is to say, the input data $SI_7$ to $SI_0$ indicates the states of the bits $bi_7$ to $bi_0$ inputted from the microcomputer in the camera body.

The upper four bits $bi_7$ to $bi_4$ represent the operation code of the command and the lower four bits $bi_3$ to $bi_0$ represent the operand. In order to make the operation code and the operand distinctive, the input data $SI_7$ to $SI_4$ are represented by $OC_3$ to $OC_0$ and the input data $SI_3$ to $SI_0$ are represented by $OR_3$ to $OR_0$, where applicable.

Figure 6:
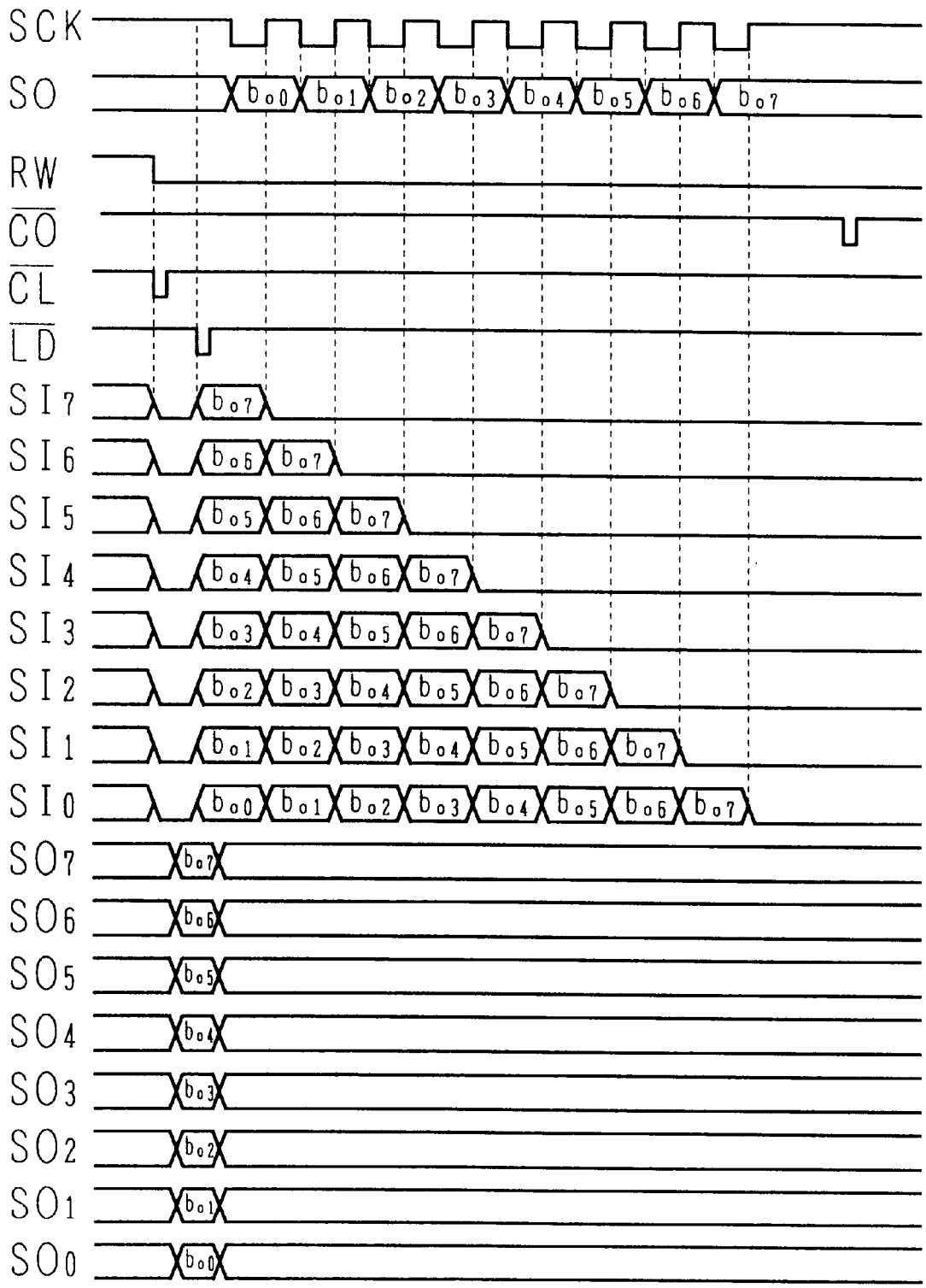
FIG. 6 is a timing chart when data is outputted from the serial port.

FIG. 6 is a timing chart explaining the operation of the serial port 16 when an output data is supplied to the microcomputer in the camera body from the range finder. In response to a fall of the read/write discrimination signal RW requesting a data output, the controller 33 supplies the clear signal (−CL) to the flip-flops 30a to 30h. The flip-flops 30a to 30h and the data $SI_7$ to $SI_0$ at their Q terminals are initialized.

The bits $bo_7$ to $bo_0$ of the output data $SO_7$ to $SO_0$ are latched by the flip-flops 30a to 30h when the serial port load signal SPTLD is applied. As a result, the output data bits $bo_7$ to $bo_0$ appear at the Q terminals $SI_7$ to $SI_0$ of the flip-flops 30a to 30h.

When the first pulse of the serial clock SCK is applied, the data $SI_0$ at the Q terminal of the flip-flop 30h is latched by the flip-flop 34 and the output data bit $bo_0$ appears as the output data SO. At the same time, the data latched by the flip-flops 30a to 30g is shifted in the shift register 30.

In the above manner, when the second and following pulses are applied, the output data bits $bo_1$ to $bo_7$ are sequentially outputted as the output data SO. When all bits are outputted, the counter outputs the carry-out signal (−CO).

Figure 7:
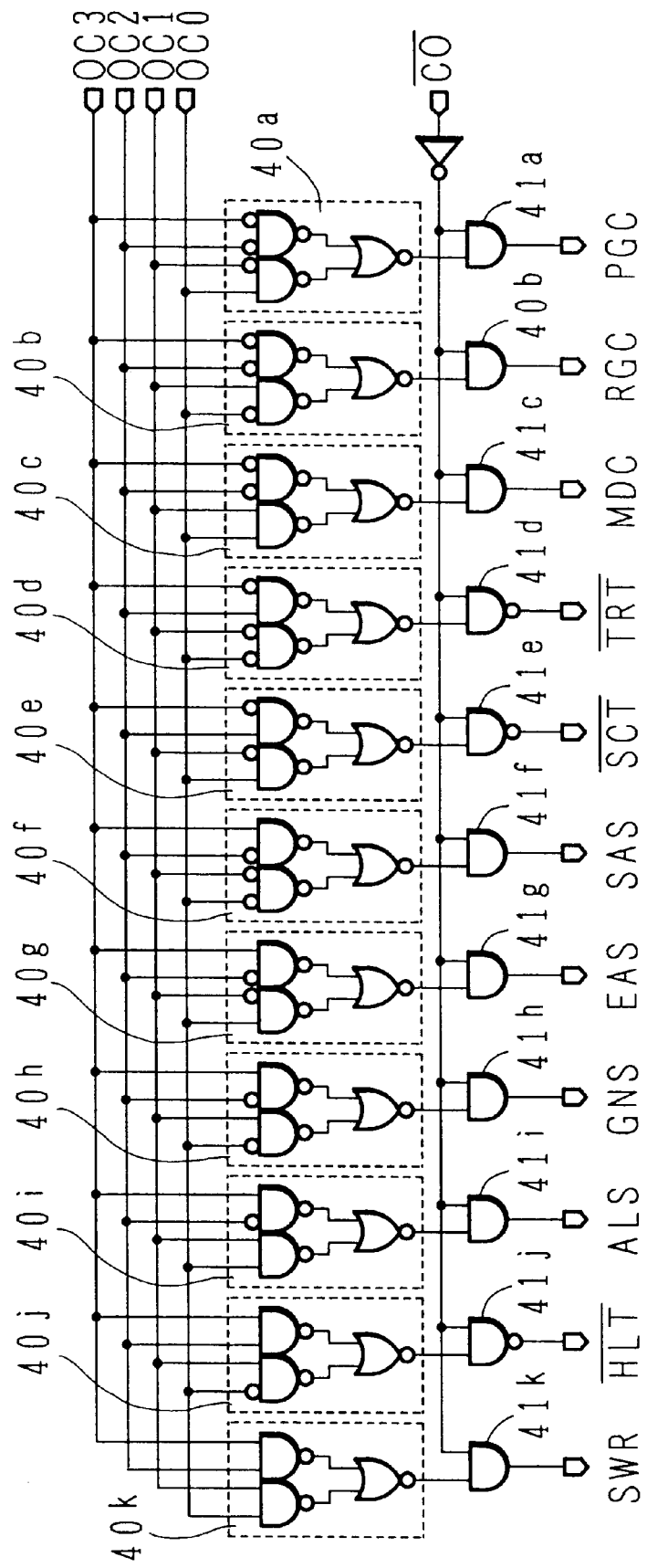
FIG. 7 is a circuit diagram of an instruction decoder of the range finder of the embodiment.

FIG. 7 is a circuit diagram of the instruction decoder 17. The input data $OC_3$ to $OC_0$ corresponding to the operation code of the input command is supplied from the serial port 16 to the instruction decoder 17. The carry-out signal (−CO) is also supplied from the serial port 16.

The operation code $OC_3$ to $OC_0$ supplied from the serial port 16 is decoded by decoders 40a to 40k each formed by NAND gates and a NOR gate, and the decoded results are inputted to one input terminals of AND or NAND gates 41a to 41k.

To the other input terminals of the AND or NAND gates 41a to 41k, a carry-out signal CO is supplied. Therefore, the operation code decoded by the decoders 40a to 40k is outputted as one of signals PGC, RGC, MDC, (−TRT), (−SCT), SAS, EAS, GNS, ALS, (−HLT), and SWR, corresponding to the inputted command.

The decoded signal of the operation code is inputted to the sequence control circuit 18 which generates timing signals necessary for respective circuit blocks of the range finder in accordance with the decoded signal of the operation code.

Next, the operation of CCDs 10a and 10b will be described. FIG. 10 is a drive timing chart of CCDs 10a and 10b shown in FIGS. 8, 9A, and 9B. FIGS. 11A to 11E illustrate the potential energy distribution explaining the integration start operation.

First, as shown in FIG. 10, the barrier gate BG, clear gate CLG, and gate voltage CE are maintained in a high voltage state (in an on-state). The transfer gate TG, first CCD gate $\phi_1$, second CCD gate $\phi_2$, and floating gate bias voltage FGB are maintained in a low voltage state (in an off-state) (FIG. 11A).

Under this condition that the barrier gate BG and clear gate CLG are in an on-state, electrons continuously generated at the light receiving region PD are drained to the clear drain CLD via the storage region. Since the gate voltage CE is in the high voltage state, the MOS transistor TR1 is turned on and the floating gate bias voltage FGB is applied to the floating gate FG.

Next, the transfer gate TG, first CCD gate $\phi_1$, and second CCD gate $\phi_2$ are turned on at the same time, and the floating gate bias voltage FGB is changed to the high voltage state (FIG. 11B). The floating gate bias voltage FGB takes an intermediate value between the positive voltage applied to the transfer gate TG and other gates and a ground potential. Therefore, the potential energy at the channel from the transfer gate TG to the floating gate FG has a step at the boundary between the second CCD gate $\phi_2$ and the floating gate FG.

Next, the floating gate bias voltage FGB, second CCD gate $\phi_2$, first CCD gate $\phi_1$, and transfer gate TG are sequentially turned on in this order recited (FIGS. 11C and 11D). It is therefore possible to drain electrons accumulated in the channel from the transfer gate TG to the floating gate FG, to the clear drain CLD.

The potential energy at the channel from the transfer gate TG to the floating gate FG is not perfectly even and has some unevenness because of variations of manufacturing processes. Also in such a case, it is possible to discard accumulated electrons almost fully by sequentially turning off starting from the floating gate FG, as described above.

Next, the clear gate CLG is turned off (FIG. 11E). Electrons do not flow therefore from the storage region to the clear drain CLD, and electrons generated at the light receiving region are accumulated in the storage region. In this manner, electric charges corresponding to the received light amount are accumulated in the storage region of each pixel.

Figure 12A:
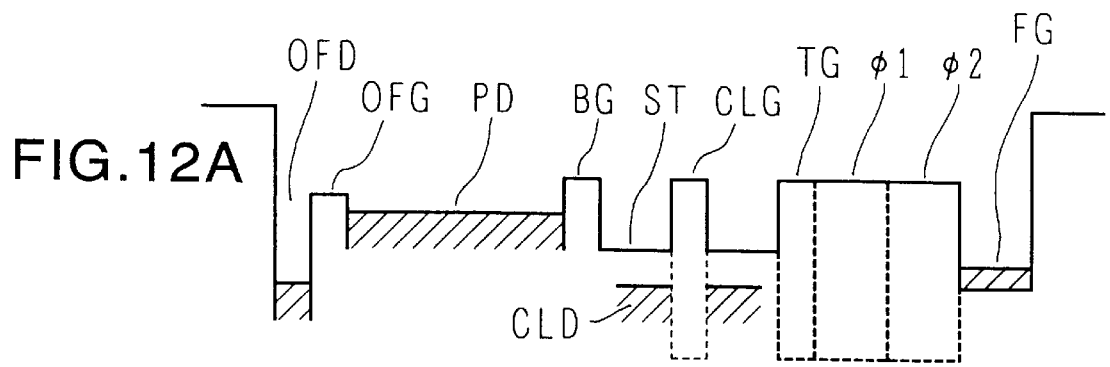
FIGS. 12A to 12C illustrate the potential energy distribution explaining a CCD cumulative integration start operation.
Figure 12B:
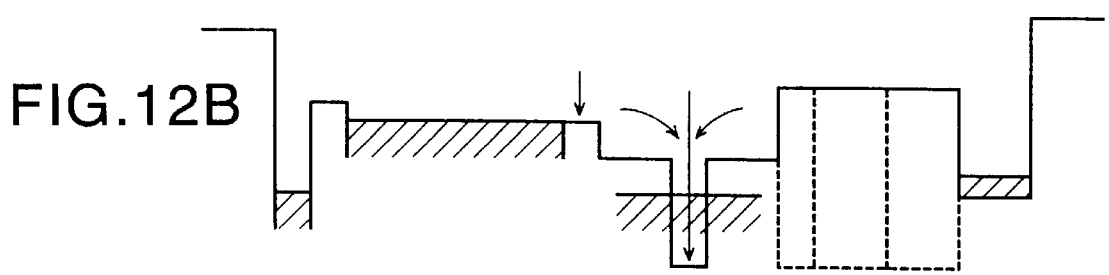
Figure 12C:
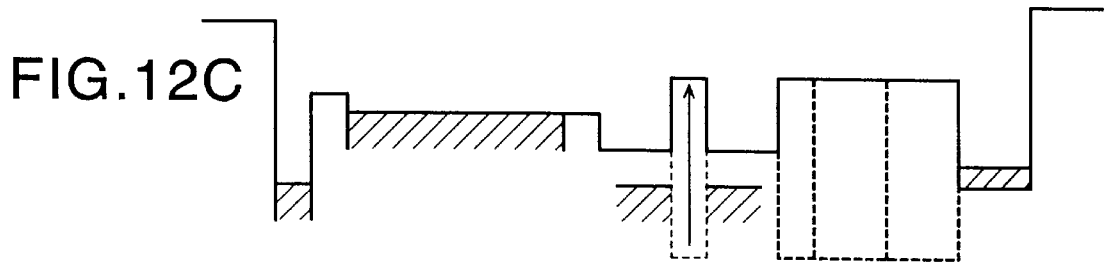

FIGS. 12A to 12C illustrate the potential energy distribution explaining a cumulative integration start operation performed when accumulated electric charges are insufficient. Electric charges have already been accumulated by the previous integration operation at the channel region under the floating gate FG.

The barrier gate BG and clear gate CLG are turned on to drain all electric charges accumulated in the storage region to the clear drain CLD (FIG. 12B). Next, the clear gate CLG is turned off to store the electric charges generated in the light receiving region PD, in the storage region. This new integration operation can be performed without draining the electric charges accumulated in the channel region under the floating gate FG by the previous integration operation.

FIGS. 13A to 13E illustrate the potential energy distribution explaining the charge transfer operation. As shown in FIG. 13A, the barrier gate BG is turned off to stop the integration operation. A potential barrier is therefore formed between the light receiving region PD and the storage region, preventing electrons generated in the light receiving region PD from flowing into the storage region. Electrons generated under a constant incidence of light are drained to the overflow drain OFD, by passing over the potential barrier formed at the channel region under the overflow gate OFG.

Next, the transfer gate TG, first CCD gate $\phi_1$, second CCD gate $\phi_2$, and floating gate bias voltage FGB are turned on (FIG. 13B). The potential energy at the channel under the gate electrode lowers so that the electric charges accumulated in the storage region are transferred to the channel region under the transfer gate TG, first CCD gate $\phi_1$, and second CCD gate $\phi_2$.

If the cumulative integration operation is to be performed, the electric charges accumulated by the previous integration operation at the channel region under the floating gate FG are also transferred to the channel region under the transfer gate TG, first CCD gate $\phi_1$, and second CCD gate $\phi_2$.

Next, the transfer gate TG, first CCD gate $\phi_1$, and second CCD gate $\phi_2$ are sequentially turned off (FIGS. 13C and 13D). The electric charges accumulated under these gates are transferred to the channel region under the floating gate FG. In this manner, a new integration operation stores electric charges corresponding to the received light amount in the channel region under the floating gate FG. A cumulative integration operation after the previous integration operation stores the total charges corresponding to the previous and present light amounts in the channel region under the floating gate FG.

Figure 14A:
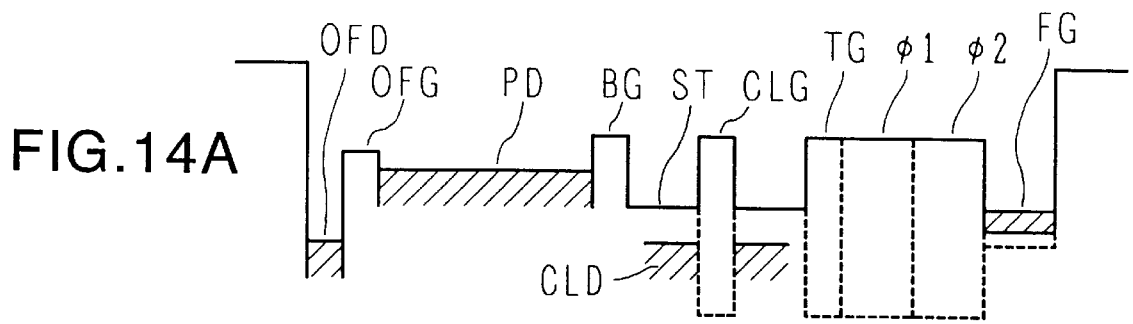
FIGS. 14A to 14D illustrate the potential energy distribution explaining a CCD scan start operation.
Figure 14B:
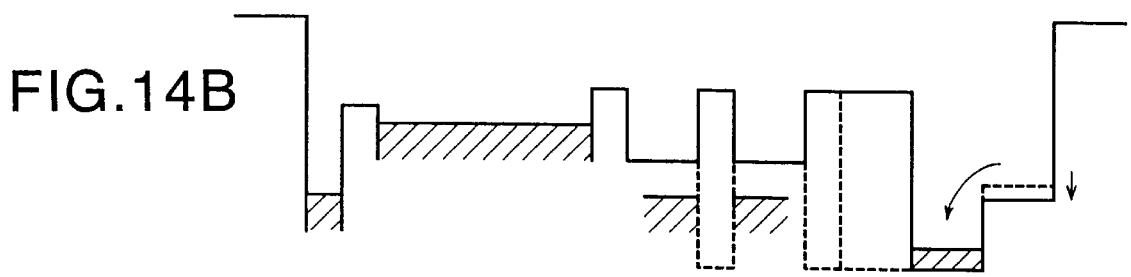
Figure 14C:
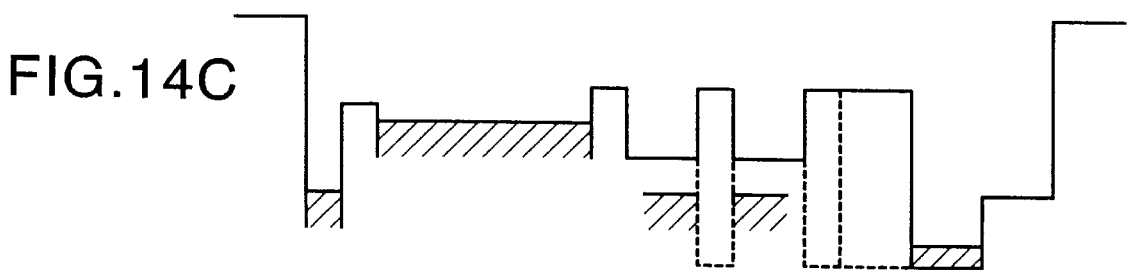

FIGS. 14A to 14D illustrate the potential energy distribution explaining the scan start operation. FIG. 14A shows the potential energy distribution when the charge transfer operation was completed. Electric charges corresponding to the received light amount is being accumulated in the channel region under the floating gate FG. The second CCD gate $\phi_2$ is turned on (FIG. 14B). The electric charges accumulated in the channel region under the floating gate FG are therefore transferred to the channel region under the second CCD gate $\phi_2$. Next, the gate voltage CE is changed to the low voltage state, and the MOS transistor TR1 is turned off (FIG. 14C). The floating gate FG enters therefore a floating state.

Figure 14D:
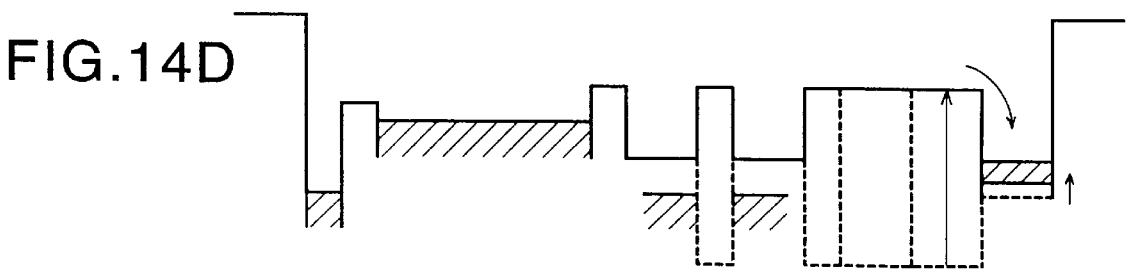

Next, the second CCD gate $\phi_2$ is turned off (FIG. 14D). The electric charges accumulated in the channel region under the second CCD gate $\phi_2$ are therefore transferred again to the channel region under the floating gate FG. As a result, the potential energy at the channel region under the floating gate FG rises and at the same time the electric potential of the floating gate lowers. In this manner, the electric potential of the floating gate FG changes with the received light amount of each pixel.

Next, a method of picking up an electric potential of the floating gate as a CCD output will be described with reference to FIG. 9B. First, the switch SW1 is temporarily closed by using the preset signal PR to short-circuit the non-inverting terminal and output terminal and discharge the capacitor C1. The output level is therefore reset to an analog reference voltage Vref.

The gate voltage KCn of a pixel to be read is changed to the high voltage state to turn on the MOS transistor TR2 and set the floating gate FG to the analog reference voltage Vref. At this time, electric charges in the floating gate FG change corresponding to a change in the voltage thereof. The electric charges charge the capacitor C1 via the MOS transistor TR2 and a voltage corresponding to the charges in the capacitor C1 is outputted as CCDOUT.

Figure 15:
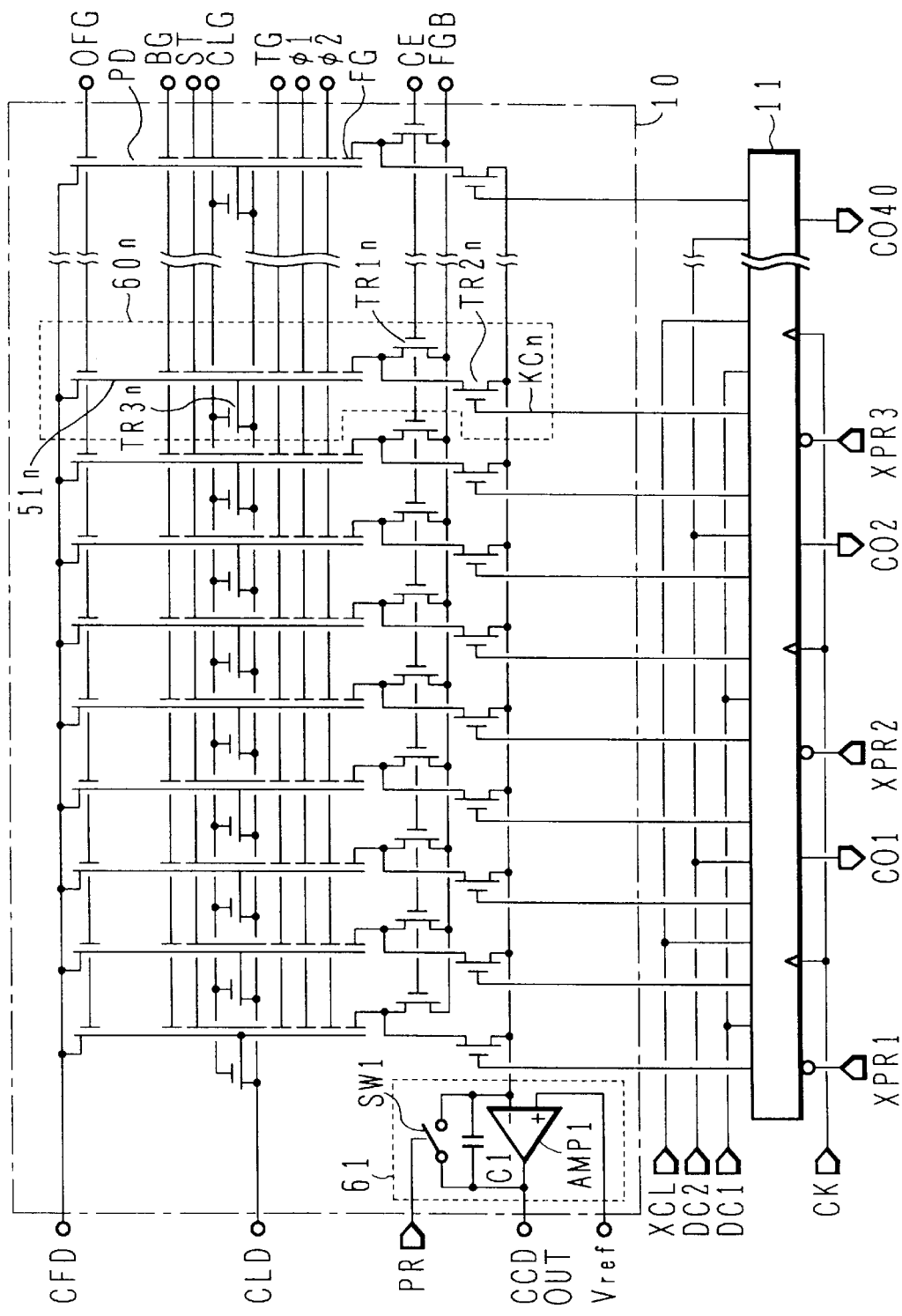
FIG. 15 is a circuit diagram of a CCD of the range finder according to an embodiment of the invention.

FIG. 15 shows a CCD 10 and a pixel selector 11. CCD 10 is constituted by 160 pixels disposed in line and an image signal read circuit 61. The gate electrode of the MOS transistor TR2 of each pixel is connected to the pixel selector 11 which supplies a select signal KC to a pixel from which an image signal is read.

Each pixel has the same structure. The operation will be described by using the n-the pixel 60n by way of example. As described with FIG. 9B, one end of the buried channel 51n is connected to the overflow drain OFD. The overflow gate OFG, barrier gate BG, storage gate ST, clear gate CLG, transfer gate TG, first CCD gate $\phi_1$, and second CCD gate $\phi_2$ are used in common for all pixels. The storage region under the storage gate ST of the buried channel 51 is connected via a MOS transistor TR3n to the clear drain CLD.

The floating gate FG is connected via a MOS transistor TR1n to the floating gate bias voltage FGB. The gate electrode of the MOS transistor TR1n is supplied with the gate voltage CE which is used in common for all pixels.

Since the gate voltage is supplied to all pixels, the integration start operation, charge transfer operation, scan start operation can be executed at the same time for all pixels.

The drains of the MOS transistors TR2 of all pixels are connected in common to the inverting input terminal of an operational amplifier AMP1. The gates of the MOS transistors TR2 are independently connected to the pixel selector 11. Therefore, only the MOS transistor TR2n selected by the pixel selector 11 turns on, and only the image signal of this pixel is supplied to the inverting input terminal of the operational amplifier AMP1. The image signal is then outputted from the operational amplifier AMP1 as CCDOUT.

Next, the pixel selectors 11a and 11b be described with reference to FIGS. 16 to 19. Since both the pixel selectors 11a and 11b have the same structure, one of the pixel selectors will be described.

Figure 16:
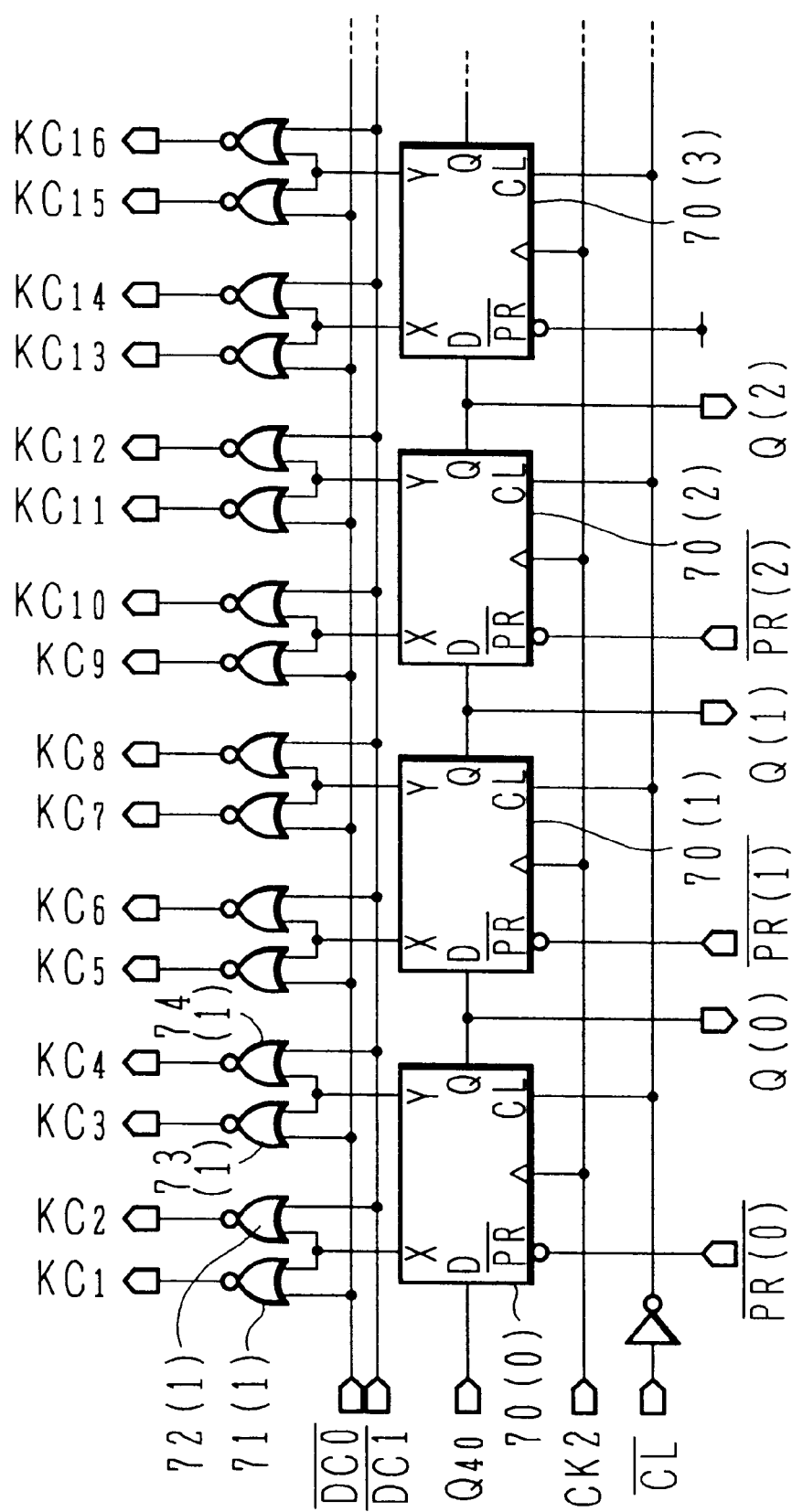
FIG. 16 is a circuit diagram of a shift register of the pixel selector of the range finder according to an embodiment of the invention.

FIG. 16 shows part of shift registers of the pixel selector. Shift registers 70(0) to 70(39) are serially connected. Of these shift registers, the shift registers 70(0) to 70(3) are shown. An X terminal of the shift register 70(m) is connected to ones of input terminals of NOR gates 71(m) and 72(m). A Y terminal of the shift register 70(m) is connected to ones of input terminals of NOR gates 73(m) and 74(m).

The others of the input terminals of the NOR gates 71(m) and 73(m) are supplied with a timing signal (−DC0), and the others of the input terminals of the NOR gates 72(m) and 74(m) are supplied with a timing signal (−DC1).

CL terminals of the shift registers 70(0) to 70(39) are supplied with a clear signal CL which will be later described with FIG. 19, so that all the shift registers can be initialized at the same time.

The shift register 70(m) for outputting a select signal KC (4m+1) for selecting one of pixels at the scan start or end addresses, such as 1st, 5th, 9th, 21st, . . . , 141st, 153rd, and 157th pixels, is supplied with a preset signal (−PR(i)) for setting a scan start. Actually, the scan stops at the pixel which is one pixel before that of the end address.

For example, in the case of the 9th pixel having an address of &2, a preset signal (−PR(2)) for the address &2 is supplied to the preset terminal (−PR) of the shift register 70(2) which outputs a select signal KC(9). The shift register 70(3) is not used for the pixel at the scan start or end position so that its preset terminal (−PR) is always pulled up to the high level.

By presetting the shift register 70(m) at the scan start position, the high level moves sequentially starting from the top select signal KC (m+1) synchronously with a clock CK2.

A Q terminal of the shift register 70(m) for outputting the select signal KC (4m+1) to the pixel at the scan start or end position is connected to a scan end detector 80 to be described later with FIG. 19. The Q terminal of the shift resister 70(m) corresponding to the current scan position takes the high level, and supplies a scan address signal Q(n) shown in FIG. 19 to the scan end detector 80. The scan end detector 80 compares the current scan position with the scan end address to detect a scan end.

Figure 17:
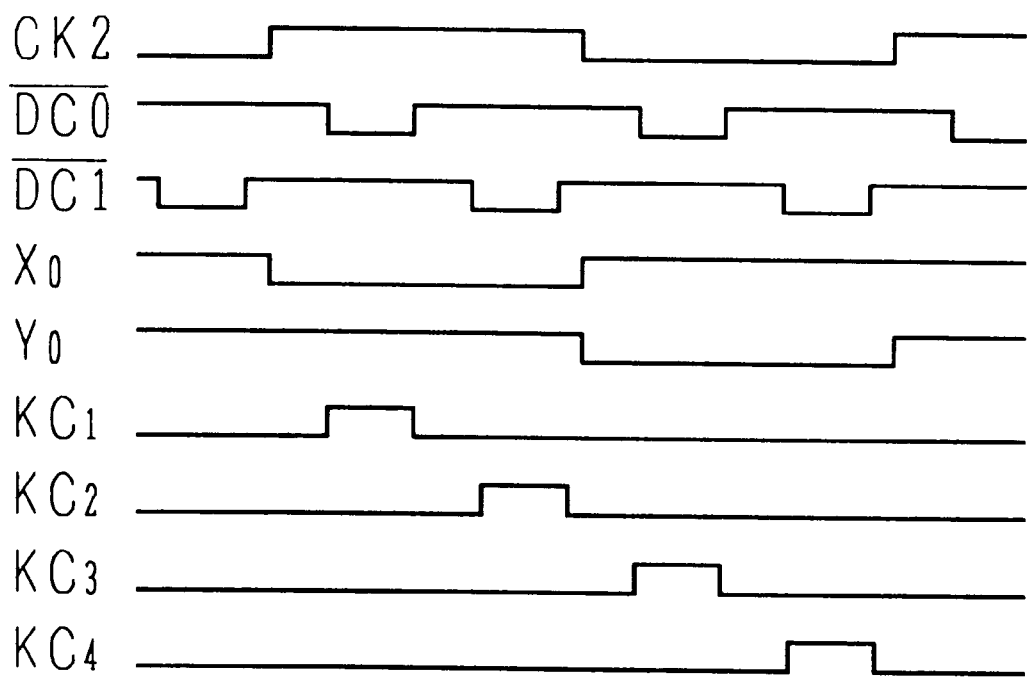
FIG. 17 is a timing chart explaining the operation of the pixel selector.

FIG. 17 is a timing chart explaining how one shift register 70(m) generates four select signals KC (4m+1) to KC (4m+4). The timing signals (–DC0) and (–DC1) generate pulses mutually having a phase difference of 180 degrees. FIG. 17 shows the state wherein the shift register 70(0) is preset.

When the shift register 70(0) is preset, an output X0 at the X terminal takes the low level. When the timing signal (–DC0) takes thereafter the low level, the select signal KC(1) takes the high level. At this time the timing signal (–DC1) keeps the high level so that the select signal KC(2) keeps the low level. Since an output Y0 at the Y terminal keeps the high level, both the select signal KC(3) and KC(4) keep the low level.

The timing signal (–DC0) is controlled to always take the low level earlier than the timing signal (–DC1) after the preset.

When the timing signal (–DC0) takes the high level, the select signal KC(1) takes the low level. When the timing signal (–DC1) next takes the low level, the select signal KC(2) takes the high level.

Synchronously with the clock CK2, the output X0 at the X terminal takes the high level and the output Y0 at the Y terminal takes the low level. Thereafter, similar to the above description, the select signals KC(3) and KC(4) sequentially take the high level synchronously with the timing signals (–DC0) and (–DC1). In the above manner, with a combination of the clock CK2 and the timing signals (–DC0) and (–DC1), one shift register 70(m) can generate four select signals.

In this embodiment, shift registers 70 are juxtaposed with CCDs 10a and 10b on the same substrate. A CCD pixel pitch is generally about 24 μm. If one shift register is used for one select signal, the shift register is required to be formed within the width of 24 μm, which is practically difficult.

In this embodiment, one shift register generates four select signals. Therefore, one shift register can be formed within the width of 96 μm, being easy to design a pattern.

Figure 18:
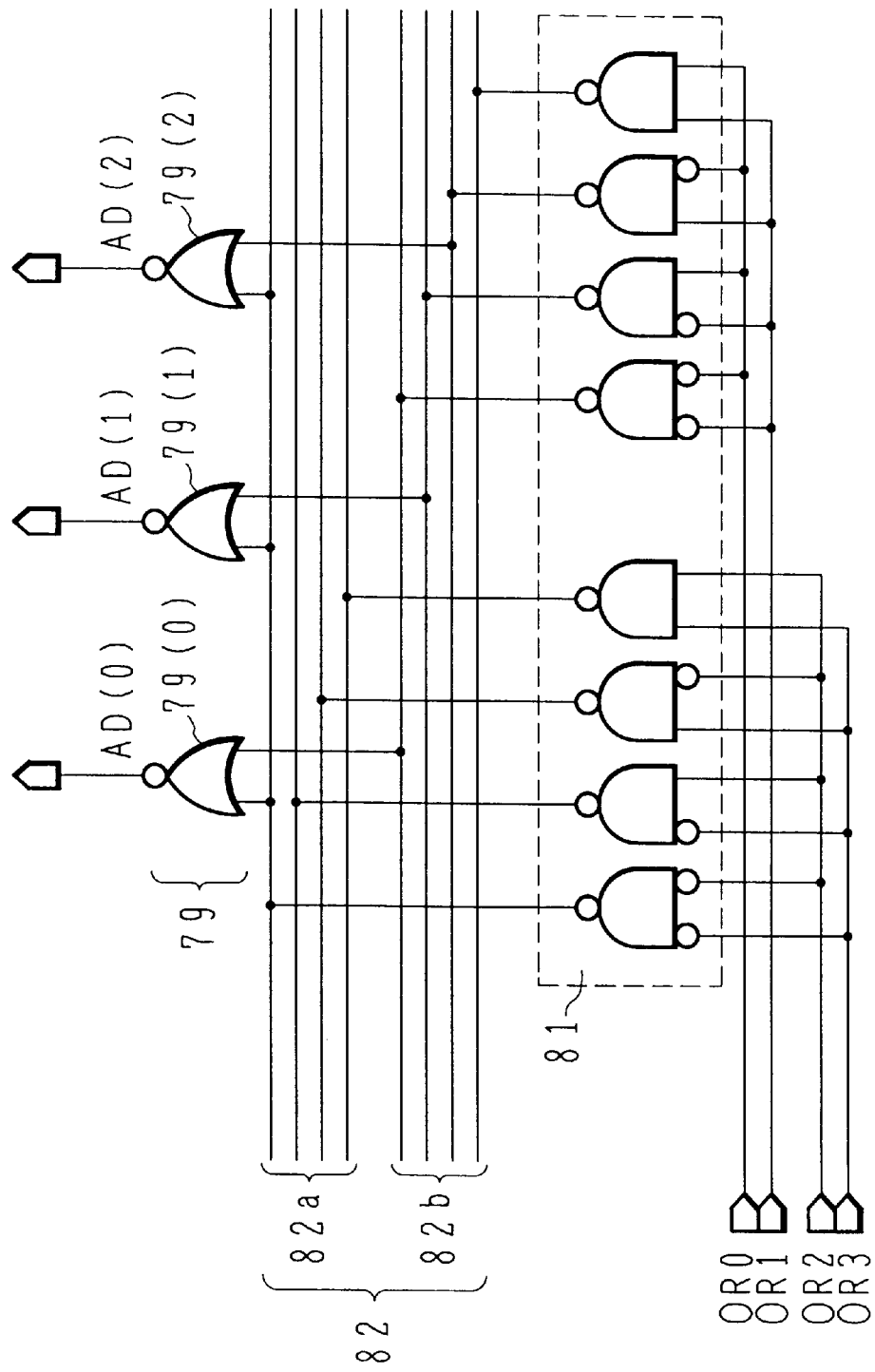
FIG. 18 is a circuit diagram of the address decoder of the pixel selector of the range finder according to an embodiment of the invention.

FIG. 18 shows part of an address decoder of the pixel selector 11. An input command operand of OR3 to OR0 is supplied to a NAND group 81 made of eight NAND gates. The NAND group 81 outputs decode signals to four upper bit decode lines 82a and four lower bit decode lines 82b.

Each NOR gate 79 is supplied with two predetermined outputs on the upper and lower bit decode lines 82a and 82b to generate an address signal AD(i). For example, in the case of the operand of "0010", two signals of "0 (low level)" state are supplied to the NOR gate 79(2) and the address signal AD(2) becomes "1 (high level)".

Sixteen NOR gates 79 are provided. The address signal AD(i) can be set to the high level by designating a desired address by the operand.

Figure 19:
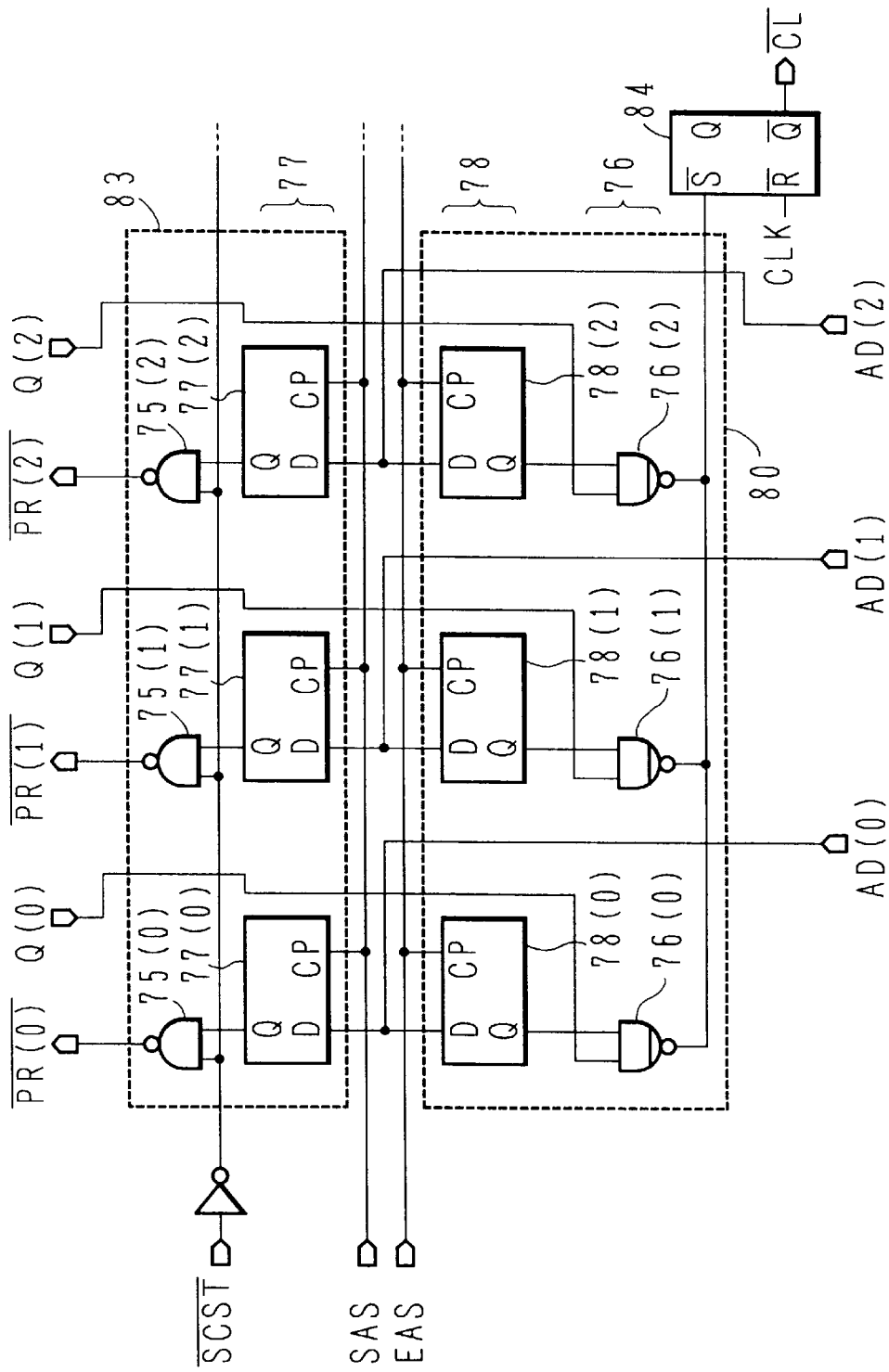
FIG. 19 is a circuit diagram of the address setting portion of the pixel selector of the range finder according to an embodiment of the invention.

FIG. 19 shows one of scan start address setting circuits 83 and scan end detectors 80 of the pixel selector 11. The address signals AD(O) to AD(15) generated by the address decoder shown in FIG. 18 are supplied to latch circuits 77(0) to 77(15) of the scan start address setting circuits 83 and to latch circuits 78(0) to 78(15) of the scan end detectors 80.

A start address setting signal SAS is supplied to a CP terminal of the latch circuit 77. The address signal is latched by the latch circuit 77(i) for the designated address when a pulse of the start address setting signal SAS is applied. An end address setting signal EAS is supplied to a CP terminal of the latch circuit 78. The address signal is latched by the latch circuit for the designated address when a pulse of the end address setting signal EAS is applied.

An output signal of the latch circuit 77(n) is supplied to one input terminal of a NAND gate 75(n), and the scan start signal SCST is supplied to the other input terminal of the NAND gate 75(n). When a pulse of the scan start signal SCST is applied, a preset signal PR(n) for the set address is outputted and the scan starts from the pixel at the set address as described before.

An output signal of the latch circuit 78(n) is supplied to one input terminal of a NAND gate 76(n), and the scan address signal Q(n) is supplied to the other input terminal of the NAND gate 76(n). As described with FIG. 16, the scan address signal Q(n) takes the high level when the address corresponding to Q(n) is scanned.

Therefore, when the pixel at the scan end address is scanned, both the input terminals of the corresponding NAND gate 76(n) take the high level and the output terminal changes to the low level. The output terminals of the NAND gates 76(0) to 76(15) are connected by wired OR logic to an inverted set terminal (–S) of a flip-flop 84. Therefore, if the output terminal of one NAND gate 76 changes to the low level, the low level is applied to the inverted set terminal (–S) of the flip-flop 84 to set it.

In this manner, when the pixel at the scan end address is scanned, the flip-flop 84 is set and a clear signal (–CL) is outputted. An inverted signal of the clear signal (–CL) is supplied to all the shift registers 70 so that they are initialized.

Figure 20:
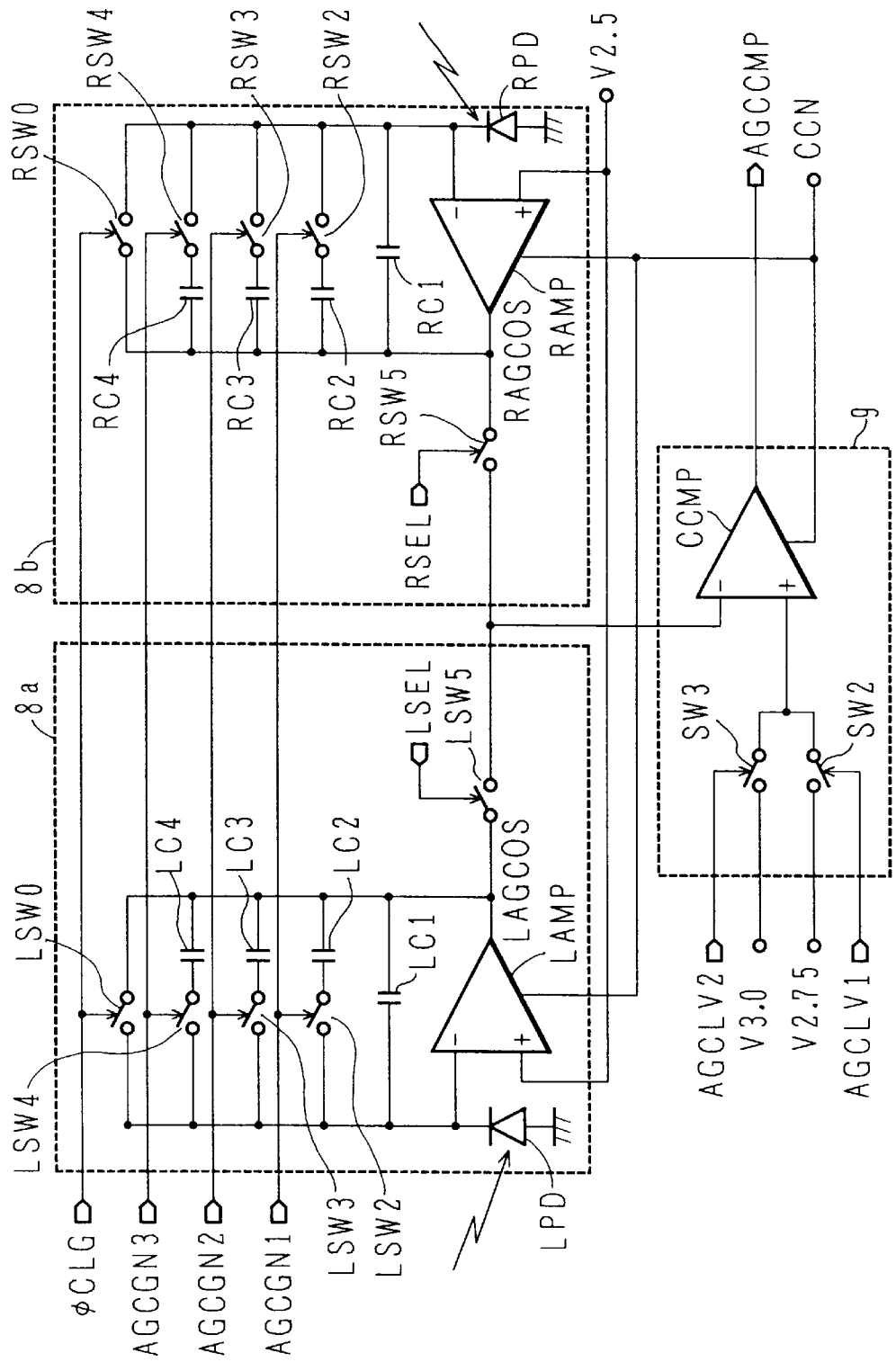
FIG. 20 is a circuit diagram of the AGC monitors and AGC circuit of the range finder according to an embodiment of the invention.

FIG. 20 is a circuit diagram of the left AGC monitor 8a, right AGC monitor 8b, and AGC circuit 9. The left and right AGC monitors 8a and 8b output voltages corresponding to received light amounts. The AGC circuit 9 compares the voltage outputted from the AGC monitor with a judgement voltage, and when they are equal, it inverts the output.

The left and right AGC monitors have the same structure, and so the operation will be described by using only the left AGC monitor 8a. The anode of a photodiode LPD is grounded and its cathode is connected to an inverting input terminal of an operational amplifier LAMP. The non-inverting terminal of the operational amplifier LAMP is connected to a constant voltage of 2.5 V.

A capacitor LC1 is connected between the inverting input terminal and the output terminal of the operational amplifier LAMP. Connected parallel to the capacitor LC1 are a serial circuit of a capacitor LC2 and a switch LSW2, a serial circuit of a capacitor LC3 and a switch LSW3, a serial circuit of a capacitor LC4 and a switch LSW4, and a switch LSW0.

The switches LSW2, LSW3, and LSW4 are closed and opened by AGC gain setting signals AGCGN1, AGCGN2, and AGCGN3 supplied from another circuit block of the range finder. The output terminal of the operational amplifier LAMP is connected via a switch LSW5 to the inverting input terminal of a comparator CCMP of the AGC circuit 9.

The switch LSW0 is opened and closed by a signal voltage $\phi_{CLG}$ supplied to the clear gate of CCD 10. While the clear gate CLG is in an on-state, the switch LSW0 is being closed. Under this condition, the output signal LAGCOS of the operational amplifier LAMP is 2.5 V.

The switch LSW0 is opened when the clear gate CLG enters the off-state. That is to say, at the same time when an integration operation of CCD 10 starts, the switch LSW0 is opened. The capacitor LC1 is therefore charged by a photocurrent generated by the photodiode LPD. Since the cathode of the photodiode LPD is connected to the inverting input terminal of the operational amplifier LAMP, its potential is maintained to be 2.5 V. Therefore, the output signal voltage LAGCOS of the operational amplifier LAMP rises by the amount corresponding to the amount of charges charged in the capacitor LC1.

If one or more of switches LSW2, LSW3, and LSW4 are closed, the total capacitance of capacitors to be charged by photocurrent changes so that a sensitivity of converting a received light amount to a voltage can be changed.

For example, assuming that the capacitances of the capacitors LC2, LC3, and LC4 are set to onefold, twofold, and fourfold of the capacitance of the capacitor LC1, respectively, the total capacitance is doubled when the switch LSW2 is closed. Similarly, the total capacitance is increased by four times when the switches LSW2 and LSW3 are closed, and by eight times when all the switches LSW2, LSW3, and LSW4 are closed. In this manner, the light reception sensitivity can be changed by ½, 1/4, or ⅛ of the sensitivity using only the capacitor LC1.

The switch LSW5 is controlled by a switch open/close signal LSEL supplied from another circuit block of the range finder. By closing the switch LSW5, the output signal LAGCOS OF the left operational amplifier LAMP can be supplied to the AGC circuit 9. Similarly, by closing a switch RSW5, the output signal RAGCOS of the right operational amplifier RAMP can be supplied to the AGC circuit 9.

The AGC circuit 9 is constituted by the comparator CCMP, and switches SW2 and SW3. To the inverting input terminal of the comparator CCMP, the output signal from one of the left and right AGC monitors 8a and 8b is selectively supplied as described previously. To the non-inverting terminal thereof, a judgement voltage of 2.75 V or 3.0 V is selectively supplied.

A selection of the judgement voltage is conducted by opening/closing the switches SW2 and SW3 which are controlled by judgement signals AGCLV1 and AGCLV2 supplied from another circuit block of the range finder. The judgement voltage is set to 2.75 V by closing the switch SW2, and to 3.0 V by closing the switch SW3.

The initial value of the output signal of the AGC monitor 8a, 8b is 2.5 V, so a voltage of the output signal changes by 0.25 V or 0.5 V before the output voltage reaches the judgement voltage. Therefore, the judgement level can be switched between two steps of 0.25 V and 0.5 V.

Assuming that the output signal of the left AGC monitor 8a is being supplied to the AGC circuit 9 and the switch LSW0 is opened, the potential at the inverting input terminal of the comparator CCMP rises from 2.5 V in accordance with the received light amount as described above. At the initial stage,, the output signal is lower than the judgement voltage so that the output signal AGCCMP of the comparator CCMP keeps the high level.

When the output signal of the AGC monitor 8a reaches the judgement voltage of 2.75 V or 3.0 V, the output signal AGCCMP of the comparator CCMP inverts and takes the low level. In this manner, the output signal AGCCMP can be generated by detecting that the light amount applied to the left or right AGC monitor 8a or 8b reaches the predetermined amount.

The detection sensitivity of a received light amount can be changed by eight steps by changing the total capacity of the capacitors of the AGC monitor 8a, 8b by four steps and changing the judgement voltage of the AGC circuit 9 by two steps. In the above embodiment, the total capacitance of capacitors changes by twofold, fourfold, and eightfold, and the judgement level changes by twofold. Therefore, the detection sensitivity can be changed by five steps in total.

As a current source of the operational amplifiers LAMP and RAMP and the comparator CCMP, n-channel MOS transistors are used. The gate electrode of each n-channel MOS transistor is supplied with a current control signal CCN. When the range finder enters the sleep mode, the current control signal CCN becomes 0 V, and current scarcely flows in each n-channel MOS transistor. During the sleep mode, a current consumption can be suppressed.

Figure 21:
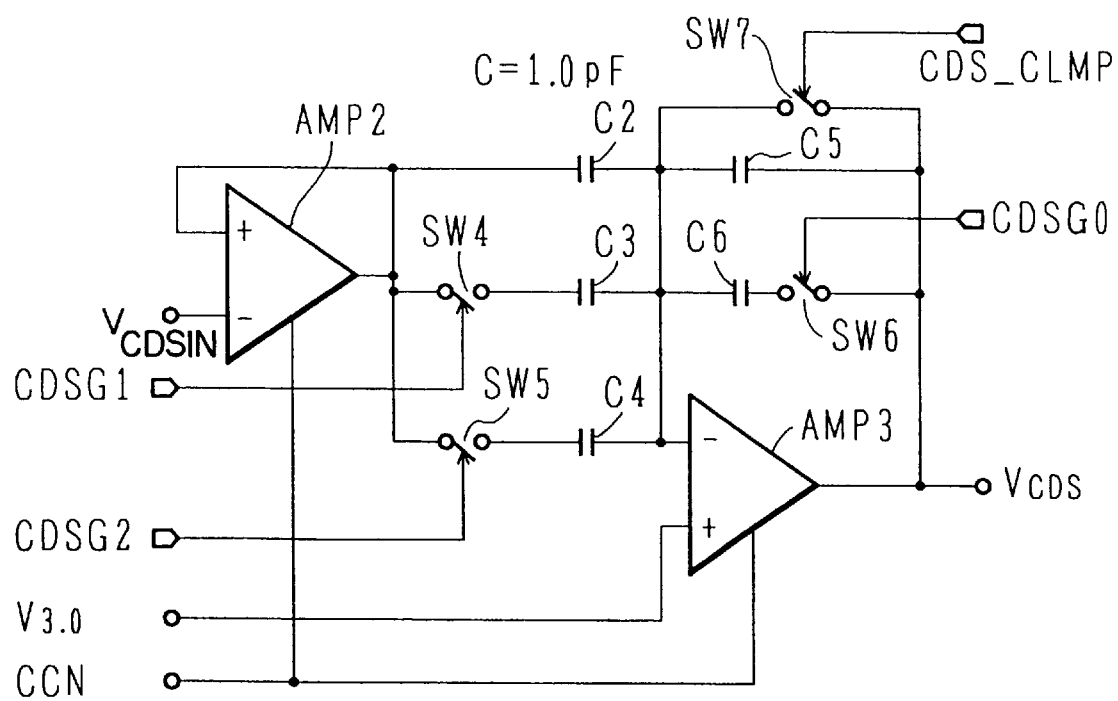
FIG. 21 is a circuit diagram of the CCD signal processor circuit of the range finder according to an embodiment; of the invention.

FIG. 21 is a circuit diagram of the CCD signal processor circuit 12. To the inverting input terminal of an operational amplifier AMP2, an output signal VCDS1N of CCD 10 is supplied. The non-inverting input terminal is connected to the output terminal which is connected via a capacitor C2 to the inverting input terminal of an operational amplifier AMP3. Connected parallel to the capacitor C2 are a serial circuit of a capacitor C3 and a switch SW4 and a serial circuit of a capacitor C4 and a switch SW5. The capacitors C2, C3, and C4 constitute the input side electrostatic capacitance.

To the non-inverting input terminal of the operational amplifier AMP3, a constant voltage of 3 V is applied. The inverting input terminal is connected via a parallel circuit of a capacitor C5 and a switch SW7 to the output terminal of the operational amplifier AMP3. Connected parallel to the capacitor C5 is a serial circuit of a capacitor CB and a switch SW6. The capacitors C5 and C6 constitute the output side electrostatic capacitance.

The switches are controlled to open and close by the CDS gain control signals CDSG1, CDSG2, and CDSGO supplied from another circuit block of the range finder. The switch SW7 is controlled to open and close by a CDS clamp signal CDS_CLMP supplied from another circuit block of the range finder.

The electrostatic capacitances of the capacitors C3, C5, and C6 are set to be equal to that of the capacitor C2, and the electrostatic capacitance of the capacitor C4 is set to be two times as large as that of the capacitor C2. Therefore, when the switch SW4 is closed, the input side electrostatic capacitance is doubled, and when the switches SW4 and SW5 are closed, it is increased by a fourfold. Similarly, when the switch SW6 is closed, the output side electrostatic capacitance is doubled.

If the operational amplifiers are ideal, its inverting input terminal is fixed to 3 V and the voltage at the electrode of the capacitor C2, which electrode is connected to the operational amplifier AMP2, becomes equal to the output signal voltage VCDSIN of CCD 10.

When the switch SW7 is closed, the output signal voltage VCDS of the operational amplifier AMP3 is fixed to 3 V. After the switch SW7 is opened and the signal voltage VCDSIN is applied to the inverting input terminal of the operational amplifier AMP2, the electric charges in the input side capacitors change with the signal voltage VCDSIN. In accordance with this change, electric charges are stored in the output side capacitors.

As the output side electrostatic capacitors are charged and a voltage between the electrodes of the capacitors change, the output signal voltage $V_{CDS}$ of the operational amplifier AMP3 changes. A change amount of the output signal voltage $V_{CDS}$ changes with a ratio between the input and output side electrostatic capacitances. By changing the input and output side electrostatic capacitances by opening and closing the switches SW4, SW5, and SW6, the change amount of the output signal voltage $V_{CDS}$ can be set to ½, 1, 2, and 4 times as large as that of the change amount of the signal voltage $V_{CDSIN}$.

The output signal voltage $V_{CDS}$ is supplied to the contrast calculation circuit 13 and A/D converter 14. An output signal of CCD 10 given a constant gain as described above can be supplied to the contrast calculation circuit 13 and A/D converter 14.

The contrast calculation circuit 13 will be described with reference to FIGS. 22A to 22D, 23, and 24.

Figure 22A:
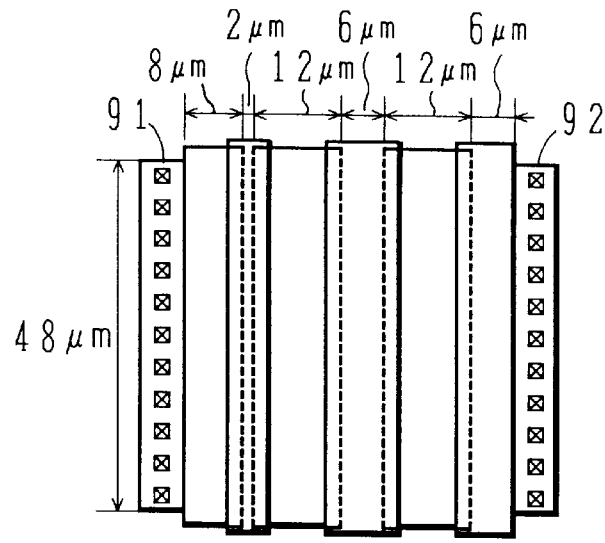
FIG. 22A is a plan view showing the layout of a contrast calculation circuit.
Figure 22B:
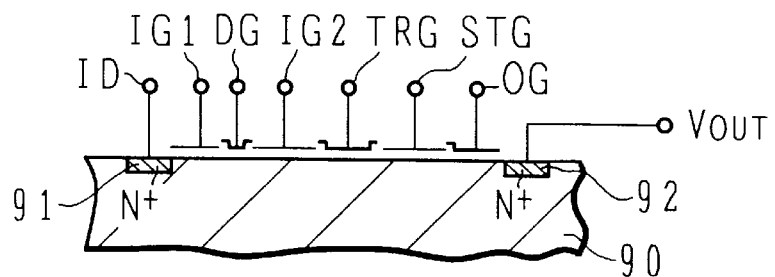
FIG. 22B is a cross sectional view of the contrast calculation circuit.
Figure 22C:
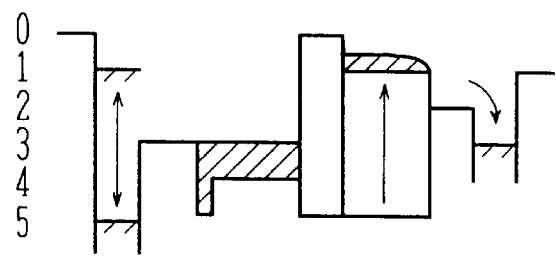
FIG. 22C is a potential energy distribution diagram explaining the operation principle of the contrast calculation circuit.
Figure 22D:
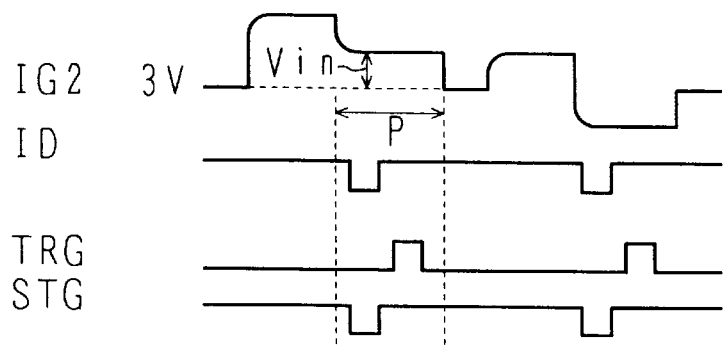
FIG. 22D is a timing chart explaining the operation of the contrast calculation circuit.

FIGS. 22A is a plan view of CCD for converting a potential difference into electric charges and transferring and storing the electric charges, and FIG. 22B is a cross sectional view of CCD. FIG. 22C shows a potential energy distribution at the channel region, and FIG. 22D is a timing chart explaining the operation of each gate of CCD.

On the surface of a p-type substrate 90, n$^+$-type regions 91 and 92 are formed with a predetermined space therebetween. Between the n$^+$-type regions 91 and 92, an input gate IG1, a dummy gate DG, an input gate 1G2, a transfer gate TRG, a storage gate STG, and an output gate OG respectively of an insulating gate structure are formed slightly overlapped each other while ensuring insulation.

A voltage ID is applied to the n$^+$-type region 91. A predetermined d.c. voltage is applied to the input gate IG1 and output gate OG. The dummy gate DG is connected to a d.c. power supply voltage Vcc. The voltage ID is normally at the high level, and periodically supplies a low level pulse.

During a period P while a signal voltage Vin is applied to the input gate IG2, the low level pulse of the voltage ID is supplied. Therefore, electrons in the n$^+$-type region 91 pass over the potential barrier formed at the channel region under the input gate IG1 and are injected into the channel region under the input gate IG2. At this time, since the transfer gate TRG takes the low level, electrons are not injected to the channel region under the transfer gate TRG.

When the voltage ID returns to the high level, some of injected electrons pass over the potential barrier under the input gate IG1 and are returned back to the n$^+$-type region 91. At this time, the amount of charges accumulated at the channel region under the input gate 1G2 corresponds to a potential difference between the input gates ID1 and 1D2.

Next, a positive pulse is applied to the transfer gate TRG to transfer electrons accumulated at the channel region under the input gate IG2 to the channel region under the storage gate STG. A negative pulse is applied to the storage gate STG to make electrons accumulated at the channel region under the storage gate STG pass over the potential barrier formed at the channel region under the output gate OG and transfer to the n$^+$-type region 92.

The above operation is repeated by changing the signal voltage Vin applied to the input gate IG2. It becomes therefore possible to sequentially transfer, store, and accumulate the charge amount corresponding to the input voltage Vin in the n$^+$-type region 92.

The dummy gate DG is formed between the input gates IG1 and IG2 because of some reasons associated with manufacturing processes. Since a voltage difference between the input gates IG1 and IG2 is picked up in the form of charge amount, the input gates IG1 and IG2 are required to be formed so as to have an equal capacitance per unit area to the substrate.

To this end, it is preferable to form both the input gates IG1 and IG2 by a first polycrystalline silicon layer or a second polycrystalline silicon layer. In this embodiment, the input gates IG1 and IG2 are both formed by the first polycrystalline silicon layer, and the dummy gate DG is formed by the second polycrystalline silicon layer without leaving any gap relative to the input gates IG1 and IG2. In order not to form a potential barrier of the dummy gate DG between the input gates IG1 and IG2, a power supply voltage is applied to DG.

Figure 23A:
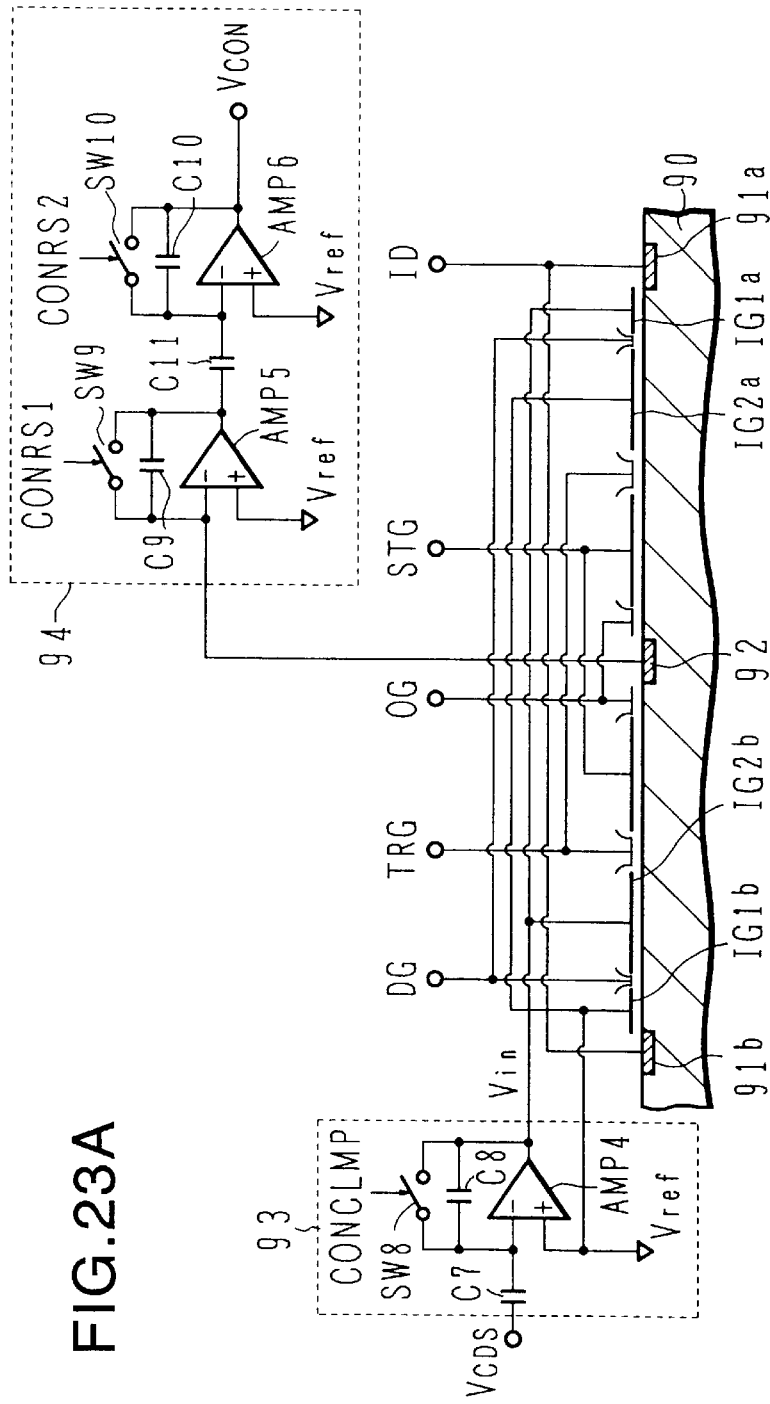
FIG. 23A is a cross sectional view of the contrast calculation circuit, a difference voltage generator, and a contrast signal read circuit.
Figure 23B:
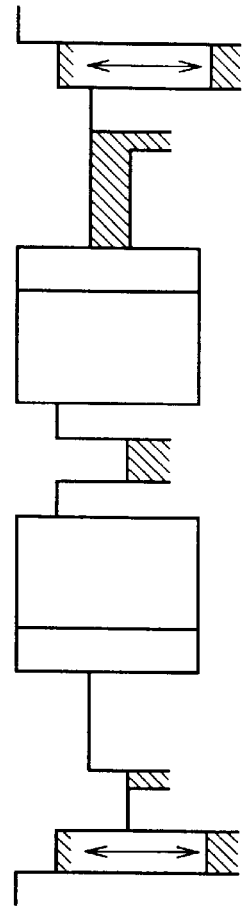
FIG. 23B is a potential energy diagram explaining the operation of the contrast calculation circuit.

FIG. 23A is a cross sectional view of the contrast calculation circuit made of two CCDs explained with FIGS. 22A and 22B, and FIG. 23B shows a potential energy distribution at the channel region. An n$^+$-type region 92 is formed at the central area of a p-type substrate 90. CCDs shown in FIGS. 22A and 22B are formed symmetrically with the n$^+$-type region 92 on the right and left sides thereof. For CCD at the left side of the n$^+$-type region 92, the analog reference voltage Vref is applied to a gate electrode IG1b corresponding to the input gate IG1, and the signal voltage Vin is applied to a gate electrode IG2b corresponding to the input gate IG2.

Conversely, for CCD at the right side of the n$^+$-type region 92, the signal voltage Vin is applied to a gate electrode IG1a corresponding to the input gate IG1, and the analog reference voltage Vref is applied to a gate electrode IG2a corresponding to the input gate IG2.

A difference voltage generator 93 is inputted with the output signal voltage $V_{CDS}$ of the CCD signal processor circuit 12. The output signal voltage $V_{CDS}$ is a signal voltage corresponding to a received light amount of each pixel, and is sequentially supplied for respective pixels within the scan area. The difference voltage generator 93 generates a signal voltage Vin representing an output signal voltage difference between adjacent pixels, in accordance with the output signal voltage $V_{CDS}$.

To the inverting input terminal of an operational amplifier AMP4 of the difference voltage generator 93, the output signal voltage $V_{CDS}$ of the CCD signal processor circuit 12 is supplied via a capacitor C7. The inverting input terminal is connected to the output terminal via a parallel circuit of a switch SW8 and a capacitor C8. A signal voltage Vin is outputted from the output terminal. To the non-inverting input terminal of the operational amplifier AMP4, the analog reference voltage Vref is applied.

The operation of the difference voltage generator 93 will be described with reference to FIG. 24.

Figure 24:
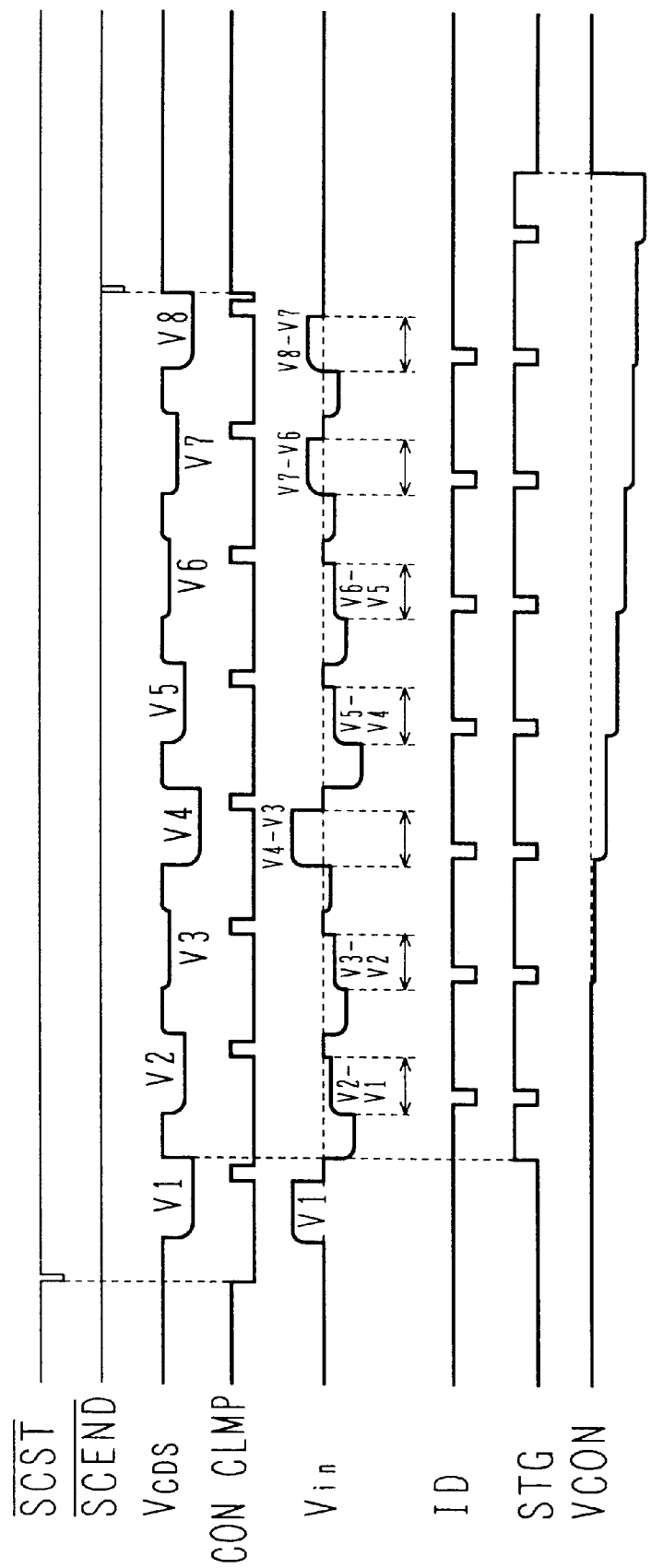
FIG. 24 is a timing chart explaining the operation of the contrast calculation circuit.

FIG. 24 is a timing chart explaining the operation of the contrast calculation circuit 13. A scan starts when a negative pulse of the scan start signal (–SCST) is applied. Upon application of a scan start, the output signal voltage $V_{CDS}$ corresponding to the received light amount of each pixel is sequentially generated generally synchronously with a clock.

Synchronously with the negative pulse of the scan start signal (–SCST), a contrast clamp signal CONCLMP takes the low level to open the switch SW8. As an output voltage V1 of the start pixel is generated as the output signal voltage $V_{CDS}$, electric charges corresponding to the voltage V1 are stored in the capacitor C7. At the same time, electric charges having the same amount are stored in the capacitor C8. Assuming that the electrostatic capacitances of the capacitors C7 and C8 are equal, a potential difference V1 is generated across the capacitor C8 and an output signal Vin having the voltage V1 is generated.

The analog voltages V1 and Vin are voltage differences from the analog reference voltage Vref. Similarly, analog voltages V2 to V8 are voltage differences from the analog reference voltage Vref.

Next, the contrast clamp signal CONCLMP temporarily takes the high level to close the switch SW8. Therefore, the signal voltage Vin is set to a potential at the inverting input terminal of the operational amplifier AMP4, i.e., to the analog reference voltage Vref. At this time, the output signal voltage V1 is being applied across the capacitor C7 in which electric charges corresponding to the voltage V1 are being stored.

Thereafter, the output signal voltage $V_{CDS}$ returns to the analog reference voltage Vref. At this time, the electric charges in the capacitor C7 are discharged and the same amount of electric charges are stored in the capacitor C8. Therefore, the signal voltage Vin having a voltage of −V1 is outputted.

Next, the output signal voltage $V_{CDS}$ takes an output voltage V2 of the second pixel. Therefore, a voltage V2 appears across the capacitor C7. At this time, the electric charges in the capacitor C8 corresponding to the voltage V2 move to the capacitor C7. The voltage across the capacitor C8 therefore becomes V2−V1, which appears as the signal voltage Vin.

Next, the contrast clamp signal CONCLMP temporarily takes the high level to close the switch SW8. At this time the signal voltage Vin is set to the analog reference voltage Vref. The capacitor C7 continues to hold the output signal voltage V2 corresponding to the electric charges therein.

This state is the same as the state after the contrast clamp signal CONCLMP temporarily takes the high level while the voltage V1 for the start pixel is applied. By repeating the above operation, the signal voltage Vin sequentially generates difference output voltages V3−V2, V4−V3, . . . between adjacent pixels.

When a negative pulse of the scan end signal (−SCEND) is applied, the contrast clamp signal CONCLMP is fixed to the high level and the signal voltage Vin becomes the analog reference voltage Vref. In the above manner, the signal output voltage Vin generates output voltage differences −($V_{i+1}$−$V_i$) between adjacent pixels. If $V_{i+1}$>$V_i$, the output signal Vin is smaller than the analog reference voltage Vref, and if $V_{i+1}$<$V_i$, the output signal Vin is larger than the analog reference voltage Vref.

If the output signal Vin is smaller than the analog reference voltage Vref, i.e., if $V_{i+1}$>$V_i$, the potential energy at the channel region under the input gate IG2a is lower (higher in the case of an electric potential) than that at the channel region under the input gate IG1a. Therefore, electrons injected from the n$^+$-type region 91a are accumulated in the channel region under the input gate IG2a. Thereafter, in the manner described with FIG. 22, the electrons are transferred to the n$^+$-type region 92.

At this time, the potential energy at the channel region under the input gate IG2b is higher than that at the channel region under the input gate IG1b. Therefore, electrons injected from the n$^+$-type region 91b when the voltage ID takes the low level, are returned to this region 91b when the voltage ID returns to the high level. Accordingly, electrons injected from the n-type region 91b are not transferred to the n$^+$-type region 92 if $V_{i+1}$>$V_1$.

Conversely, if the output signal Vin is larger than the analog reference voltage Vref, i.e., if $V_{i+1}$<$V_i$, from the same reasons, only electrons injected from the n$^+$-type region 91b are transferred to the n$^+$-type region 92, and electrons injected from the n$^+$-type region 91a are not transferred. In this manner, it is possible to transfer and accumulate the electric charge amount corresponding to an absolute value $|V_{i+1}−V_i|$ of an output voltage difference between adjacent pixels, in the n$^+$-type region 92.

Next, the operation of a contrast signal read circuit 94 will be described.

The n$^+$-type region 92 is connected to the inverting input terminal of an operational amplifier AMP5. The inverting input terminal of the operational amplifier is connected to the output terminal via a parallel circuit of a switch SW9 and a capacitor C9. The output terminal of the operational amplifier is connected via a capacitor C11 to the inverting terminal of an operational amplifier AMP6.

The inverting terminal of the operational amplifier AMP6 is connected to the output terminal via a parallel circuit of a switch SW10 and a capacitor C10. The analog reference voltage Vref is applied to both the non-inverting terminals of the operational amplifiers AMP5 and AMP6. A contrast signal Vcon is outputted from the output terminal of the operational amplifier AMP6.

Before the start of contrast calculation, switch open/close signals CONRS1 and CONRS2 take the high level and the switches SW9 and SW10 are closed. Therefore, no electric charge is stored in the capacitors C9, C10, and C11 and the analog reference voltage appears at the output terminals of the operational amplifiers AMP5 and AMP6. At the start of contrast calculation, the switch open/close signals CONRS1 and CONRS2 change to the low level and the switches SW9 and SW10 are opened.

Since the potential at the n$^+$-type region 92 is retained at the analog reference voltage Vref, charges transferred to the n$^+$-type region 92 are all stored in the capacitor C9. An amount Qsig of charges transferred at each period is represented by Qsig=Cst×Vin where Cst is an electrostatic capacitance between the input data IG2 and the substrate 90. This charge amount Qsig is stored in the capacitor C9 synchronously with a low level pulse applied at the storage gate STG.

A voltage corresponding to the charge amount in the capacitor C9 appears at the output terminal of the operational amplifier AMP5. For example, if it is set Cst=C9/2, a voltage Vin/2 appears at the output terminal of the operational amplifier AMP5.

Electric charges corresponding to this voltage are stored in the capacitor C11. At the same time, the same amount of electric charges is stored in the capacitor C10. Therefore, a voltage proportional to the voltage Vin appears at the output terminal of the operational amplifier AMP6. In this manner, a contrast signal Vcon is outputted.

By repeating the transfer and accumulation of electric charges corresponding to the output signal Vin, a voltage proportional to the output signal Vin at a certain period is superposed upon the contrast signal. When the last transfer of electric charges is completed, a voltage corresponding to a sum of absolute values of output signal differences between adjacent pixels is outputted as the contrast signal Vcon.

The contrast calculation circuit 13 converts the electric charge amount into a voltage by integrating it by an integrating amplifier. Instead of using the integrating amplifier, a floating diffusion amplifier may be used for the contrast calculation circuit 13.

Figure 25A:
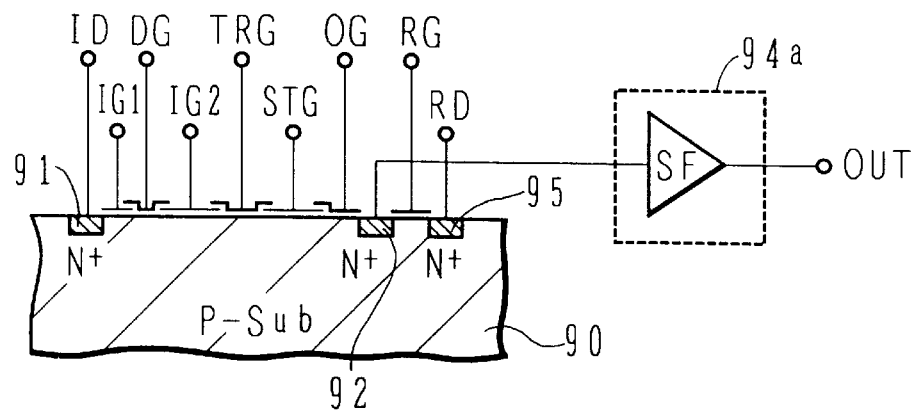
FIG. 25A is a cross sectional view of a floating diffusion type contrast calculation circuit.

FIG. 25A shows a cross sectional view of a charge measuring region of the contrast calculation circuit 13 using a floating diffusion amplifier, and a circuit diagram of the contrast signal read circuit 94a. The structures of n$^+$-type regions 91 and 92, an input gate IG1, a dummy gate DG, an input gate IG2, a transfer gate TRG, a storage gate STG, and an output gate OG are the same as those of the contrast calculation circuit 13 shown in FIG. 22B.

An n$^+$-type region 95 is formed spaced apart by a predetermined distance from the n$^+$-type region 92. A voltage RD is applied to the n$^+$-type region 95. A reset gate RG of an insulating structure is formed between the n$^+$-type regions 92 and 95. The n$^+$-type region 92 is connected to the input terminal of a source follower amplifier (SF amplifier).

Figure 25B:
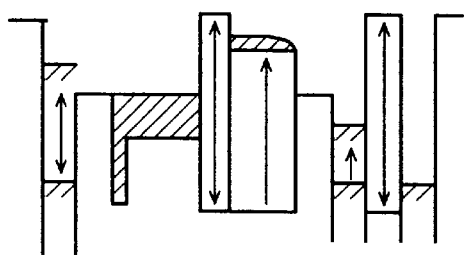
FIG. 25B is a potential energy diagram explaining the operation principle of the floating diffusion type contrast calculation circuit.
Figure 25C:
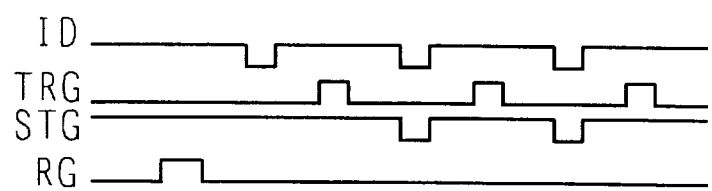
FIG. 25C is a timing chart explaining the operation of the floating diffusion type contrast calculation circuit.

FIG. 25B shows a potential energy distribution under each gate electrode, and FIG. 25C is a timing chart.

Before the sum of absolute values of output signal differences of adjacent pixels is calculated, a positive pulse is applied to the reset gate RG and the potential at the n+-type region 92 is initially set to the potential at the n+-type region 95. A constant voltage RD is always applied to the n+-type region 95 so that the n+-type region 92 is set to the voltage RD.

The operation of measuring the charge amount corresponding to an output signal difference between adjacent pixels and transferring it to the n+-type region 92 is the same as described with FIGS. 22A to 22D. As the signal charge is transferred to the n+type region 92, the potential at the n+-type region 92 becomes lower than the initially set level. A transfer of a signal charge is repeated and a voltage corresponding to the integrated charge amount appears at the n+-type region 92. This voltage is outputted from the SF amplifier. An integrated output corresponds to a difference between the initially set voltage level and the voltage level after the completion of integrations.

Next, the structure and operation of the signal level judgement circuit 15 will be described with reference to FIGS. 26 and 27. The signal level judgement circuit 15 checks the upper three bits of an A/D converted pixel output and judges the level of each pixel output whether it belongs to what level among eight levels by using seven slice levels L1 to L7.

Figure 26:
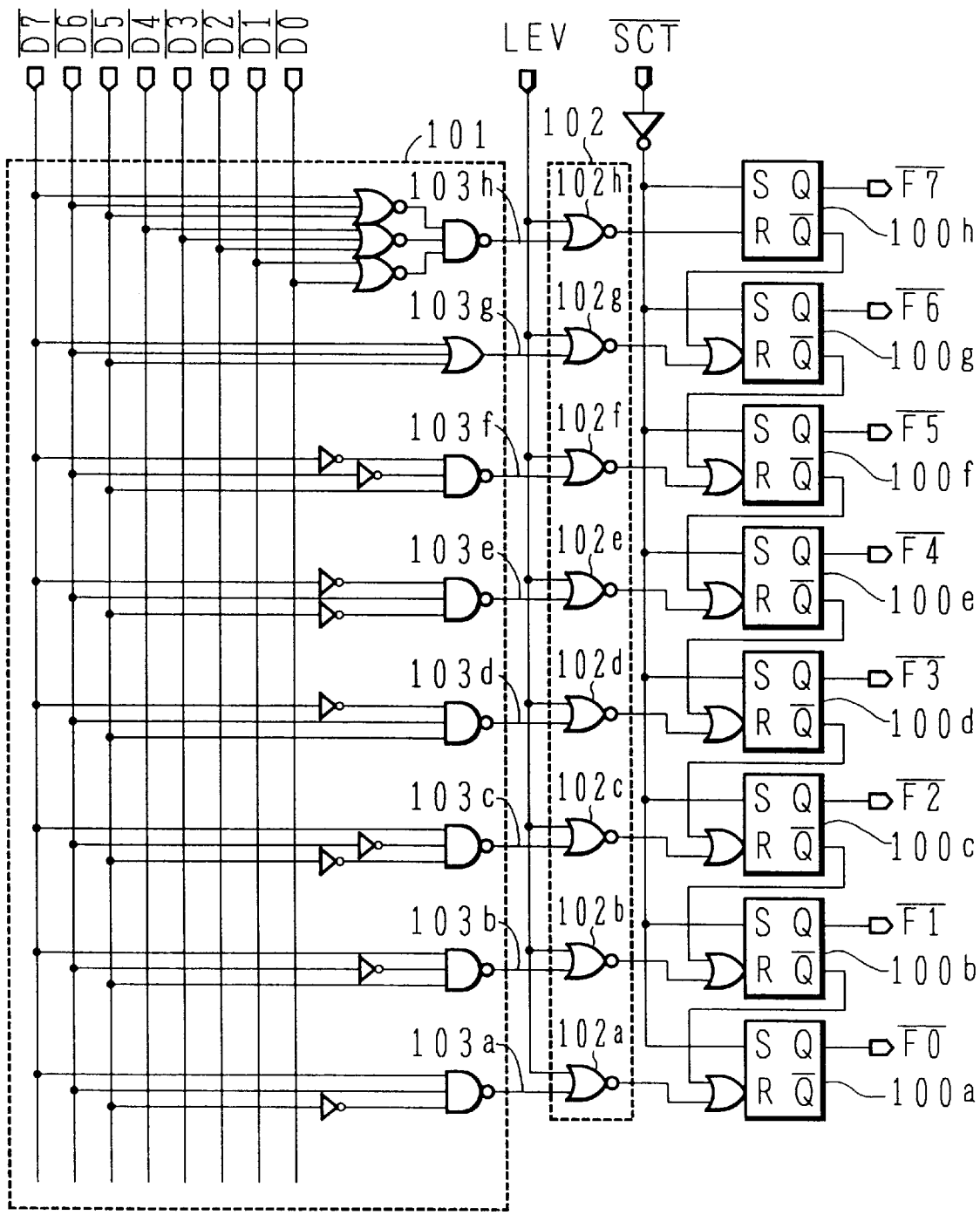
FIG. 26 is a circuit diagram of a signal level judgement circuit of the range finder according to an embodiment of the invention.

FIG. 26 is a circuit diagram of the signal level judgement circuit 15.

Each pixel output signal is A/D converted by the A/D converter 14, and the converted data bits (–D0) to (–D7) are supplied to a decoder 101. The decoded upper three bits are outputted from output ports 103a to 103g of the decoder 101.

For example, if the upper three bits are "110", "0" is outputted only from the output port 103a, "1s" are outputted from the other output ports. If the upper three bits are "000", "0" is outputted only from the output port 103g and "1s" are outputted from the other output ports 103a to 103f.

That is to say, as each pixel output level changes from the low level to the high level, the output port outputting "0" moves from the port 103a toward the port 103g.

The output port 103h outputs "0" when the output signal data is "00000000", and outputs "1" in the other cases. That is to say, the output port 103h outputs "0" when the pixel output signal becomes saturated.

The output ports 103a to 103h of the decoder 101 are connected to one input terminals of NOR gates 102a to 102h of a NOR gate group 102. To the other input terminals of the NOR gates 102a to 102h, a level judgement signal LEV is supplied.

Output of the NOR gates 102a to 102g are inputted to R input terminals of flip-flops 100a to 100g via one input terminals of OR gates. To each of the other input terminals of the OR gates, an output at the output terminal (–Q) of the higher level flip-flop is supplied. An output of the NOR gate 102h is supplied to the R input terminal of a flip-flop 100h.

To the S input terminal of each flip-flop, a scan start signal SCT is supplied. Flag data bits (–F0) to (–F7) are outputted from the Q output terminals of the flip-flops 100a to 100h.

Before the scan start, the level judgement signal LEV is "1". When a positive pulse of the scan start signal SCT is applied, the S input terminal of each of the flip-flops 100a to 100h outputs "1" and the R input terminal outputs "0". Therefore, the flag data bits (–F0) to (–F7) become all "1". When the scan starts, the scan start signal SCT takes the low level, and the S input terminal of each of the flip-flops 100a to 100h outputs "0".

While each output port of the decoder 101 outputs valid data, the level judgement signal LEV is maintained to be "0" and the R input terminal of each of the flip-flops 10a to 100h is given a logical not of the state of each of the output ports 103a to 103h of the decoder 101.

As the output signal data of the start pixel is inputted to the decoder, the decoded results are supplied to the R input terminals of the flip-flops 100a to 100h. Only the R input terminal of the flip-flop corresponding to the state "0" at the output port receives "1" and the corresponding flag data becomes "0". In addition, the state of the output terminal (–Q) becomes "1", and the R input terminal of the lower level flip-flop becomes "1". In this manner, the flag data bits of the flip-flops at the lower level than the subject flip-flop become all "0".

Thereafter, output signal data of each pixel is sequentially inputted, and the state of the R input terminal of each flip-flop corresponding to each pixel output signal becomes "1". If the flag data bit is already "0", any state change does not occur. If the flag data bit is "1", it changes to "0" and at the same time the flag data bits lower than the subject flag data bit become all "0".

The above operation is repeated so that when the scan is completed, a flag data for a maximum output pixel in the scan area can be held.

FIG. 27 shows a relationship between a maximum output pixel level and a flag data bit. A cross symbol in A/D data allows to take either "0" or "1". As shown in FIG. 27, the degree of a maximum output pixel relative to the saturated output level can be discriminated by eight levels. It is possible to judge from the flag data F7 whether there is a saturated pixel within the scan area.

Figure 28:
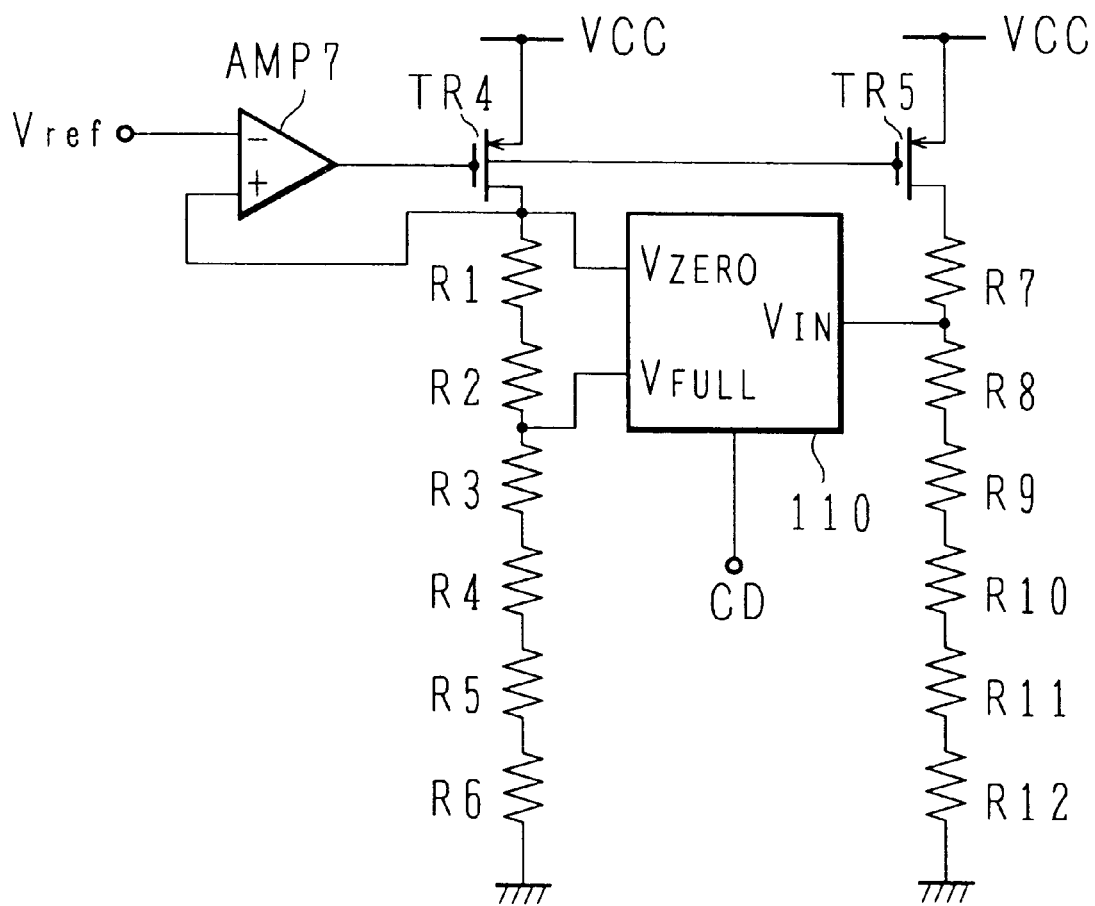
FIG. 28 is a circuit diagram of a temperature detector of the range finder according to an embodiment of the invention.

FIG. 28 is a circuit diagram of the temperature detector 20. The temperature detector 20 detects a temperature by using a temperature coefficient difference between an ion doped resistor and a polycrystalline silicon resistor formed by semiconductor processes. Generally, an ion doped resistor has a temperature coefficient of 4000 ppm/°C., and a polycrystalline resistor has a temperature coefficient of 400 ppm/°C. which is about ten times smaller than the ion doped resistor. The structure and operation of the temperature detector will be described below.

The source electrode of a p-type MOS transistor TR4 is connected to a d.c. power supply voltage Vcc, and the drain electrode is grounded via a serial circuit (biasing array) of polycrystalline silicon resistors R1 to R6 connected in this order. The source electrode of a p-type MOS transistor TR5 is connected to the d.c. power supply voltage Vcc, and the drain electrode is grounded via a serial circuit (temperature detecting array) of polycrystalline silicon resistors R7 to R10 and crystalline silicon resistors R11 and R12 made by ion implantation connected in this order.

The inverting input terminal of the operational amplifier AMP7 is supplied with the analog reference voltage Vref. The non-inverting input terminal is connected to the drain electrode of the p-type MOS transistor TR4 and the output terminal is connected to the gate electrodes of the p-type MOS transistors TR4 and TR5.

The drain electrode of the p-type MOS transistor TR4 is connected to an input terminal $V_{ZERO}$ of an A/D converter 110, an interconnection between the resistors R2 and R3 is connected to an input terminal $V_{FULL}$, and an interconnection between the resistors R7 and R8 is connected to an input terminal $V_{IN}$.

Current flowing through the p-type MOS transistor TR4 is controlled to be fed back by the operational amplifier AMP7 so as to make the input terminal $V_{ZERO}$ of the A/D converter 110 have the analog reference voltage Vref. A current value I flowing through the biasing array is given by I=Vref/(6r) where r is the resistance value of each of the polycrystalline silicon resistors R1 to R10.

Therefore, a voltage at the input terminal $V_{FULL}$ of the A/D converter 110 is (4/6)×Vref.

The same quantity of current flows also through the temperature detecting array. Therefore, a voltage at the input terminal $V_{IN}$ of the A/D converter 110 is given by the following equation:

$$V_{IN} = I \times (3r + 2r')$$
$$= (1/2) \times Vref + (1/3) \times (r'/r) \times Vref$$

where r' is a resistance value of each of the resistors R11 and R12 made by ion implantation. An output CD of the A/D converter 110 converted into an 8-bit code is given by:

$$CD = (V_{IN} - V_{ZERO})/(V_{FULL} - V_{ZERO}) \times 256$$
$$= (1.5 - r'/r) \times 256$$

As seen from this equation, the output CD of the A/D converter 110 is independent from the analog reference voltage Vref. That is to say, the output CD of the A/D converter will not change even if the analog reference voltage Vref changes. If a temperature changes under this condition, the value of r'/r changes so that the output CD of the A/D converter 110 changes.

In the circuit shown in FIG. 28, an output CD of the A/D converter 110 becomes ½ of the full scale if r=r') at the room temperature. However, when the temperature detectors are fabricated on an IC chips, an output CD varies from the temperature detector on one chip to one on another chip because of resistance variation of each resistor. In the example shown in FIG. 28, only two resistors are made by ion implantation among the six resistors of the temperature detecting array so as to suppress an output variation at the room temperature.

Specifically, if all the resistors R7 to R12 are formed by ion implantation, although a voltage detection sensitivity relative to a temperature rises, an output voltage may become out of the measurement range of the A/D converter 110 because of manufacturing variation. In order to avoid this, the number of polycrystalline silicon resistors is adjusted to obtain a proper detection sensitivity.

When the manufacturing variation is taken into consideration, it is not proper to convert an output CD itself of the A/D converter 110 into a temperature. It is therefore preferable to store an output CD of the A/D converter 110 at a room temperature in an EP-ROM or other memories and calculate a temperature change from a change in the output CD.

If the temperature coefficient of the polycrystalline silicon resistor is neglected, a relationship between an output change ΔCD and a temperature change ΔT is given by:

$$\Delta T = \Delta CD/(CD0 - 1.5 \times 256)/\alpha$$

where α represents the temperature coefficient of the resistor made by ion implantation and CD0 is an output at the room temperature. For example, since α is nearly equal to 4000 ppm/°C., the least significant bit of an output CD corresponds to about 1° C. at CD0=128.

In this embodiment, the temperature detector is used for detecting a substrate temperature of the range finder. The temperature detector of this embodiment may be used in other application fields. This temperature detector is generally used for detecting a temperature of a semiconductor substrate on which various types of electronic circuits are formed. For example, detecting a substrate temperature of a CCD image pickup device can compensate for a dark current.

Figure 29:
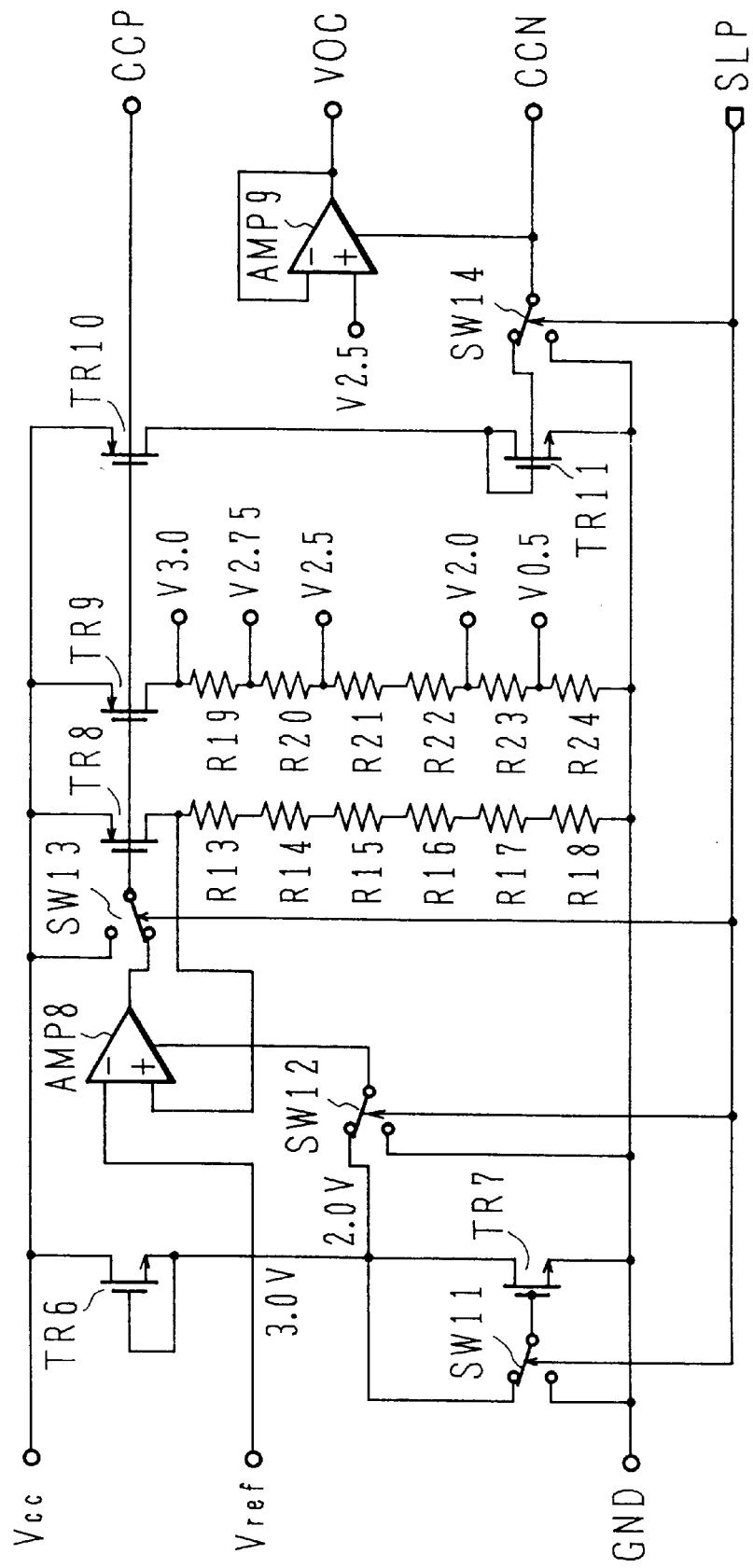
FIG. 29 is a circuit diagram of a bias circuit of the range finder according to an embodiment of the invention.

FIG. 29 is a circuit diagram of a bias circuit. The bias circuit supplies each circuit block of the range finder with a current control gate voltage CCN for current source n-type MOS transistors, a current control gate voltage CCP for current source p-type MOS transistors, and a reference voltage VOC for CCDs. The structure and operation of the bias circuit will be described below.

An n-type depletion MOS transistor TR6 and an n-type enhancement MOS transistor TR7 are connected in series. The drain electrode of the transistor TR6 is connected to a power supply voltage VCC, and the source electrode of the transistor TR7 is connected to the ground potential GND.

The gate electrode of the transistor TR6 is connected to the source electrode, the transistor TR6 operating as a current source. The gate electrode of the transistor TR7 is connected to a movable contact of a switch SW11 which is controlled by a sleeve signal SLP and connects the gate electrode of the transistor TR7 to the ground potential GND during the sleep mode. During the sleep mode, current will not flow through the transistors TR6 and TR7.

During the normal mode, the gate electrode of the transistor TR7 is connected to the drain electrode, and a voltage corresponding to a constant current flowing through the transistor TR6 is generated at the gate electrode of the transistor TR7. In this embodiment, the gate electrode of the transistor TR7 is set to 2.0 V.

The analog reference voltage Vref is applied to the inverting input terminal of an operational amplifier AMP8. The analog reference voltage Vref may be supplied externally or generated by a constant voltage generator built in the range finder.

During the sleep mode, the gate electrode of a current source transistor in the operational amplifier AMP8 is supplied with the ground potential GND via a switch SW12. Therefore, current will not flow. During the normal mode, a voltage of 2.0 V is applied to the gate electrode of the current source transistor to enter the operation state.

A p-type MOS transistor TR8 and resistors R13 to R18 are connected in series in this order. The source electrode of the transistor TR8 is connected to the power supply voltage VCC, and the resistor R18 is connected to the ground potential. The drain-electrode of the transistor TR8 is connected to the non-inverting input terminal of an operational amplifier AMP8. The gate electrode of the transistor TR8 is connected to the output terminal of the operational amplifier AMP8 via a switch SW13 during the normal mode.

The drain current of the transistor TR8 is controlled by a feedback of the operational amplifier AMP8 so as to set the drain electrode of the transistor TR8 to the analog reference voltage Vref. In this embodiment, the resistance values of the resistors R13 to R16 are each set to 1.25 kΩ, the resistance value of the resistor R17 is set to 7.5 kΩ, and the resistance value of the resistor R18 is set to 2.5 kΩ. A current of 200 μA flows through the serial circuit of the transistor TR8 and the resistors R13 to R18.

A p-type MOS transistor TR9 and resistors R19 to R24 are connected in series in this order. The source electrode of the transistor TR9 is connected to the power supply voltage VCC, and the resistor R24 is connected to the ground potential. Since the gate electrode of the transistor TR9 is connected to the gate electrode of the transistor TR8, a drain current of 200 μA flows through the transistor TR9 like the transistor TR8.

The resistance values of the resistors R19 to R24 are set to the same as the resistors R13 to R18. As a result, the voltages at the interconnections at a higher voltage side of each of the resistors R19, R20, R21, R23, and R24 are 3.0 V, 2.75 V, 2.5 V, 2.0 V, and 0.5 V. These constant voltages are supplied to each circuit block of the range finder.

A p-type MOS transistor TR10 and an n-type MOS transistor TR11 are serially connected. The source electrode of the transistor TR10 is connected to the power supply voltage VCC, and the source electrode of the transistor TR11 is connected to the ground potential GND. Since the gate electrode of the transistor TR10 is connected to the gate electrode of the transistor TR8, a drain current of 200 μA same as the transistor TR8 flows through the transistor TR10. The gate electrode of the transistor TR11 is connected to the drain electrode, and a gate voltage corresponding to the drain current of 200 μA appears at the gate electrode.

During the normal mode, this gate voltage is supplied to each circuit block of the range finder via a switch SW14 as the current control gate voltage CCN for n-type MOS transistors. A voltage at the output terminal of the operational amplifier AMP8 is supplied to each circuit block of the range finder via the switch SW13 during the normal mode, as the current control gate voltage CCP for p-type MOS transistors.

During the sleep mode, the current control gate voltage CCP for p-type MOS transistors is switched to the power supply voltage VCC by the switch SW13, and the current control gate voltage CCN for n-type MOS transistors is switched to the ground potential GND by the switch SW14. As a result, current will not flow through each MOS transistor in each circuit block, suppressing a current consumption quantity.

A constant voltage of 2.5 V is applied to the non-inverting input terminal of the operational amplifier AMP9, the inverting input terminal and output terminal being short-circuited. Therefore, the operational amplifier AMP9 outputs a constant voltage of 2.5 V which is supplied to CCDs as the reference voltage VOC. The gate electrode of each n-type MOS transistor operating as the current source in the operational amplifier AMP9 is supplied with the current control gate voltage CCN for n-type MOS transistors. Therefore, during the sleep mode, current is hardly consumed.

In the above manner, current consumption can be suppressed by changing the current control gate voltages CCN and CCP to be supplied to the gate electrodes of current source transistors in each circuit block of the range finder during the sleep mode, to the ground potential GND and the power supply voltage VCC, respectively.

Figure 30:
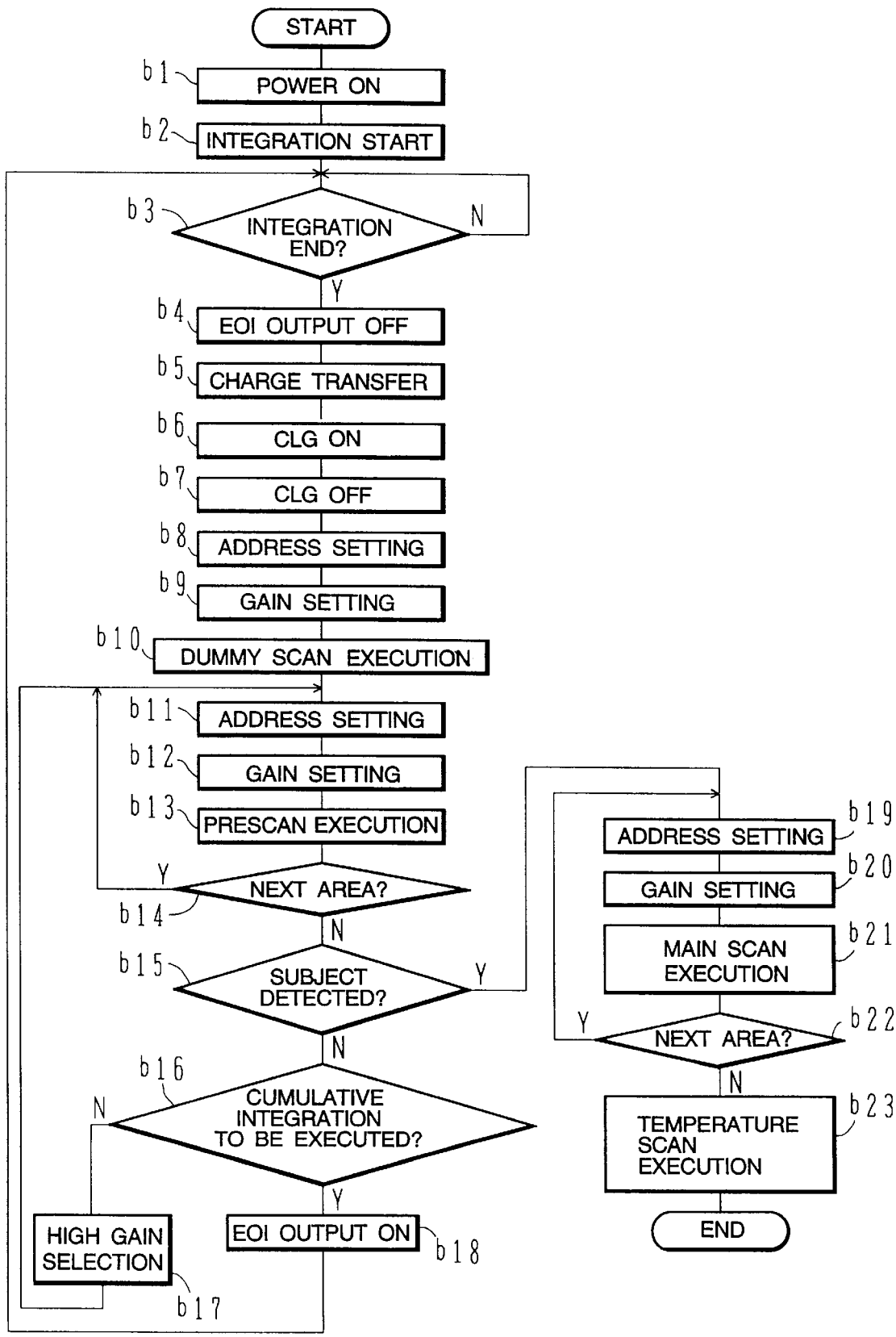
FIG. 30 is a flow chart explaining the range finding operation by the range finder according to an embodiment of the invention.

Next, an example of the range finding operation of the range finder mounted on a camera body will be described with reference to FIGS. 30, 31A and 31B, and 32A and 32B. FIG. 30 is a flow chart explaining the operation at the range finder and the microcomputer in the camera body. FIGS. 31A and 31B, and 32A and 32B are timing charts explaining the integration operation, prescan operation, cumulative integration operation, and main scan operation, respectively.

The integration operation will first be described with reference to FIGS. 30 and 31A.

At Step b1, the power is turned on while applying the low level to the reset terminal (-RESET) of the range finder. During the period while the low level is applied to the reset terminal (-RESET), the range finder is maintained in a reset state.

At Step b2, the reset terminal (-RESET) is made the high level. At this time, electric charges accumulated in the channel region under the storage gate ST and floating gate FG shown in FIGS. 9A and 9B are cleared. At the same time, electric charges corresponding in amount to the received light intensity start being accumulated at the channel region under the storage gate ST to start the integration operation.

At Step b3, the control stands by until the integration is completed. After the completion of integration, the range finder notifies the microcomputer in the camera body of the end of integration (EOI), by changing the level at the service request terminal SRQ to the low level. The service request terminal SRQ is therefore used for the notification of the EOI signal after the reset. The microcomputer in the camera body performs the next step after detecting the EOI signal. Detecting the EOI signal may be performed by always monitoring it by a loop process or by activating an interrupt process of the microcomputer in the camera body by changing the level at the service request terminal SRQ to the low level.

At Step b4, the microcomputer in the camera body enters the MDC command to the range finder to make an output off-state of the EOI signal. Specifically, the MDC command with the operand eoi=1 is entered. The service request terminal SRQ then enters a state for notifying a command execution end or an A/D conversion end (EOC).

When the command is entered, the read/write terminal R/W is set to the high level. The command is inputted from the serial input/output terminal SIO synchronously with the serial clock SCK supplied from the microcomputer in the camera body.

At Step b5, the microcomputer in the camera body enters the TRT command to the range finder. Electric charges corresponding to the received light amount and stored in the channel region under the storage gate ST are transferred to the channel region under the floating gate FG as illustrated in FIGS. 13A to 13E.

At Steps b6 and b7, the clear gate is turned on and then turned off. Specifically, the microcomputer in the camera body enters the PGC command with the operand cgc=1, and after the execution of the command, the same PGC command with the operand cgc=0 is entered. As a result, the cumulative integration operation starts as illustrated in FIGS. 12A to 12C. In this manner, immediately after the first integration operation is completed, the cumulative intergration starts. Therefore, the cumulative integration is performed while the first integration results are analyzed, thereby shortening a range finding time.

Next, the dummy scan operation and prescan operation will be described with reference to FIG. 30 and FIG. 31B. FIG. 31B is a timing chart explaining the prescan operation.

At Steps b8 to b10. a dummy scan is executed. At Step b8, dummy scan start and end addresses are designated. Specifically, the microcomputer in the camera body enters the SAS and EAS commands with the desired operand addresses to the range finder.

At Step b9, a gain is set. Specifically, the microcomputer in the camera body enters the GNS command with the desired gain operand. As a result, the switches SW4 to SW6 of the CCD signal processor circuit 12 shown in FIG. 21 are set to obtain the gain designated by the command.

A dummy scan is executed at Step b10. Specifically, the microcomputer in the camera body enters the SCT command with the operand designating the dummy scan, to the range finder. During the dummy scan, a constant voltage is given as the pixel output signal voltage $V_{CDS}$ inputted to the contrast calculation circuit shown in FIG. 23A. Therefore, after the dummy scan, an offset level of the contrast calculation circuit 13 is outputted. This level is used as the zero level of the contrast value at the later prescan operation.

After the dummy scan, the range finder outputs the EOC signal from the service request terminal SRQ to notify the microcomputer in the camera body of the calculation completion. The microcomputer in the camera body changes the read/write terminal R/W to the low level and supplies the serial clock SCK to the range finder to read data from the serial input/output terminal SIO.

A prescan is executed at Steps b11 to b13. At Steps b11 and b12, similar to the dummy scan, the scan start and end addresses and gain are set by using the SAS, EAS, and GNS commands. In the example shown in FIG. 31B, the start address is &5 and the end address is &8. The gain is set to the value same as the dummy scan. The reason for this is that a different gain results in a different offset.

At Step b13, the prescan is executed. Specifically, the microcomputer in the camera body enters the SCT command with the operand designating the prescan, to the range finder. After the prescan, the range finder outputs the EOC signal from the service request terminal SRQ to notify the microcomputer of the calculation completion. The microcomputer reads contrast data from the serial input/output terminal SIO in the manner similar to the dummy scan operation.

After the contrast data has been read, level data is set to the serial port 16 at the range finder. The microcomputer reads the level data in the manner similar to reading contrast data. The level data is the flag data shown in FIG. 27.

In the above manner, the contrast data and level data of a zone designated by the scan start and end addresses are read.

At Step b14, it is judged whether the microcomputer has collected all necessary contrast data. If there is contrast data not collected, new scan start and end addresses are used and Steps b11 to b13 are repeated. After all contrast data has been collected, the control advances to the next step.

In the above manner, the microcomputer can freely select the scan range from which contrast data is collected. The size of a zone from which one contrast data is collected can be freely set. Adjacent zones may be overlapped.

At Step b15, a main subject is detected. It is generally assumed that a main subject is at the area having a highest contrast. If a predetermined contrast is not obtained and a main subject cannot be detected, the control advances to Step b16 whereat it is judged whether a cumulative integration operation is executed. If a main subject is detected, the control advances to Step b19 to execute a main scan operation.

If a contrast at each scan area reaches a predetermined level or if another zone having a higher contrast is searched, the range from which contrast data is collected may be widened to again perform a prescan from Step b11.

At Step b16, it is judged whether the cumulative integration operation is executed. If all the selected zone have a low contrast and a high level data, it is assumed that range finding is impossible. If the contrast and level data are both low, the integration time is checked.

If the integration time is relatively short, a cumulative integration is possible so that the control advances to Step b18 to perform the cumulative integration operation. If the integration time is long and the cumulative integration is impossible, the control advances to Step b17 whereat the gain is changed to again perform the prescan. In this case, the electric charges accumulated at the first prescan in accordance with the received light amount at each pixel are not initialized, but they can be read non-destructively. It is therefore unnecessary to again perform the integration operation at the second prescan.

At Step b17, a gain is set. For example, if the output level of each pixel is low, a higher gain is set and the prescan is again executed from Step b11. In this case, it is preferable to set a gain as high as possible unless the level data is saturated.

Next, the cumulative integration operation will be described with reference to FIGS. 30 and 32A.

At Step b18, the microcomputer enters the MDC command to the range finder to set an on-state of outputting the EOI signal. Specifically, the MDC command with the operand eoi=0 is entered. The service request terminal SRQ therefore enters a state notifying the end of integration (EOI) signal. In this case, the cumulative integration amount may be increased or decreased by changing the levels of the AGC monitors 8a and 8b and AGC circuit 9 shown in FIG. 20 by using the ALS command.

After the MDC command is entered, the control returns to Step b3 to wait for the end of integration. After the cumulative integration, the range finder outputs the EOI signal from the service request terminal SRQ to notify the microcomputer of the end of integration. Since the cumulative integration started at Step b7, there is a case where the integration has already completed at the time when the MDC command is entered. In such a case, the EOI signal is outputted immediately after the MDC command is entered.

In the above manner, without discarding the electric charges accumulated at the previous integration operation, new electric charges corresponding to the received light amount are added. Therefore, it is possible to obtain a contrast level sufficient for a main subject to be detected. When the microcomputer in the camera body detects the EOI signal, the process at Step b4 and following Steps are executed.

Next, the main scan operation will be described with reference to FIGS. 30 and 32B.

The main scan is executed at Steps b19 to b21. At Step b19, scan start and end addresses are set. Next, at Step b20 a gain is set. In setting the addresses and gain, the SAS, EAS, and GNS commands are sequentially entered similar to the dummy scan at Steps b8 and b9.

The main scan starts at Step b21. Specifically, the microcomputer enters the SCT command with the operand designating the main scan to the range finger. After the output signal at one pixel is A/D converted, the range finder outputs the A/D conversion end (EOC) signal from the service request terminal SRQ.

When the EOC signal is received, the microcomputer reads data from the serial input/output terminal SIO while supplying a serial clock SCK to the range finder. At this time, the read/write terminal R/W is set to the low level. In parallel with reading data of one pixel, the range finder starts the A/D conversion of the next pixel, and when the A/D conversion is completed, changes the level at the service request terminal SRQ to the low level to output the EOC signal. The above operation is repeated to sequentially read data of all pixels.

During the prescan, one of the right and left CCDs is scanned. During the main scan, it is necessary to scan both the right and left CCDs.

At Step b22 it is judged whether the main scan is executed for another scan area. If it is necessary to perform the main scan at another scan area, the control returns to Step b19 whereat the scan start and end addresses and gain are changed and the main scan is again executed. For example, if there are a plurality of main subjects, it is necessary to perform the main scan at different scan areas to measure distances to a plurality of subjects. After the main scan is performed for all necessary scan areas, the control advances to Step b23.

At Step b23, temperature data is read. Specifically, the microcomputer enters the SCT command with the operand designating a temperature data output, to the range finder. Similar to the SCT command issued as the main scan, after the A/D conversion end, the range finder outputs the EOC signal from the service request terminal SRQ to the microcomputer.

The operation flow described above is one example of using the embodiment range finder. The operation of the embodiment range finder is not limited only to the above operation flow, but various flows are possible by entering commands from the microcomputer in the camera body. For example, the size of a contrast measurement scan area, a method of detecting a main subject, a focusing method used when there is a plurality of main subjects, the scale of range finding, and other factors may be set as desired.

By detecting a difference of brightness between a main subject area and another area, it is possible to obtain information about a rear light subject, a spot-lighted subject, and other information.

As shown in FIG. 32B, during the main scan, the range finder sequentially A/D converts CCD outputs and serially transmits pixel data to the microcomputer. If this serial transmission is intercepted, pixel data is lost. Therefore, the serial communication cannot be intercepted. It is necessary to temporarily stop the scan operation when an interrupt is issued to the microcomputer from some reasons.

A wait function for temporarily stopping a scan operation of the range finder will be described with reference to FIG. 33.

The principle of the wait function is to temporarily stop the scan operation by stopping the clock in the range finder by changing the level of a wait terminal WAIT of the range finder to the high level. When the wait terminal WAIT is set back to the low level, the internal clock of the range finder starts running to resume the scan operation.

Figure 33A:
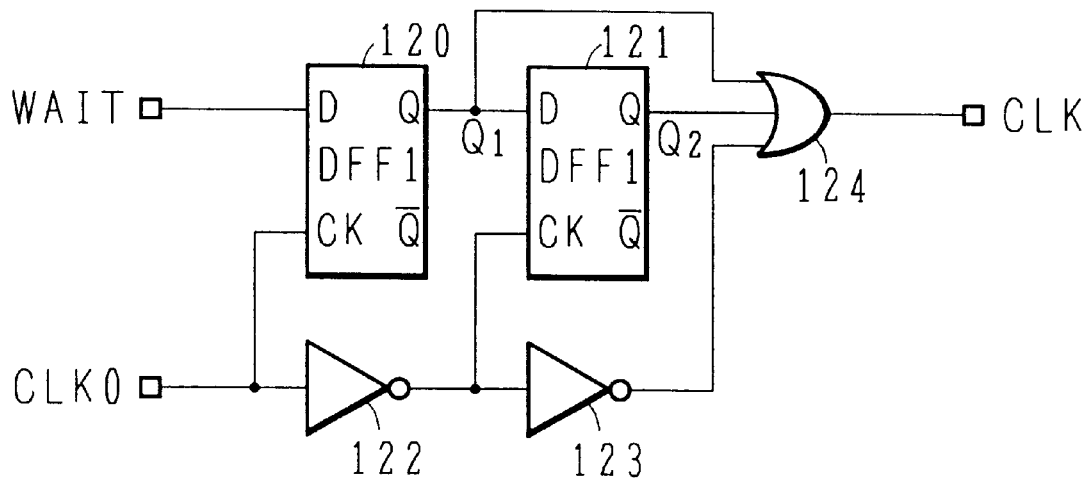
FIG. 33A is a circuit diagram explaining a wait function.
Figure 33B:
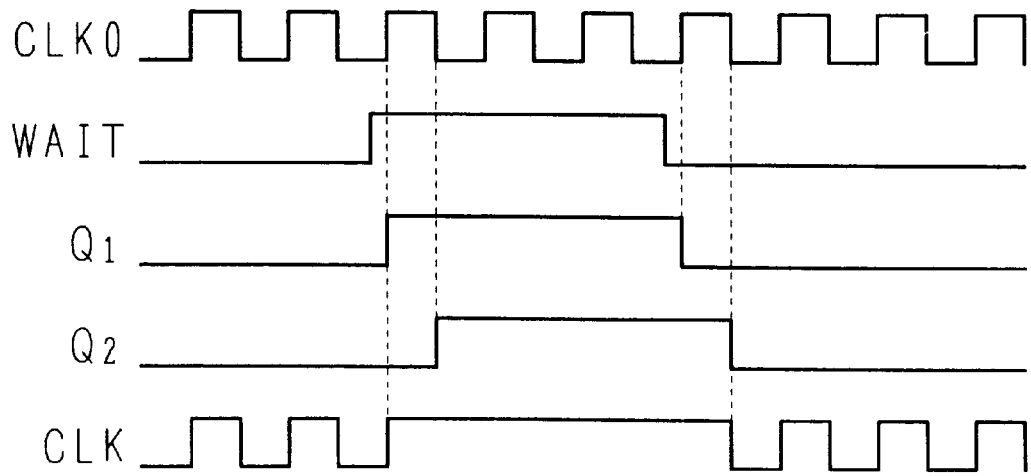
FIG. 33B is a timing chart explaining the operation of the circuit shown in FIG. 33A.
Figure 34A:
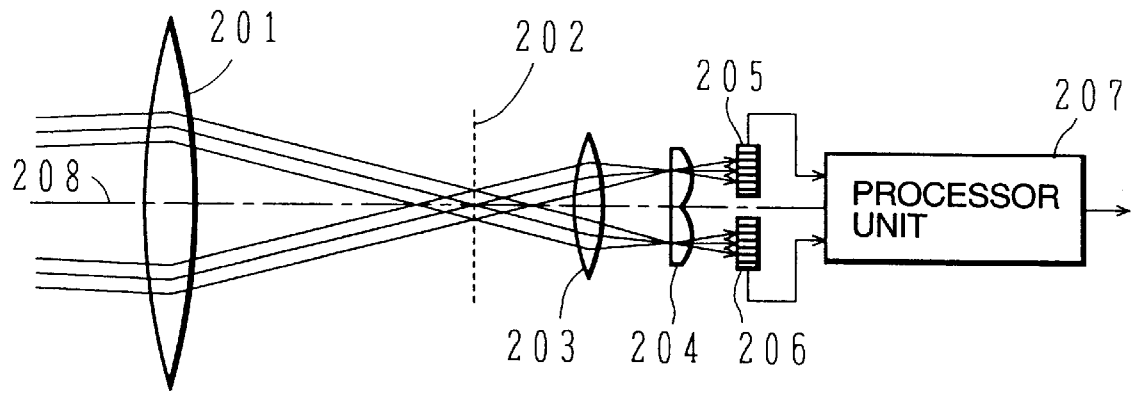
FIG. 34A is a schematic diagram showing an example of the structure of a conventional range finder.
Figure 34B:
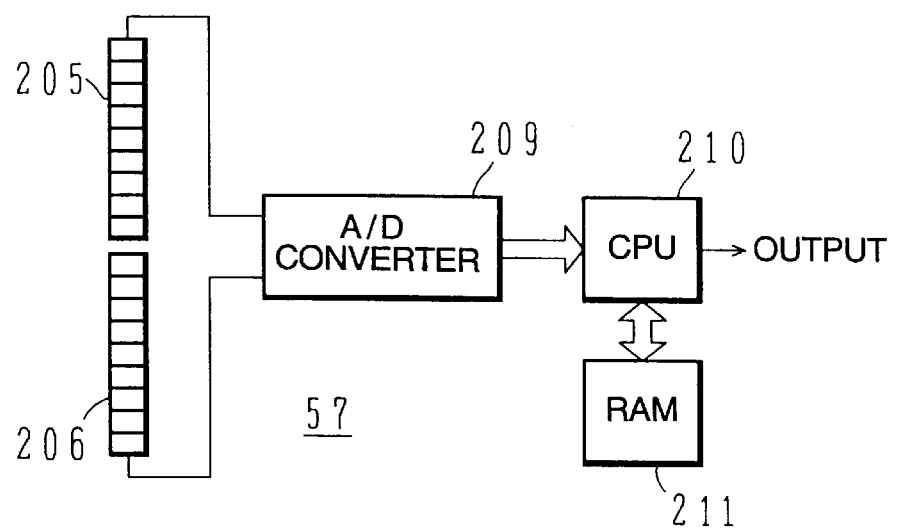
FIG. 34B is a block diagram of a processor circuit of the range finder shown in FIG. 34A.

FIG. 33A is a circuit realizing the wait function, and FIG. 33B is a timing chart explaining the operation of the circuit.

The wait terminal WAIT is connected to the D input terminal of a flip-flop 120. The clock terminal CLK0 is connected to the CK input terminal of the flip-flop 120, and via a NOT gate 122 to the CK terminal of another flip-flop 121.

The Q output terminal of the flip-flop 120 is connected to the D input terminal of the flip-flop 121. Connected to input terminals of an OR gate 124 are the Q output terminals of the flip-flops 120 and 121 and the clock terminal CLK0 via a serial circuit of the NOT gates 122 and 123. An output of the OR gate is a clock signal CLK supplied to the range finder.

When the wait terminal WAIT takes the high level, an output signal Q1 at the Q output terminal of the flip-flop 120 takes the high level synchronously with the rising edge of the clock CLK0. Synchronously with the next falling edge of the clock CLK0, an output signal Q2 at the Q output terminal of the flip-flop 121 takes the high level.

When the wait terminal WAIT takes the low level, the output signal Q1 at the Q output terminal of the flip-flop 120 changes to the low level synchronously with the rising edge of the clock CLK0. Synchronously with the next falling edge of the clock CLK0, the output signal Q2 at the Q output terminal of the flip-flop 121 changes to the low level.

While one of the output signals Q1 and Q2 keeps the high level, the internal clock CLK to be supplied to the range finder maintains to be the high level. Therefore, while the wait terminal WAIT takes the high level, the internal clock CLK stops. The reason why a logical OR of the output signals Q1 and Q2 is used instead of the signal at the wait terminal WAIT, is not to stop the internal clock CLK at an improper clock timing.

If the clock frequency of the range finder is high and the frequency of the serial clock SCK used for serial communication is low, the read period of pixel data becomes longer than the scan period of pixels, causing a lost of pixel data. Also in such a case, the wait function is used to prevent a loss of pixel data.

Specifically, when the level at the service request terminal SRQ shown in FIG. 32B falls, a high level is applied to the wait terminal WAIT to stop the internal clock CLK of the range finder and stop the scan operation. Under this condition, the serial communication continues to slowly read pixel data. When the serial communication is completed, the wait terminal WAIT is changed back to the low level to resume the scan operation of the range finder. The serial port transmits data synchronously with the serial clock SCk so that communication continues even if the internal clock CLK of the range finder is stopped.

In the above manner, by setting the wait terminal WAIT to the high level, the operation other than the integration operation in the range finder can be temporarily stopped.

The present invention has been described in connection with the preferred embodiments. The invention is not limited only to the above embodiments. It is apparent to those skilled in the art that various modifications, improvements, combinations and the like can be made without departing from the scope of the appended claims.

I claim:

1. A range finding method comprising the steps of:

dividing an image pickup area into a plurality of zones;

forming an image of a subject on a pair of pixel arrays having a number of pixels disposed in line and photo-electrically converting the image into an electrical image signal for each of the pixels corresponding to a received light amount;

designating a proper subset of said plurality of zones in the pixels arrays, where contrast is to be measured;

sequentially reading the image signals, pixel by pixel, in said designated zones non-destructively;

calculating contrast for each of the designated zones from the image signals read from said designated zones;

detecting among said designated zones, one or more zones where one or more main subjects is located by comparing the contrast of each of the designated zones with the contrast of each of the other designated zones;

designating an area in the pixel arrays, where a distance is to be measured, in accordance with the zone where the main subject is located;

reading the image signal of each of the pixels in the area where a distance is to be measured; and measuring a distance to a subject in the zone where the main subject is located.

2. A range finding method according to claim 1, further comprising the step of analyzing an externally supplied command to determine which step among said designating an area in the pixel array step and said step of reading the image signal of each pixel in said designated area is to be executed.

3. A range finding method according to claim 1, further comprising the step of analyzing an externally supplied command to determine which step among said photoelectric conversion step, said designating an area in the pixel array step, said image signal reading step, and said contrast calculating step is to be executed.

4. A range finding method comprising the steps of:

dividing an image pick-up area into a plurality of zones;

forming an image of a subject on a pair of pixel arrays having a number of pixels disposed in line and photo-electrically converting the image into an electrical image signal for each of the pixels corresponding to a received light amount;

designating a proper subset of said plurality of zones in the pixel arrays, where contrast is to be measured;

sequentially reading the image signals, pixel by pixel, in said designated zones non-destructively;

calculating contrast for each of the designated zones from the image signals from said designated zones;

detecting among said designated zones, one or more zones where one or more main subjects is located by comparing the contrast of each of the designated zones with the contrast of each of the other designated zones;

designating an area in the pixel arrays, where a distance is to be measured, in accordance with the zone where the main subject is located;

reading the image signal of each of the pixels in the area where a distance is to be measured;

measuring a distance to a subject in the zone where the main subject is located; and wherein if a plurality of designated zones are detected where the main subjects are located, said distance measuring step measures the distances to the subjects in said plurality of designated zones where the main subjects are located.

5. A range finding method according to claim 4, wherein an average of the measured distances to the subjects in the plurality of designated zones is used as a distance to the plurality of main subjects.

6. A range finding method according to claim 4, wherein the shortest distance to a subject among the measured distances to the subjects in the plurality of designated zones is used as a distance to the plurality of main subjects.

7. A range finding method comprising the steps of:

dividing an image pick-up area into a plurality of zones;

forming an image of a subject on a pair of pixel arrays having a number of pixels disposed in line and photo-electrically converting the image into an electrical image signal for each of the pixels corresponding to a received light amount;

designating a proper subset of said plurality of zones in the pixel arrays, where contrast is to be measured;

sequentially reading the image signals, pixel by pixel, in said designated zones non-destructively;

calculating contrast for each of the designated zones from the image signals from said designated zones;

detecting among said designated zones, one or more zones where one or more main subjects is located by comparing the contrast of each of the designated zones with the contrast of each of the other designated zones;

designating an area in the pixel arrays, where a distance is to be measured, in accordance with the zone where the main subject is located;

reading the image signal of each of the pixels in the area where a distance is to be measured;

measuring a distance to a subject in the zone where the main subject is located; and wherein after said step of detecting a zone where a main subject is located, the size of the zone is changed and said contrast measuring step and said step of detecting a zone where a main subject is located are executed.

8. A range finder for converting an image signal corresponding to a received light amount at each pixel of a pair of pixel arrays on which a subject image is focused via spatially different optical paths, into digital image data and outputting the digital image data, the range finder having at least one MOS transistor for supplying a constant current, the range finder comprising:

a bias circuit having an input terminal for receiving a sleep signal for entering a low current consumption mode, said bias circuit responsive to said sleep signal supplying a gate voltage to the gate electrode of said MOS transistors for cutting off the constant current.

* * * * *